(12) United States Patent
Murakami et al.

(10) Patent No.: US 11,837,741 B2
(45) Date of Patent: Dec. 5, 2023

(54) ELECTRICAL APPARATUS USING BATTERY PACK

(71) Applicant: Koki Holdings Co., Ltd., Tokyo (JP)

(72) Inventors: Takuhiro Murakami, Ibaraki (JP); Tomomasa Nishikawa, Ibaraki (JP); Shinji Watanabe, Ibaraki (JP); Junpei Sato, Ibaraki (JP); Hikaru Tamura, Ibaraki (JP); Shota Kanno, Ibaraki (JP); Toshio Mizoguchi, Ibaraki (JP); Yasushi Nakano, Ibaraki (JP); Hiroyuki Hanawa, Ibaraki (JP); Kazuhiko Funabashi, Ibaraki (JP); Masayuki Ogura, Ibaraki (JP); Takuya Teranishi, Ibaraki (JP); Junichi Toukairin, Ibaraki (JP); Shota Takeuchi, Ibaraki (JP); Yusuke Funabiki, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 57 days.

(21) Appl. No.: 16/626,308

(22) PCT Filed: Jun. 29, 2018

(86) PCT No.: PCT/JP2018/024851
§ 371 (c)(1),
(2) Date: Dec. 23, 2019

(87) PCT Pub. No.: WO2019/017184
PCT Pub. Date: Jan. 24, 2019

(65) Prior Publication Data
US 2020/0161609 A1 May 21, 2020

(30) Foreign Application Priority Data
Jul. 21, 2017 (JP) .................. 2017-141898

(51) Int. Cl.
*H01M 50/213* (2021.01)
*B25F 5/02* (2006.01)
(Continued)

(52) U.S. Cl.
CPC ............. *H01M 50/213* (2021.01); *B25F 5/02* (2013.01); *H01M 50/256* (2021.01);
(Continued)

(58) Field of Classification Search
CPC ........... B25B 21/00; B25B 21/02; B25F 5/02; H01M 10/425; H01M 2220/30; H01M 50/213; H01M 50/256; H01M 50/543
See application file for complete search history.

(56) References Cited

U.S. PATENT DOCUMENTS

2010/0156350 A1* 6/2010 Murayama .......... H01M 10/425
320/128
2014/0302353 A1* 10/2014 Ogura ................. H01M 50/213
429/7
2016/0294093 A1* 10/2016 Ogura ....................... B25F 5/00

FOREIGN PATENT DOCUMENTS

CN 101752590 6/2010
CN 101842921 9/2010
(Continued)

OTHER PUBLICATIONS

"International Search Report (Form PCT/ISA/210) of PCT/JP2018/024851", dated Aug. 28, 2018, with English translation thereof, pp. 1-4.
(Continued)

*Primary Examiner* — Adam A Arciero
(74) *Attorney, Agent, or Firm* — JCIPRNET

(57) ABSTRACT

The electrical apparatus, in which a series connection state and a parallel connection state of an upper cell unit including five battery cells and a lower cell unit can be automatically
(Continued)

switched by means of a difference in a terminal shape on the electrical apparatus body side, has a terminal holder and holds apparatus side terminals. The terminal holder, which establishes an electrically connected state with the connection terminals of the battery pack, is provided with two parallel protruding parts that extend in the forward-backward direction, and second rail grooves fitted to the protruding parts on the electrical apparatus side. Due to the fitting, relative movement of the terminal holder and the battery pack in the vertical direction can be suppressed, and wear on the apparatus side terminals can be greatly suppressed.

14 Claims, 43 Drawing Sheets

(51) Int. Cl.
*H01M 50/256* (2021.01)
*H01M 50/296* (2021.01)
*B25B 21/02* (2006.01)

(52) U.S. Cl.
CPC ........... *H01M 50/296* (2021.01); *B25B 21/02* (2013.01); *H01M 2220/30* (2013.01)

(56) References Cited

FOREIGN PATENT DOCUMENTS

| | | |
|---|---|---|
| CN | 201590444 | 9/2010 |
| CN | 104103799 | 10/2014 |
| CN | 205790100 | 12/2016 |
| JP | 2011177891 | 9/2011 |
| JP | 2012099383 | 5/2012 |
| JP | 2013196816 | 9/2013 |
| JP | 2014017954 | 1/2014 |
| JP | 2014203703 | 10/2014 |
| JP | 2015165466 | 9/2015 |
| JP | 2016201889 | 12/2016 |
| JP | 2017107820 | 6/2017 |

OTHER PUBLICATIONS

"Office Action of China Counterpart Application" with English translation thereof, dated Nov. 3, 2021, p. 1-p. 17.
"Office Action of China Counterpart Application" with English translation thereof, dated Jun. 17, 2022, p. 1-p. 15.

* cited by examiner (1)
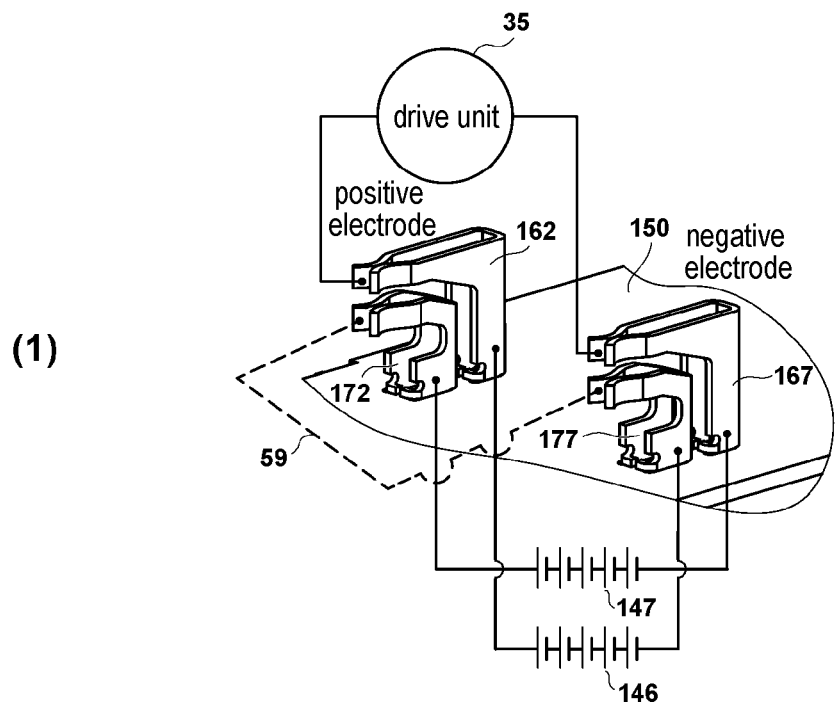
(2)
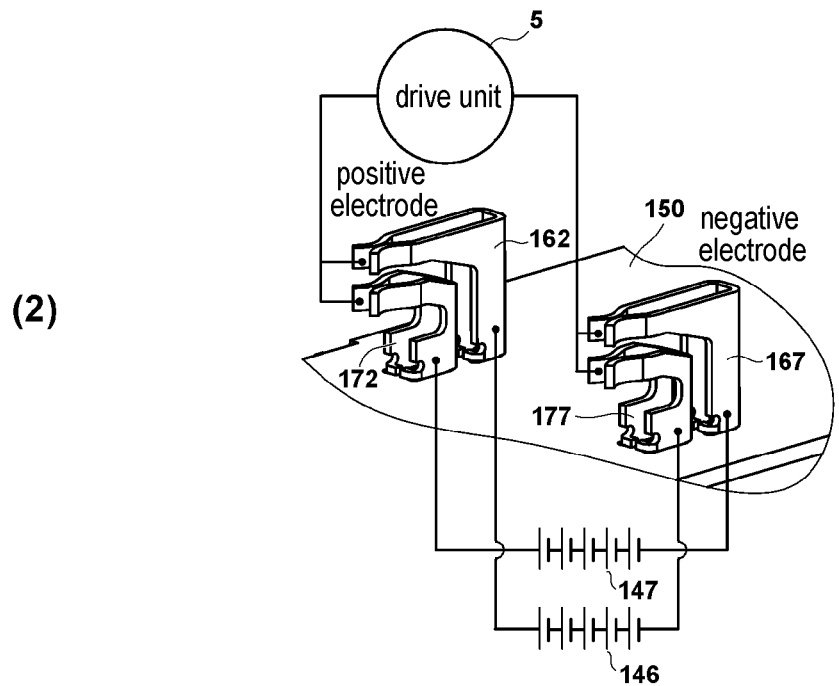
Fig. 8

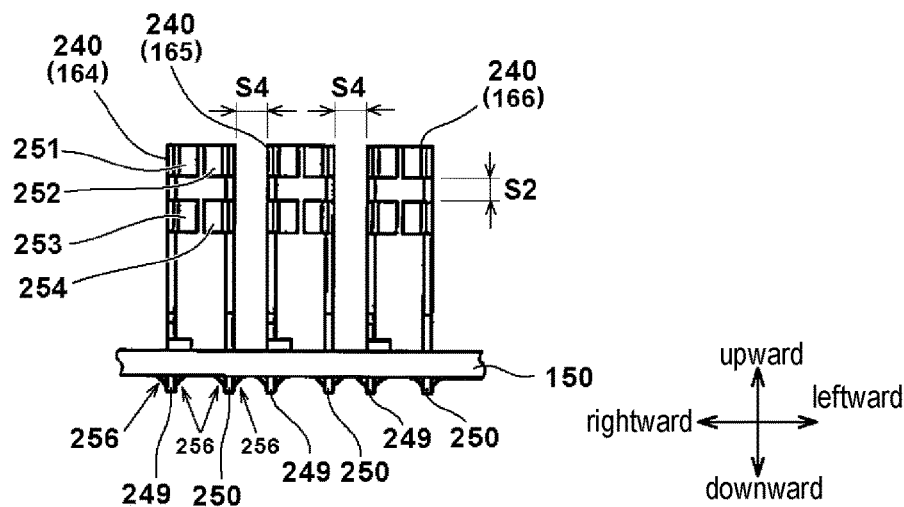
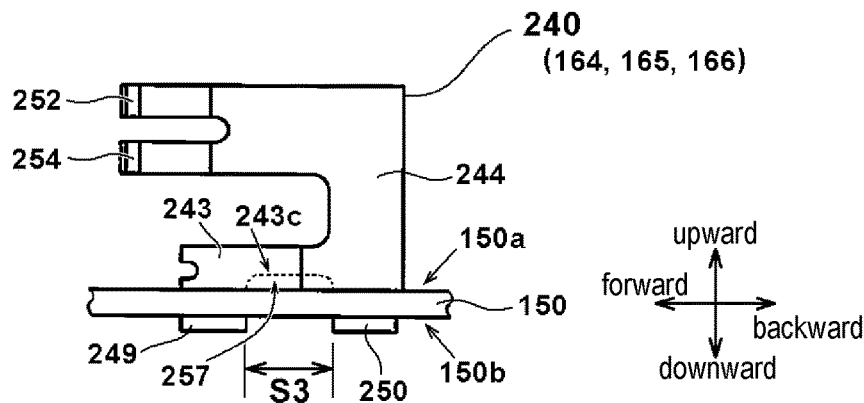
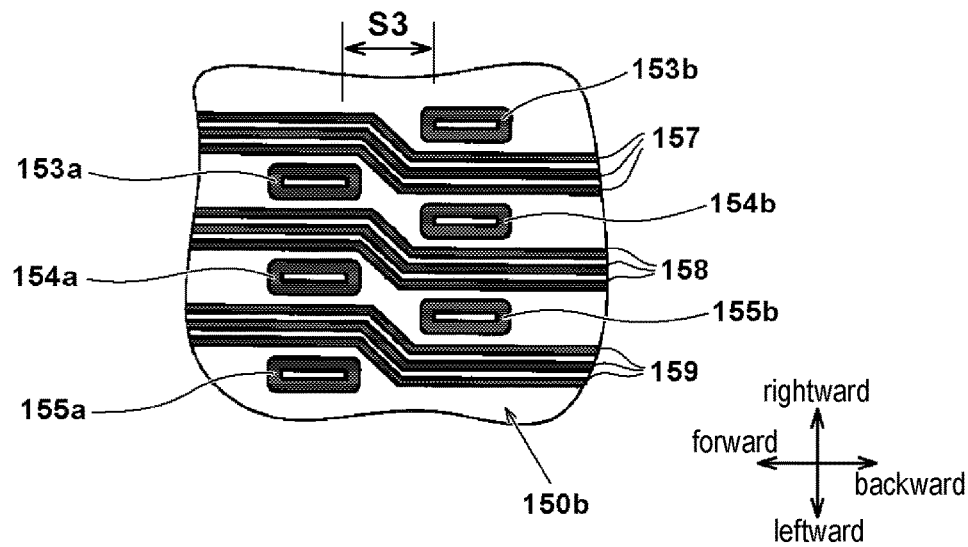
Fig. 12

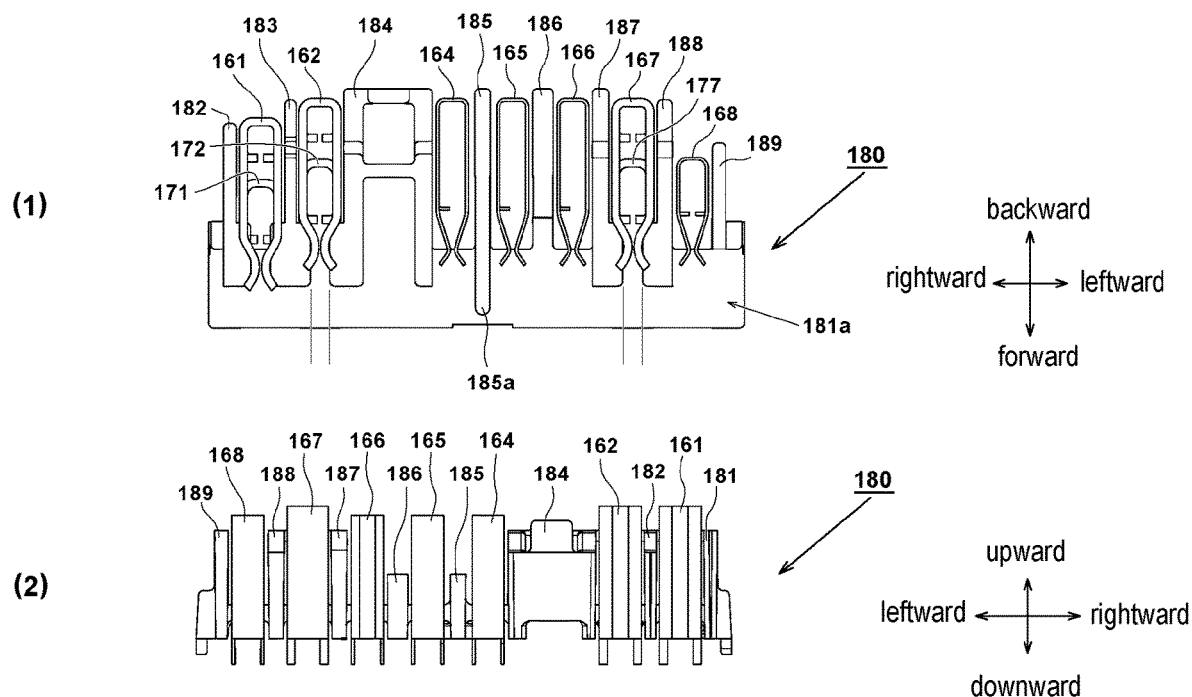
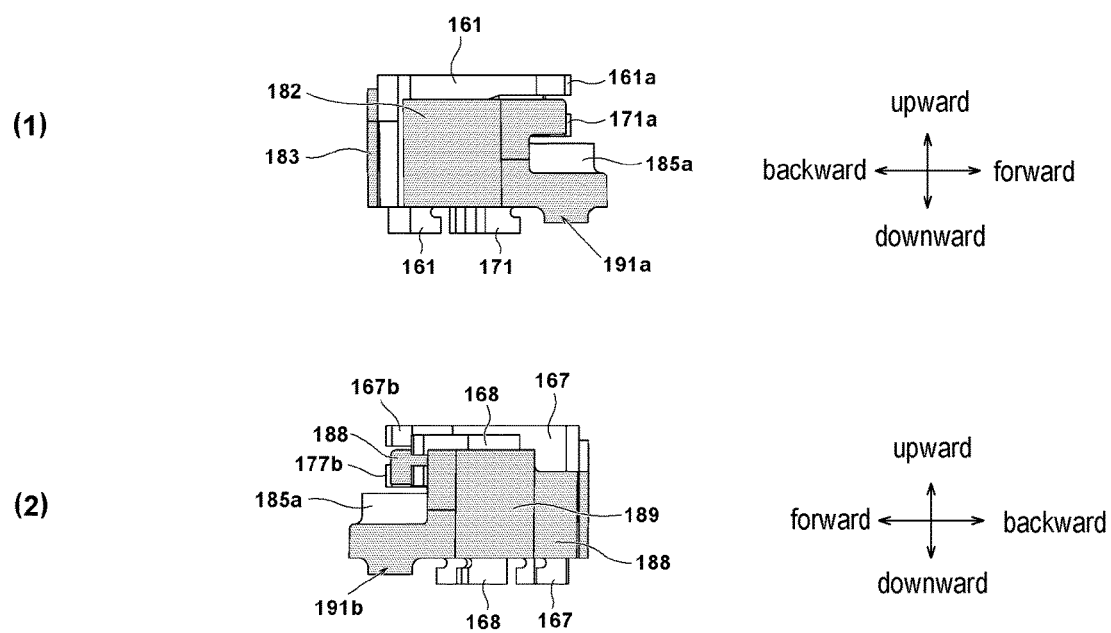
Fig. 20

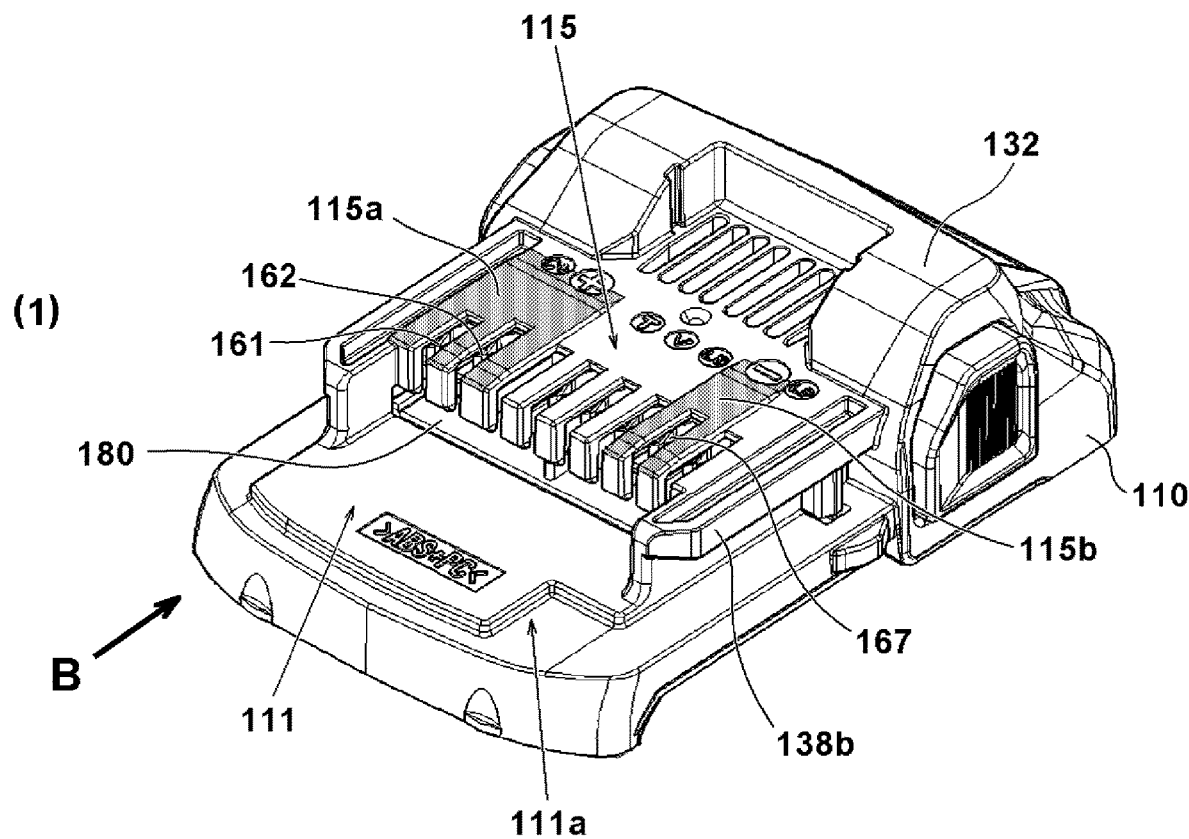
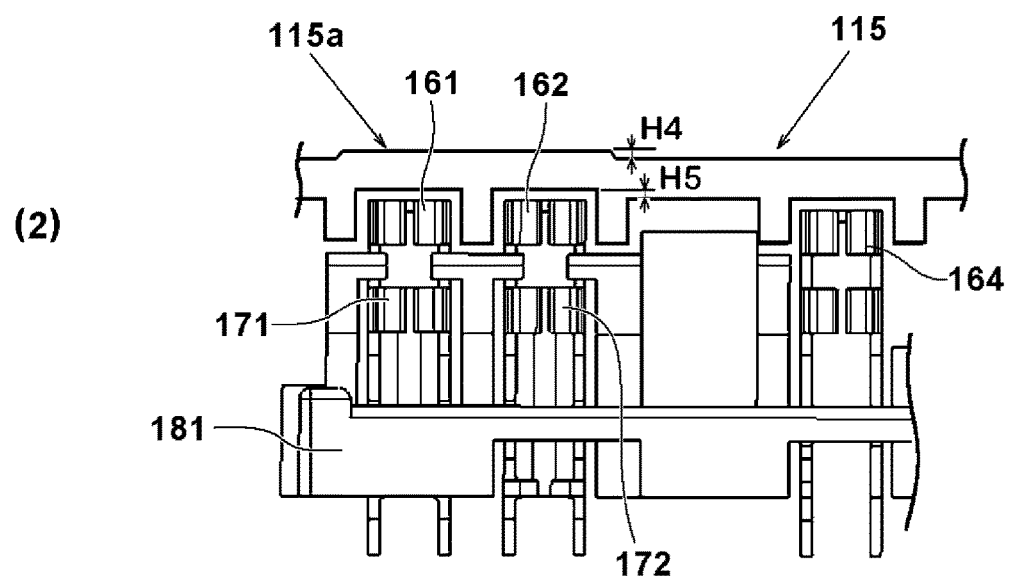
Fig. 22

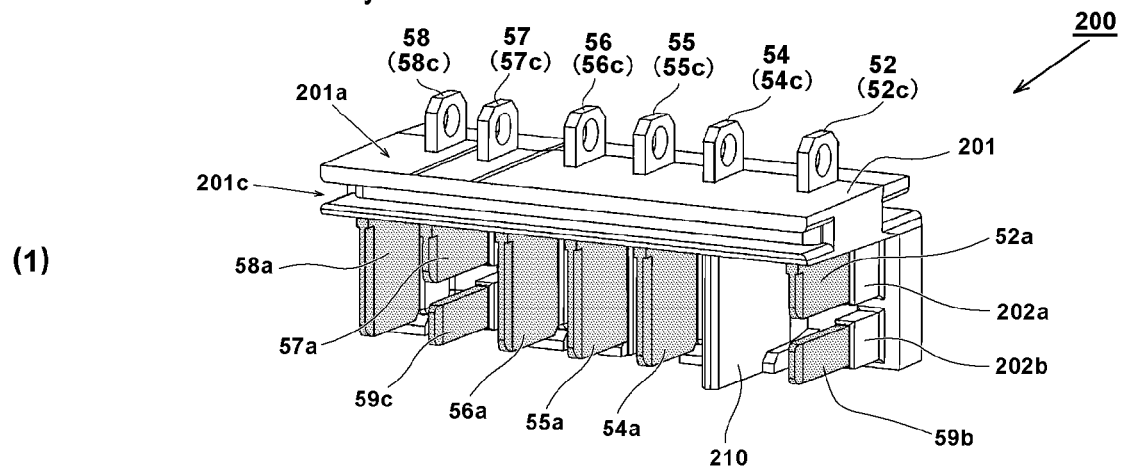
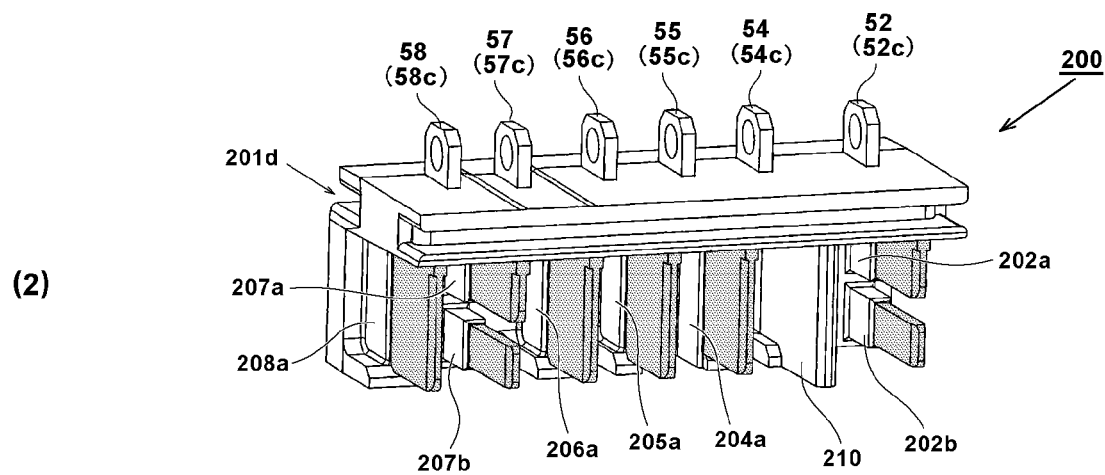
Fig. 24

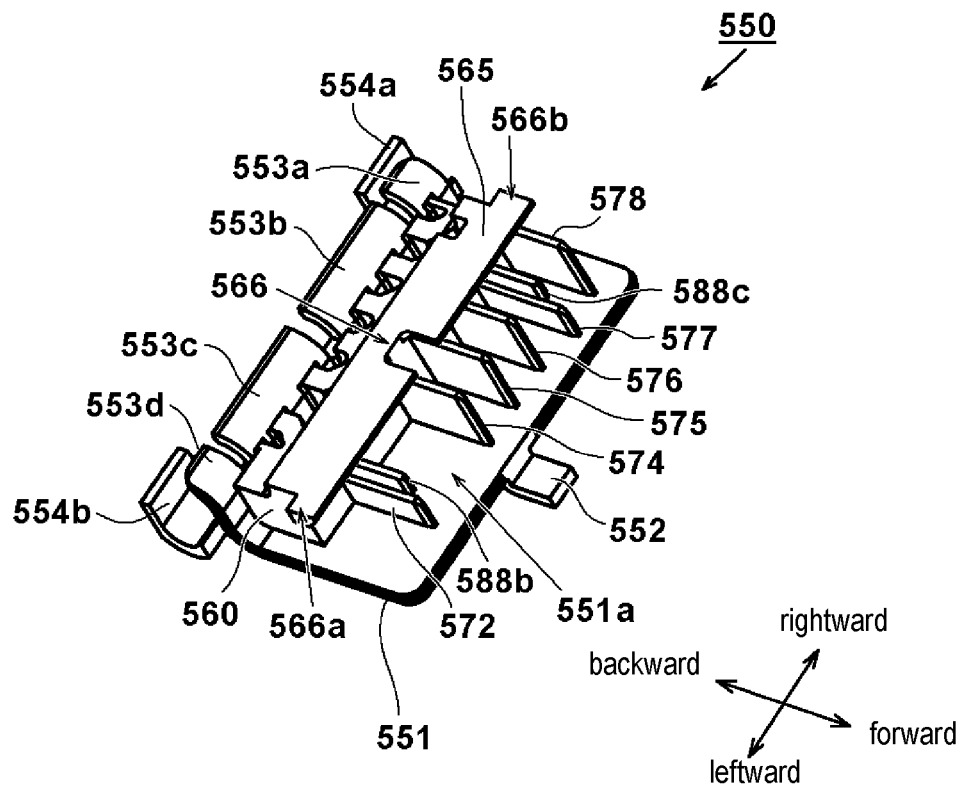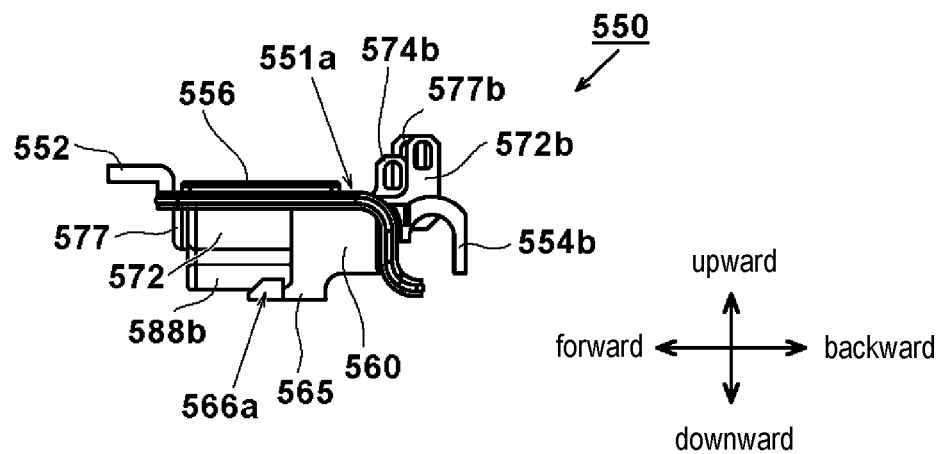
Fig. 32

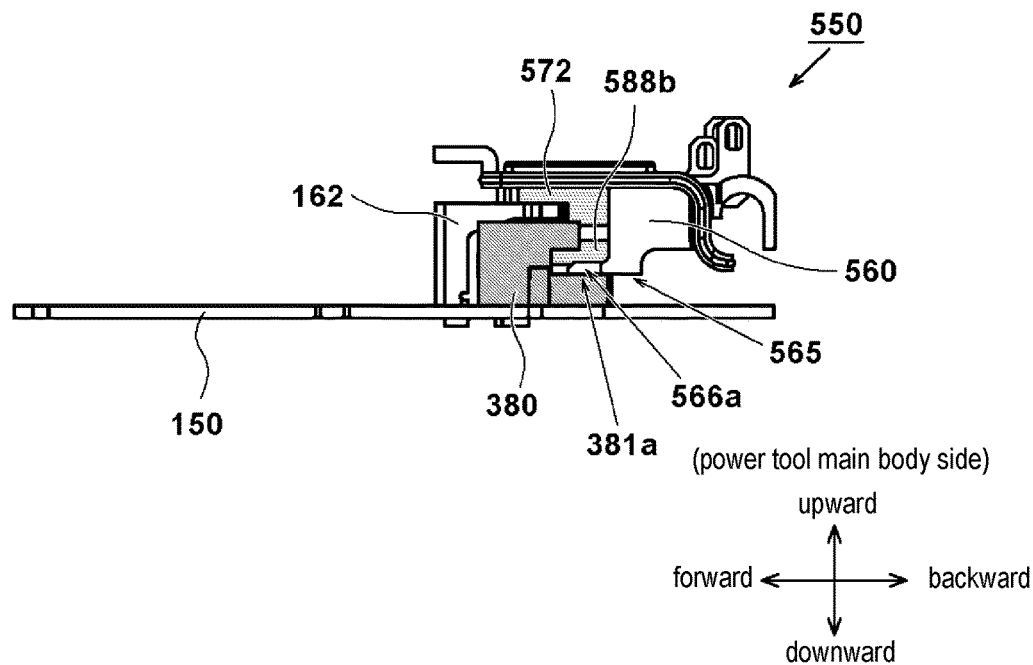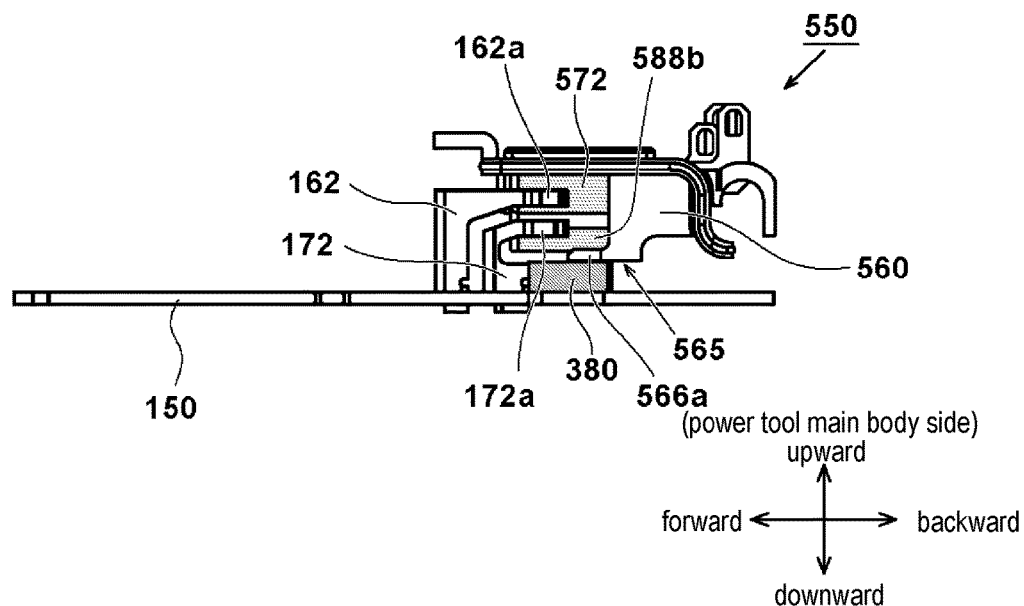
Fig. 34

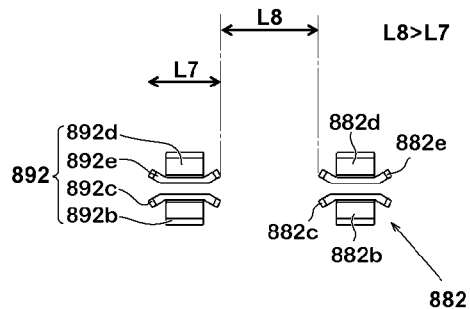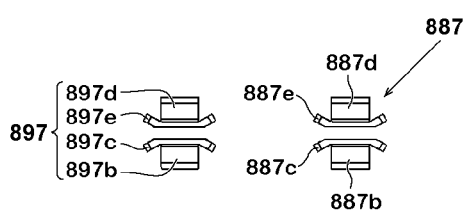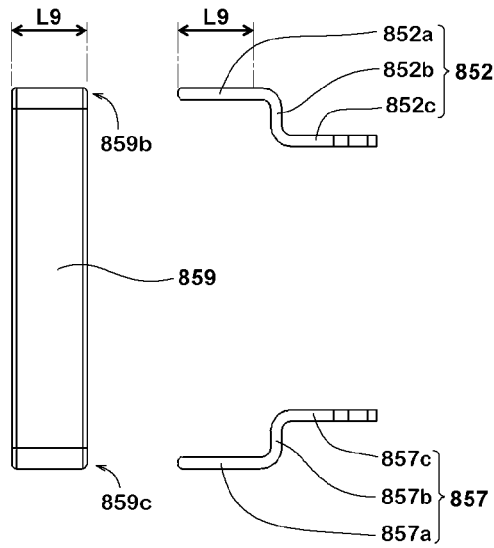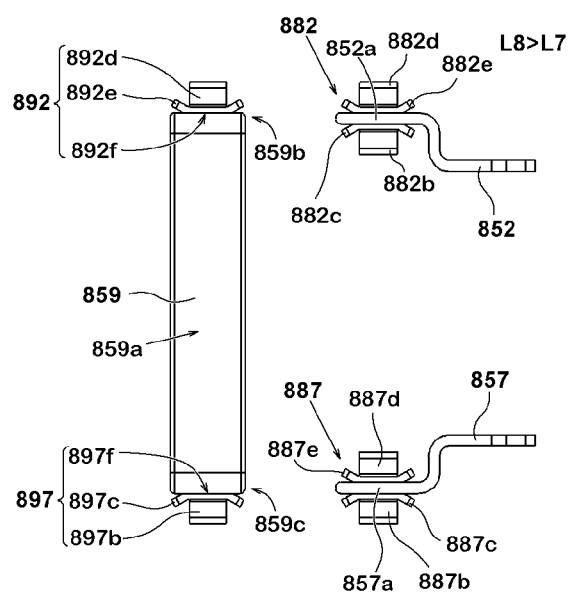
Fig. 45

ELECTRICAL APPARATUS USING BATTERY PACK

CROSS-REFERENCE TO RELATED APPLICATION

This application is a 371 application of the International PCT application serial no. PCT/JP2018/024851, filed on Jun. 29, 2018, which claims the priority benefits of Japan Patent Application No. 2017-141898, filed on Jul. 21, 2017. The entirety of each of the above-mentioned patent applications is hereby incorporated by reference herein and made a part of this specification.

TECHNICAL FIELD

The present invention relates to an electrical apparatus having loads such as a motor, a lamp, and the like and a battery pack supplying power to such an electrical apparatus.

BACKGROUND ART

Electrical apparatuses such as power tools are driven by battery packs using a secondary battery such as a lithium ion battery, and implementation of making electrical apparatuses cordless has progressed. For example, in a power tool of a handheld type driving a tip tool using a motor, a battery pack housing a plurality of secondary battery cells is used, and the motor is driven using electrical energy accumulated in the battery pack. The battery pack is configured to be able to be detachably attached to a power tool main body, and, when the voltage becomes low in accordance with discharge, the battery pack is detached from the power tool main body and is charged using an external charging device.

In a power tool or an electrical apparatus of a wireless type, securement of a predetermined operating time and securement of a predetermined output are required, and implementation of a high output and a high voltage have been attained in accordance with improvement of performance of a secondary battery. In addition, in accordance with development of electrical apparatuses using a battery pack as a power supply, battery packs supplying various voltages are available on the market. Generally, although an output voltage of a battery pack is fixed, a power supply device used for an electrical apparatus that can handle devices requiring different voltages by disposing a plurality of battery units inside a housing housing batteries and allowing selection of an output of the battery units connected in series or an output of the battery units connected in parallel using a connection means has been proposed in Patent Document 1.

CITATION LIST

Patent Literature

[Patent Literature 1]
  Japanese Patent Laid-Open No. 2014-17954

SUMMARY OF INVENTION

Technical Problem

When a plurality of electrical apparatuses are used, it is complicated for a user to prepare battery packs of a plurality of types, and it is desirable to realize a battery pack, which can be conveniently used, corresponding to electrical apparatuses requiring different voltages by performing switching between voltages. In addition, it is desirable to realize a voltage switching system using a battery pack that can be easily mounted in an electrical apparatus instead of a power supply device of a separate body type that is separate from an electrical apparatus main body as in Patent Document 1.

The present invention is realized in consideration of the background described above, and an object of the present invention is to provide a battery pack capable of switching an output voltage and that can be shared among electrical apparatuses requiring different voltages and an electrical apparatus using the battery pack. Another object of the present invention is to provide an electrical apparatus using a battery pack capable of effectively preventing erroneous setting of a voltage by allowing a voltage to be set easily according to a corresponding electrical apparatus. Yet another object of the present invention is to provide an electrical apparatus using a battery pack having advanced functions. Yet another object of the present invention is to provide an electrical apparatus using a battery pack having a terminal structure that can be satisfactorily fitted to a connection terminal of an electrical apparatus main body side.

Solution to Problem

Representative features of an invention disclosed in this application are as below. According to one aspect of the present invention, there is provided an electrical apparatus which is a power tool, the electrical apparatus including: a battery pack; and a terminal holder (terminal unit) holding a plurality of apparatus-side terminals and establishing electrically connected states with connection terminals of the battery pack, wherein two protrusion parts parallel to each other and extending in a forward-backward direction are disposed in the battery pack, a rail part engaged with a rail groove of the tool side is disposed in each of the protrusion parts, and an engagement part fitted to the terminal holder is disposed in an opening portion formed between the protrusion parts. The battery pack includes an upper-portion face between rail faces that are disposed parallel to each other, a lower-portion face going down from the upper-portion face in a level difference shape, a plurality of slits disposed in a level difference part of the upper-portion face and the lower-portion face, and the opening portion connecting the slits. In addition, an engaging part engaged with the engagement part is disposed in the terminal holder.

According to another aspect of the present invention, the terminal holder is a an article molded from a synthetic resin and formed a vertical face and a horizontal face, and is fixed by casting the apparatus-side terminals having a flat plate shape such that the apparatus-side terminals are orthogonal to both of the vertical face and the horizontal face. The apparatus-side terminals have a rectangular shape, one of longer sides comes into contact with the horizontal face, and one of shorter sides comes into contact with the vertical face, and protrusions protruding from the left end and the right end of the terminal holder in a leftward-rightward direction are disposed as the engaging part. In addition, in the terminal holder, a guide face disposed parallel to the horizontal face is formed, that the guide face comes into contact with a part of the other of the longer sides of the apparatus-side terminals and is connected to the vertical face, and the engaging parts are formed on the left side and the right side of the guide face. The engaging parts are formed to be the same face as the guide face. For example, the engagement parts are concave parts that are directly formed in a casing of the battery pack, and the engaging parts are positioned in the concave parts. In addition, a cover member used for covering an internal board is disposed in the opening portion of the battery pack, the engagement part is disposed in the cover member, and the engaging part is engaged with the engagement part. In addition, a cushion member adapted to be contact with an outer wall face of the battery pack such as a self-lubricating rubber may be disposed on a face of the guide face which faces the battery pack.

According to a further another aspect of the present invention, a battery pack including a positive electrode terminal having two arm part sets aligned in a vertical direction and a negative electrode terminal having two arm part sets aligned in the vertical direction and a terminal holder fitted to the battery pack in which a plate-shaped apparatus-side upper terminal of the terminal holder inserted between the arm part sets of the upper side and a plate-shaped apparatus-side lower terminal inserted between the arm part sets of the lower side are disposed to be separated from each other in a non-connected state are included, and a first guiding part made of an insulating body is disposed between the apparatus-side upper terminal and the apparatus-side lower terminal of the terminal holder, and the first guiding part guides the arm part sets of the upper side and the arm part sets of the lower side. In addition, a guiding part made of an insulating material is disposed in the terminal holder, wherein the guiding part engaged with the positive electrode terminal and the negative electrode terminal. In addition, a second guiding part made of an insulating body is disposed at a side above the upper terminal and a side below the lower terminal of the terminal holder, and the second guiding part guides the arm part sets of the upper side and the arm part sets of the lower side.

Advantageous Effects of Invention

According to the present invention, an appropriate output voltage can be automatically acquired by mounting the battery pack in an electrical apparatus main body without depending on a mechanical switching mechanism used for switching an output voltage. Accordingly, the battery pack can be commonly used by electrical apparatuses requiring different voltages. In addition, since a battery pack of a voltage switching type can be directly connected to a conventional electrical apparatus main body of a low voltage, a battery pack having high versatility that can be also used for an electrical apparatus main body requiring a high voltage can be realized while maintaining compatibility with a conventional electrical apparatus main body. Furthermore, by devising a terminal structure of a battery pack, generation of a defective contact with a terminal of an electrical apparatus main body side is avoided, an increase in contact resistance between a connection terminal of the electrical apparatus main body side and a connection terminal of the battery pack side is prevented, and heat dissipation occurring at the terminal part when a large current flows can be suppressed, whereby a damage and melting/cutting of the connection terminal can be effectively prevented. Furthermore, a method of mounting the battery pack in an electrical apparatus main body is similar to that of mounting in a conventional electrical apparatus main body, and accordingly, a battery pack corresponding to two power supplies having that same use advantages as those of a conventional case and an electrical apparatus using the battery pack can be realized.

BRIEF DESCRIPTION OF DRAWINGS

FIG. 8 is a diagram illustrating a connection status between an electrical apparatus main body and power terminals of the battery pack 100, (1) of FIG. 8 illustrates a connection circuit in a state of being connected to a power tool main body 30 according to this embodiment, and of FIG. 8 (2) illustrates a connection circuit connected to a conventional power tool main body 1.

Figure 9:
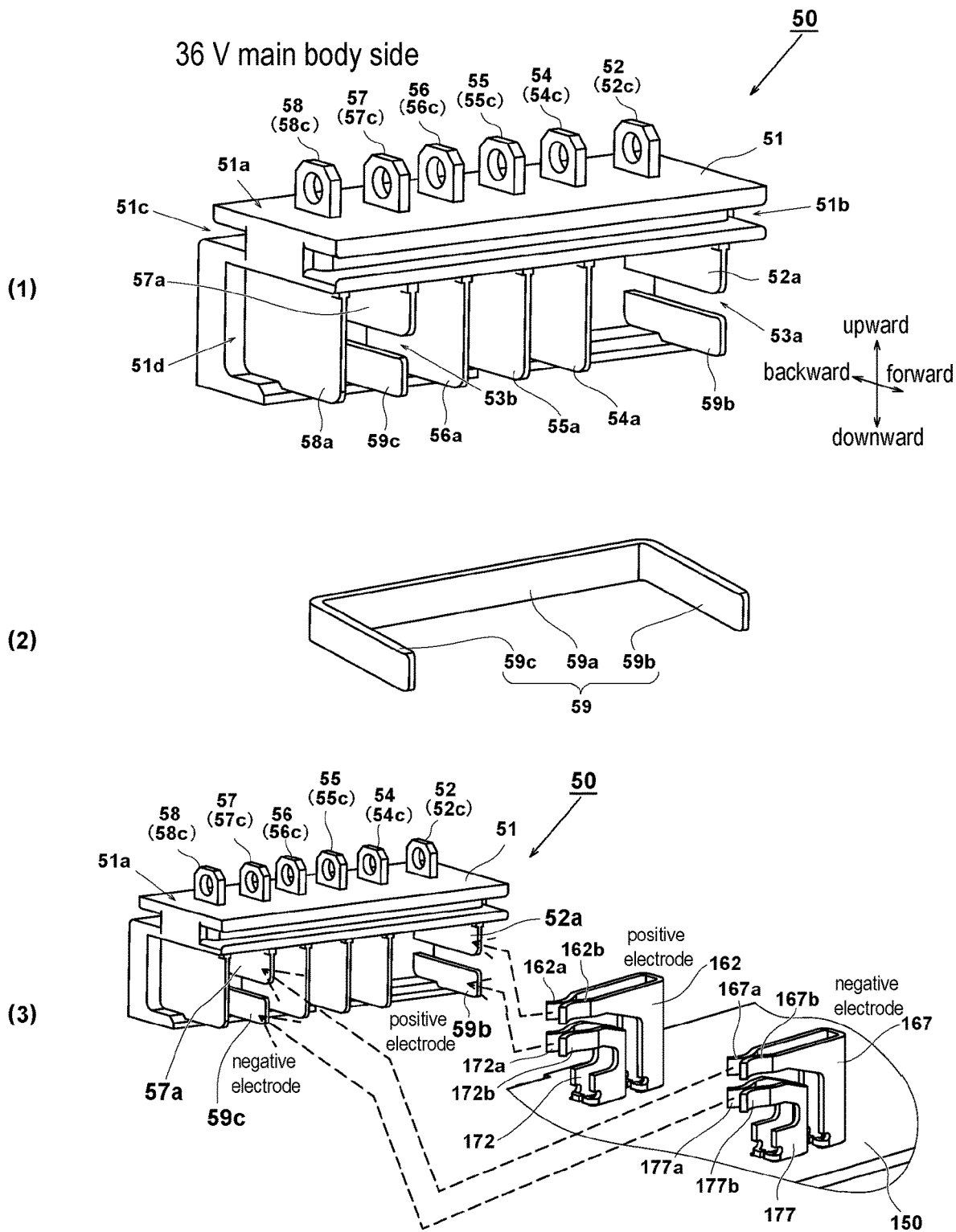

(1) of FIG. 9 is a perspective view of a terminal unit 50 of the power tool main body 30 according to this embodiment, (2) of FIG. 9 is a perspective view of a short bar 59 as a single body, and (3) of FIG. 9 is a diagram illustrating a method of connecting the terminal unit 50 and the power terminals of the battery pack 100.

Figure 10:
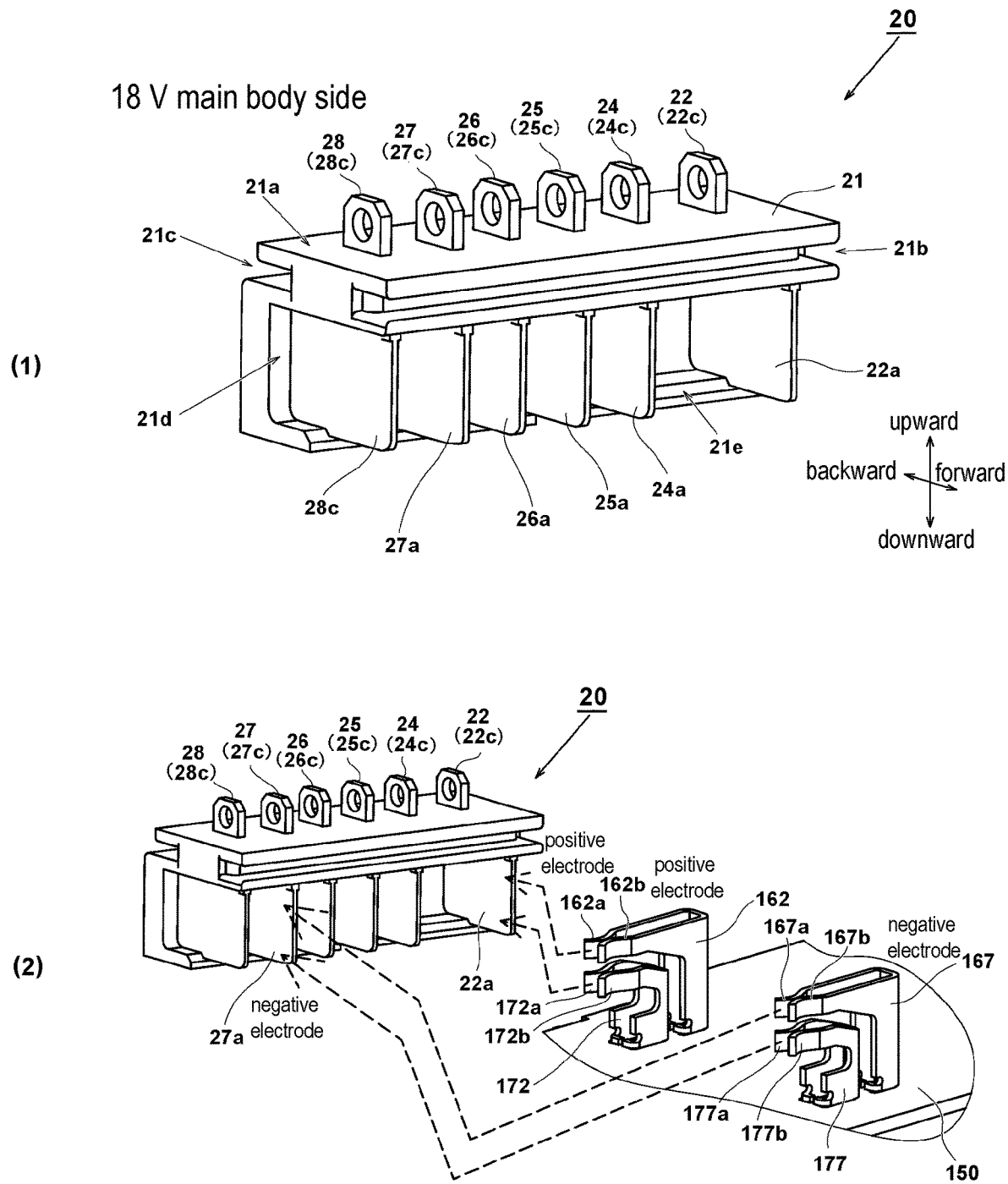

(1) of FIG. 10 is a perspective view of the terminal unit 20 of a conventional power tool main body 1, and (2) of FIG. 10 is a diagram illustrating a connection status between the terminal unit 20 and the power terminals of the battery pack 100.

Figure 11:
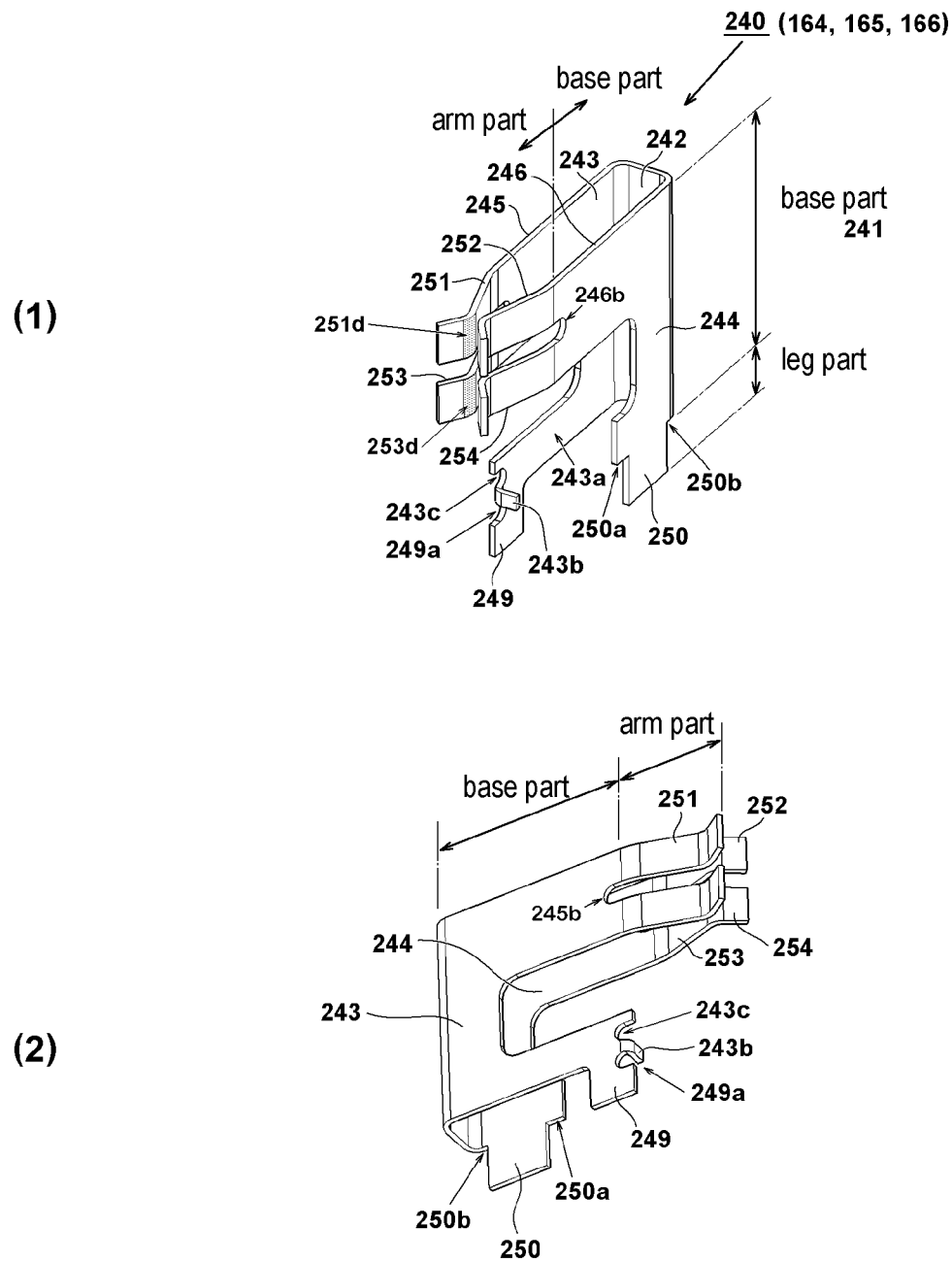

FIG. 11 is a diagram illustrating a single body shape of a signal terminal component 240 according to this embodiment, (1) of FIG. 11 is a perspective view seen from in front and above on the left side, and (2) of FIG. 11 is a perspective view seen from in front and below on the right side.

FIG. 12 is a diagram illustrating a status of a plurality of signal terminal components 240 fixed to a circuit board 150, (1) of FIG. 12 is a view seen from the front side, (2) of FIG. 12 is a diagram of a signal terminal component 240 seen from the left side, and (3) of FIG. 12 is a bottom view seen from the side below (1) of FIG. 12.

Figure 5:
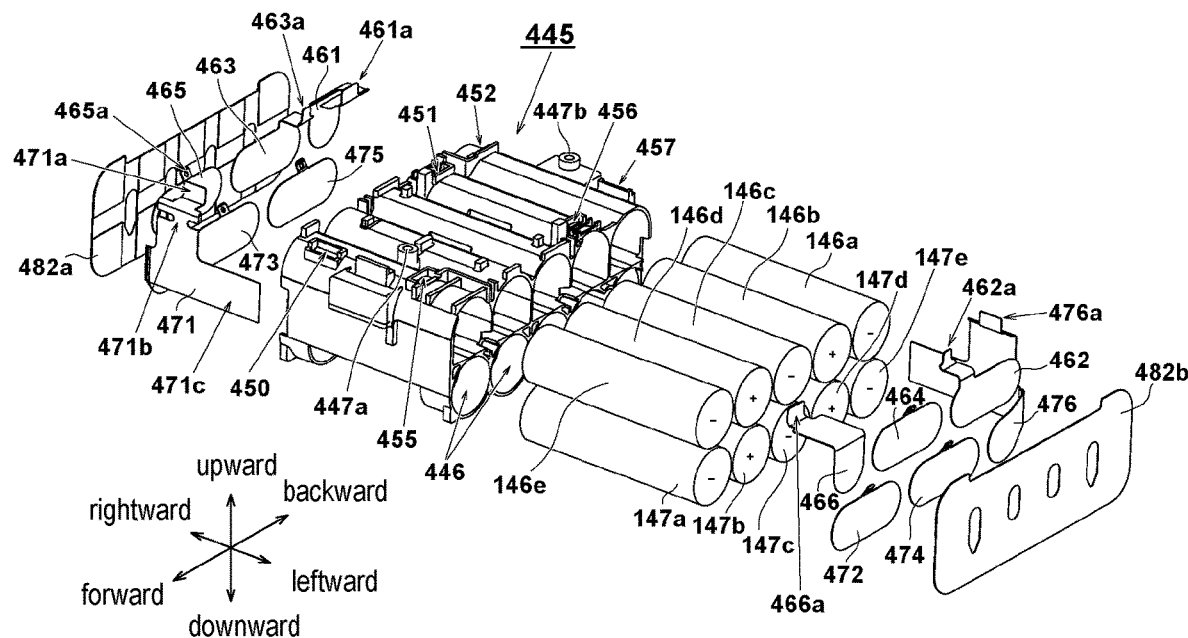
FIG. 5 is an exploded perspective view illustrating a stack status and a wiring method of battery cells using a separator 445 illustrated in FIG. 4.
Figure 13:
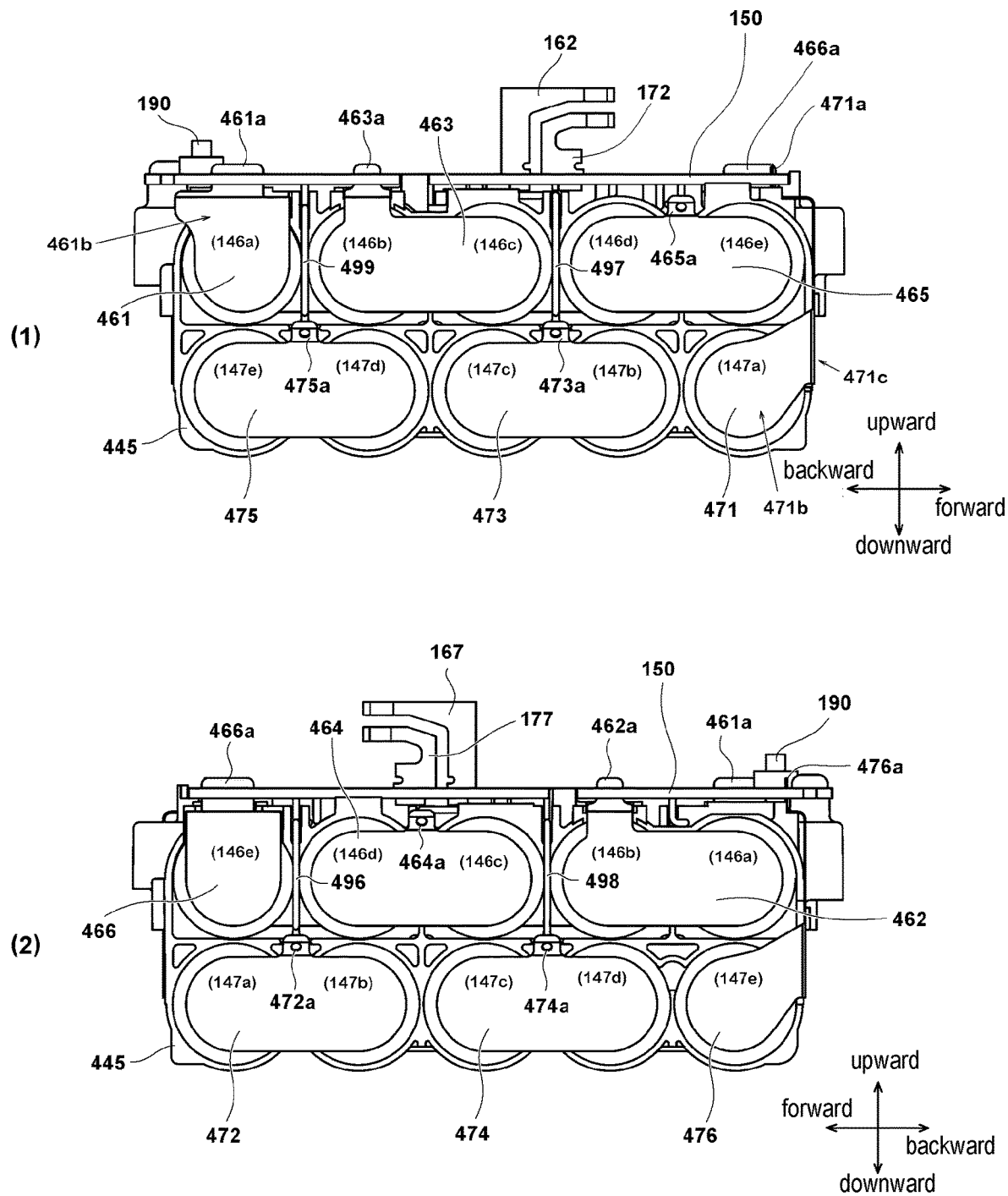

FIG. 13 is a side view of a separator 445 after the components illustrated in FIG. 5 are assembled, (1) of FIG. 13 is a right side view, and (2) of FIG. 13 is a left side view.

Figure 14:
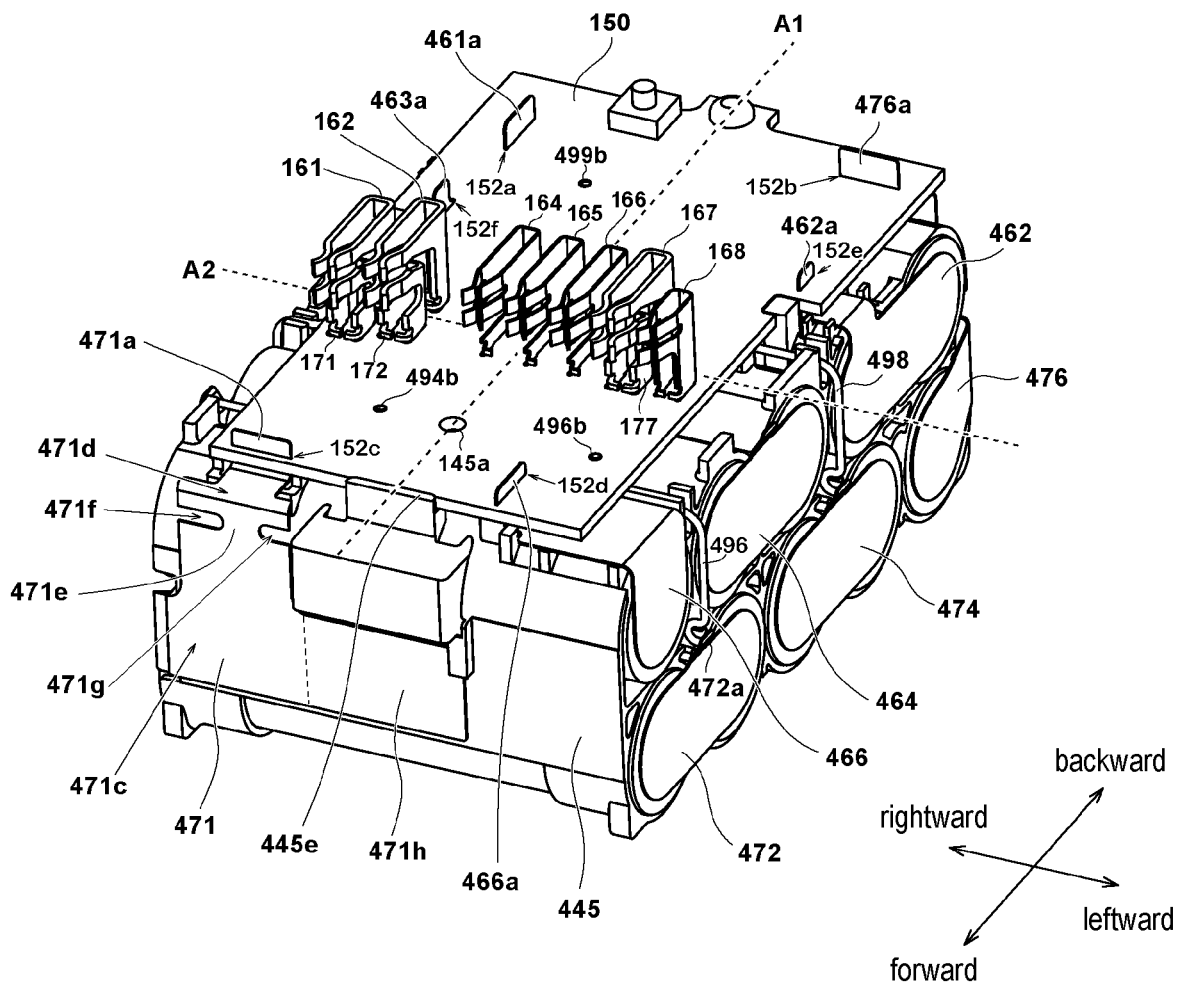

FIG. 14 is a perspective view illustrating a state in which the circuit board 150 is fixed to the separator 445 (a perspective view seen from the left front upper side).

Figure 15:
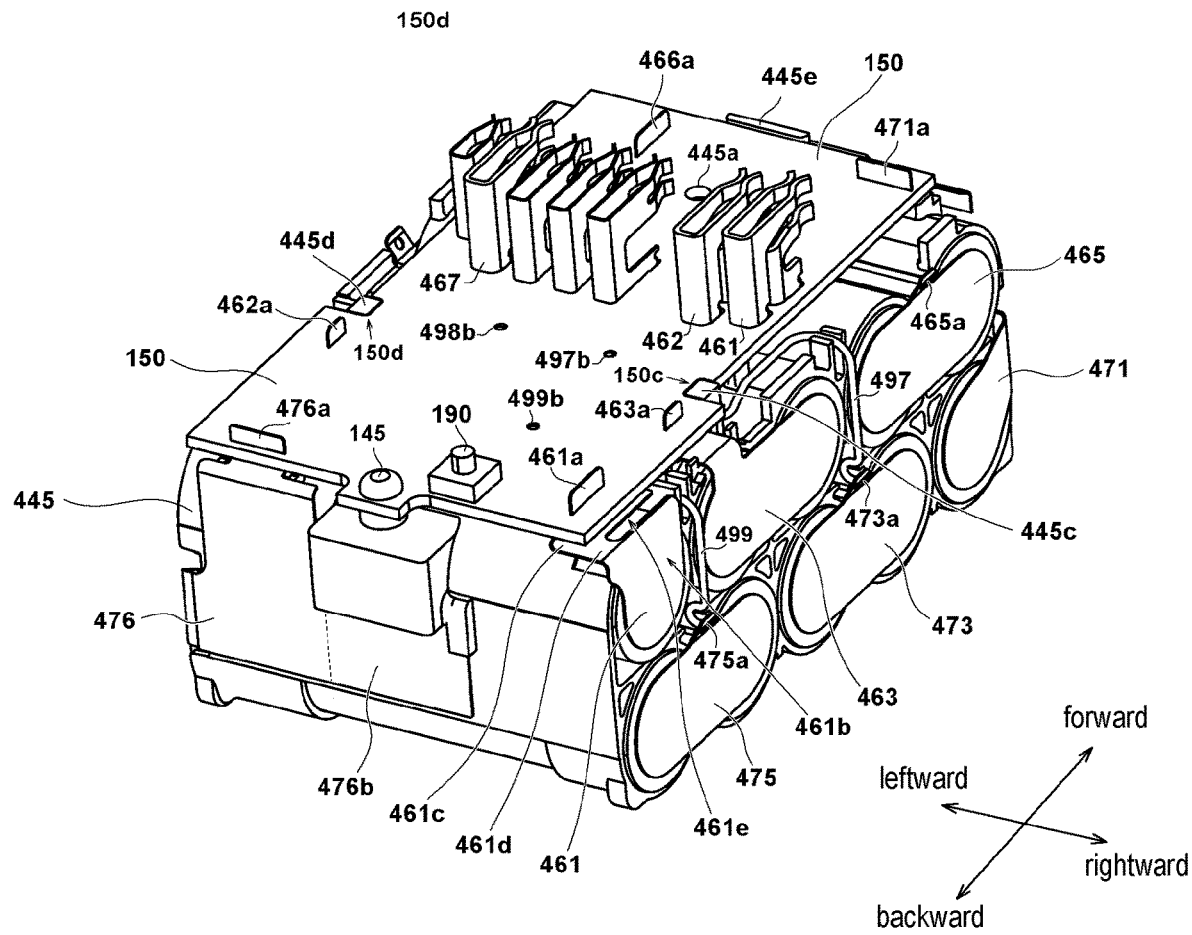

FIG. 15 is a perspective view illustrating a state in which the circuit board 150 is fixed to the separator 445 (a perspective view seen from behind and above on the right side).

Figure 16:
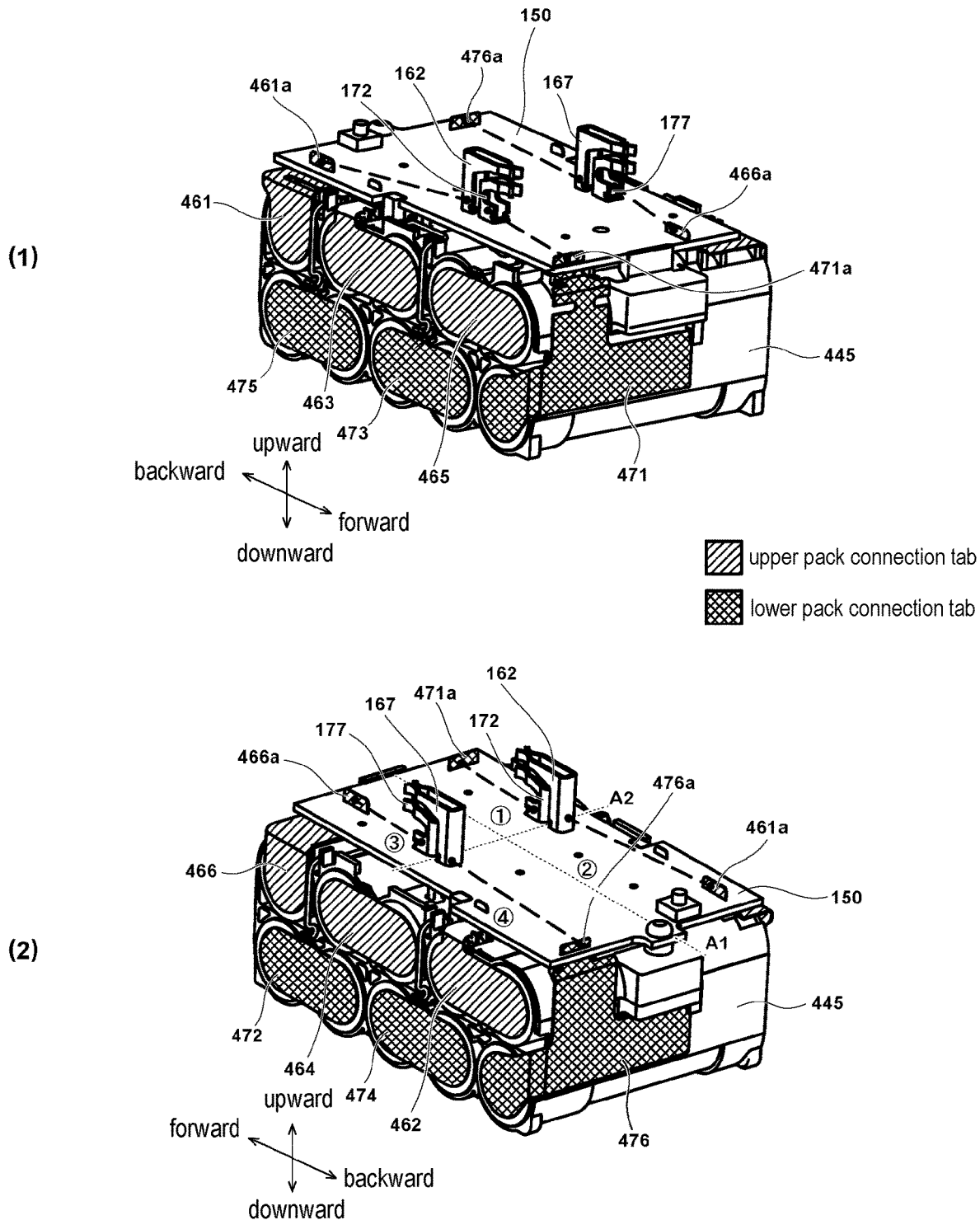

FIG. 16 is a diagram illustrating a method of connecting drawing plates 461, 466, 471, and 476 of the battery pack 100 to positive electrode terminals 162 and 172 and negative electrode terminals 167 and 177.

Figure 17:
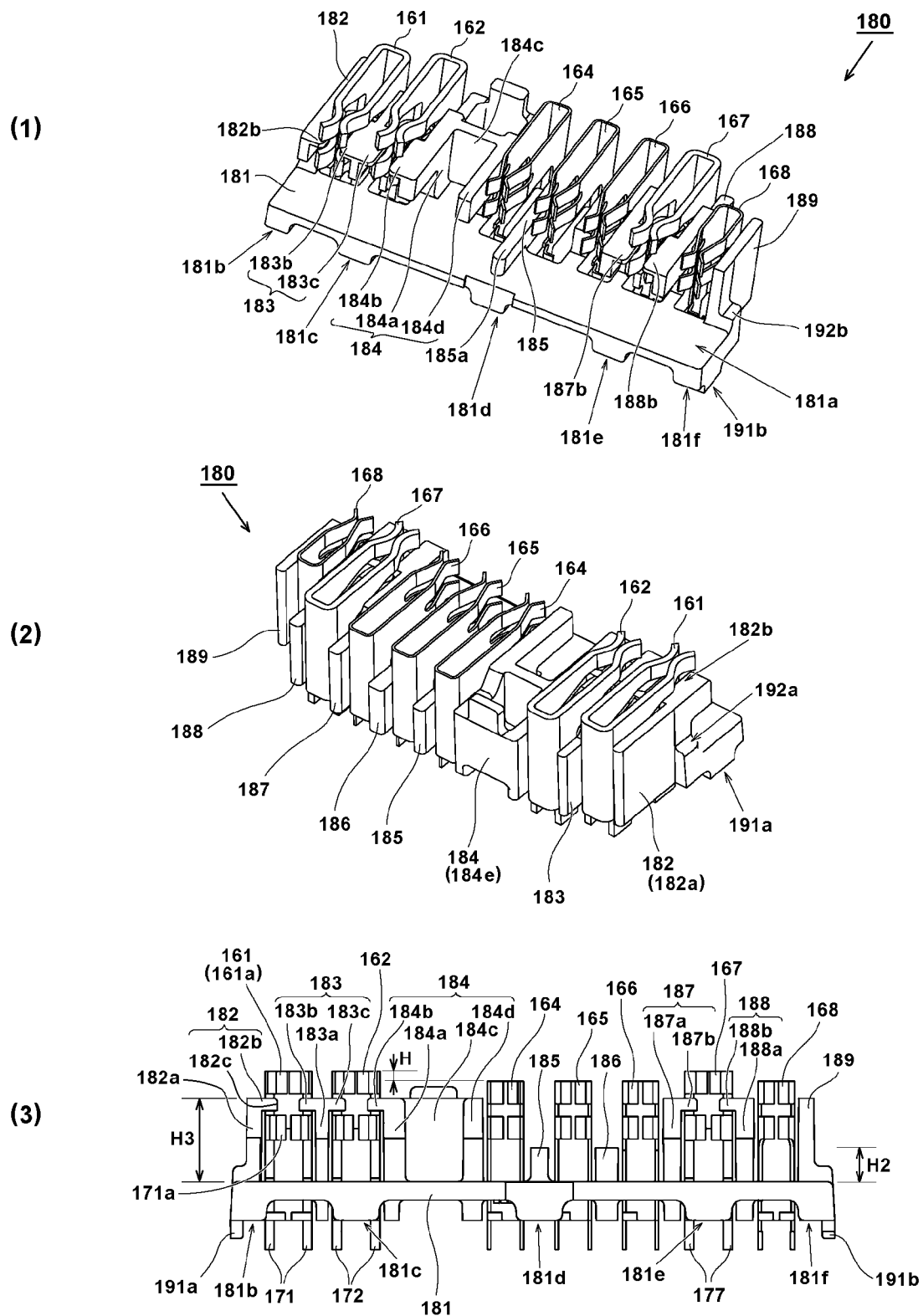

FIG. 17 is a diagram illustrating a connection terminal group illustrated in FIG. 15 and a board cover 180 disposed on the periphery thereof, (1) of FIG. 17 is a perspective view seen from the left front upper side, and (2) of FIG. 17 is a perspective view seen from the right rear upper side, and (3) of FIG. 17 is a front view.

Figure 18:
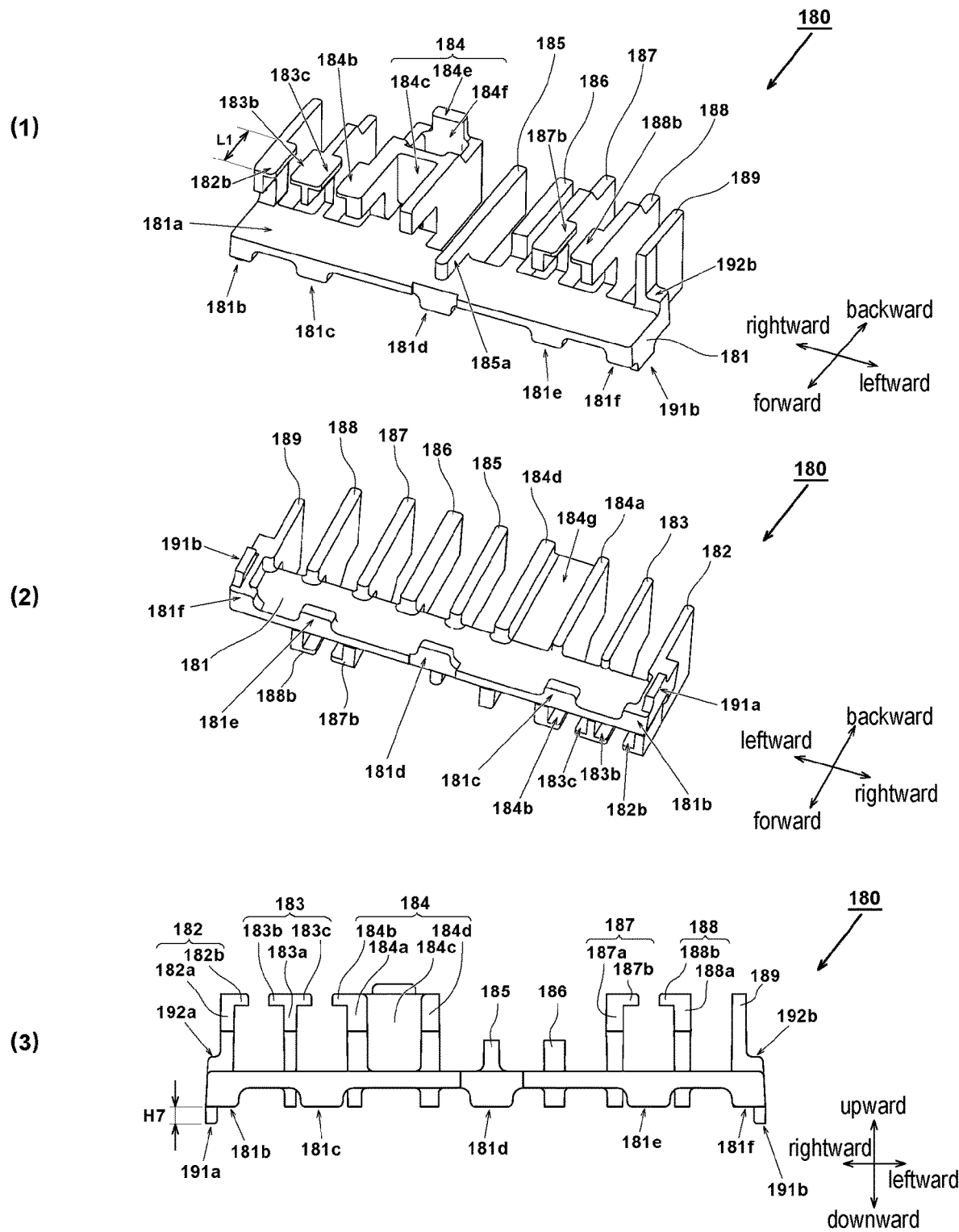

FIG. 18 is a diagram illustrating the board cover 180 as a single body illustrated in FIG. 17, (1) of FIG. 18 is a perspective view seen from the left front upper side, (2) of FIG. 18 is a perspective view seen from the right front lower side, and (3) of FIG. 18 is a front view.

FIG. 19 is a diagram illustrating the connection terminal group illustrated in FIG. 15 and the board cover 180 disposed on the periphery thereof, (1) of FIG. 19 is a top view, and (2) of FIG. 19 is a rear view.

FIG. 20 is a diagram illustrating the connection terminal group illustrated in FIG. 15 and the board cover 180 disposed on the periphery thereof, (1) of FIG. 20 is a right-side view, and (2) of FIG. 20 is a left-side view.

Figure 21:
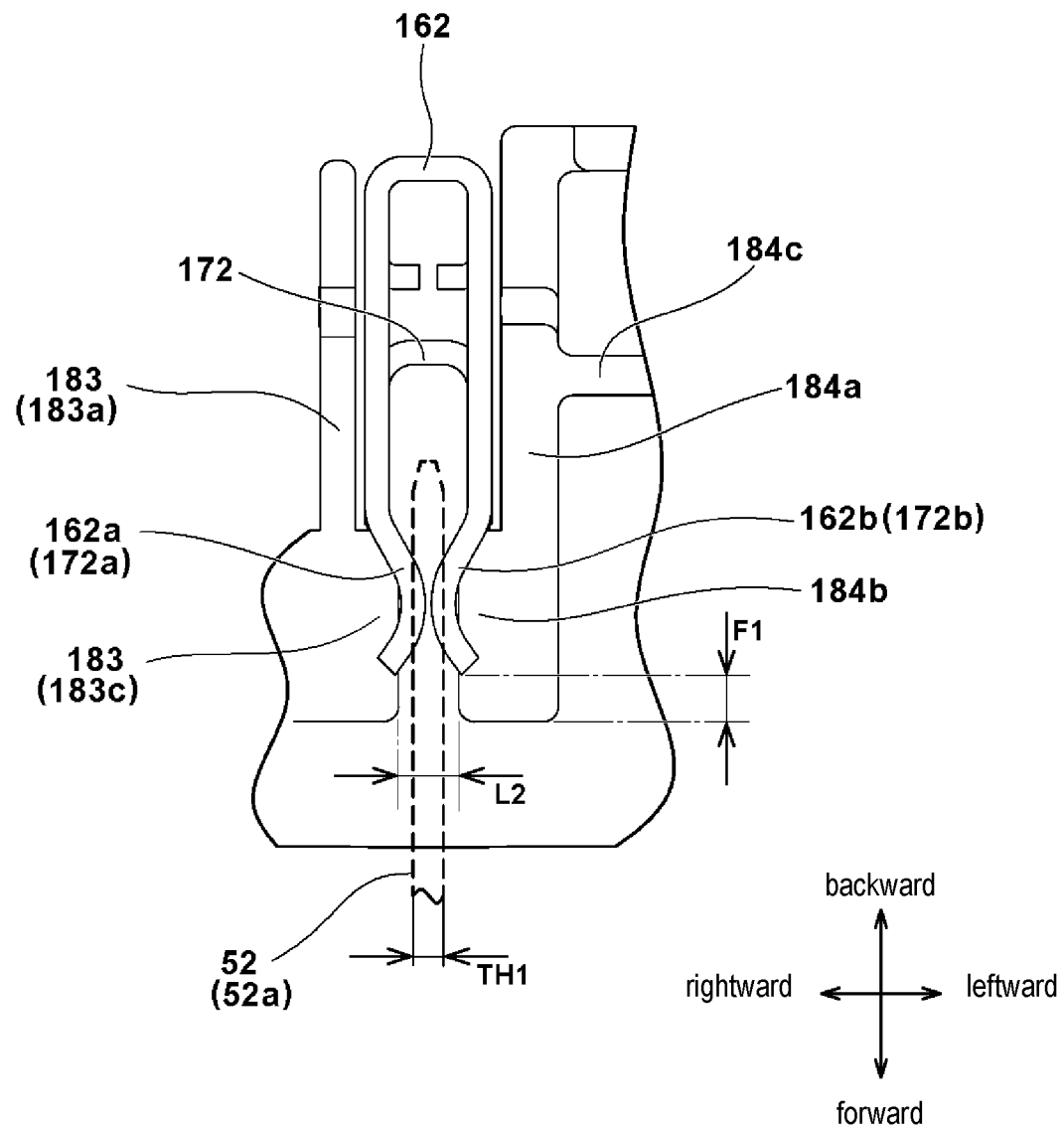

FIG. 21 is a diagram illustrating a status in which apparatus-side terminals are inserted into the board cover 180.

Figure 3:
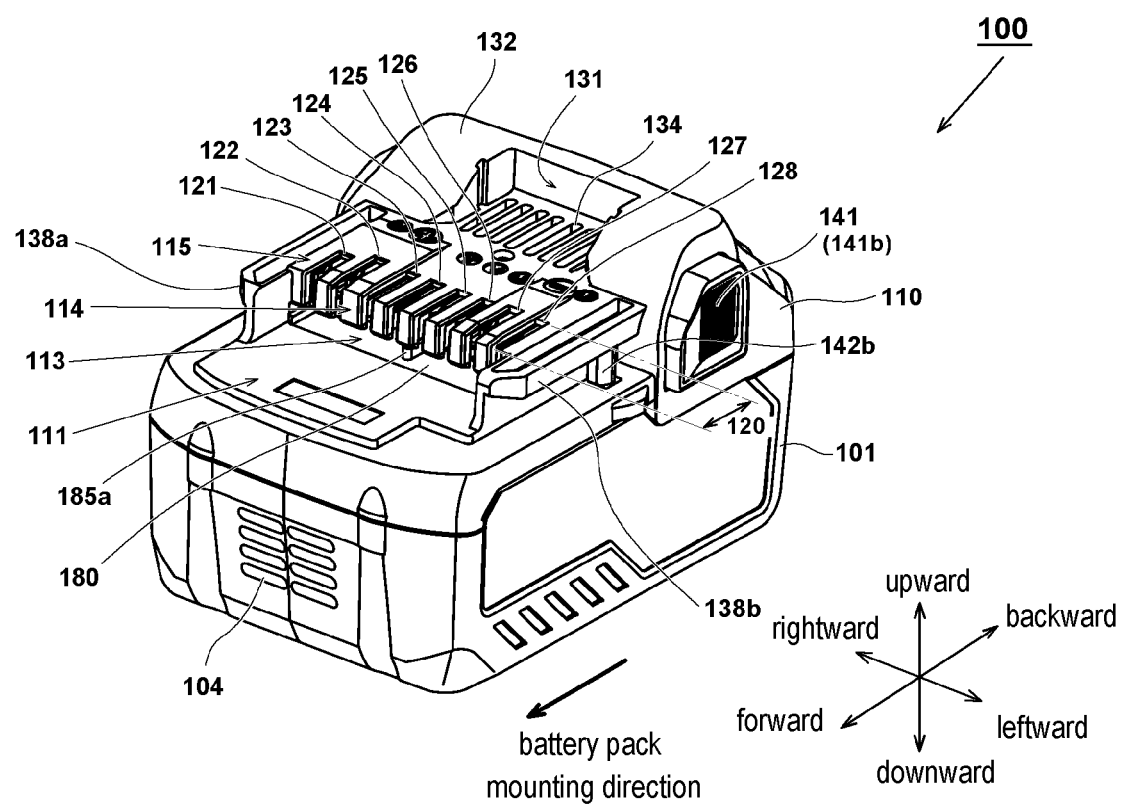
FIG. 3 is a perspective view of a battery pack 100 according to an embodiment of the present invention.

(1) of FIG. 22 is a perspective view of an upper casing 110 illustrated in FIGS. 3, and (2) of FIG. 22 is an arrow view of a board cover 180 and a terminal unit seen in a direction of an arrow B illustrated in (1) of FIG. 22.

Figure 23:
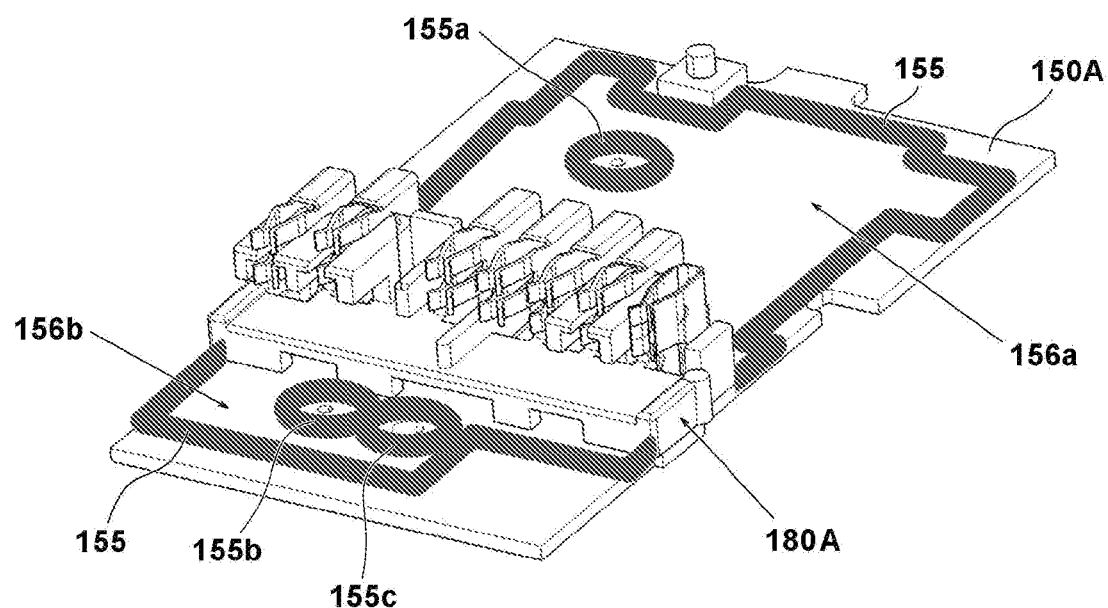

FIG. 23 is a diagram illustrating a method of coating the circuit board 150 with a resin.

(1) of FIG. 24 and (2) of FIG. 24 are perspective views illustrating a terminal unit 200 according to a second embodiment of the present invention.

Figure 25:
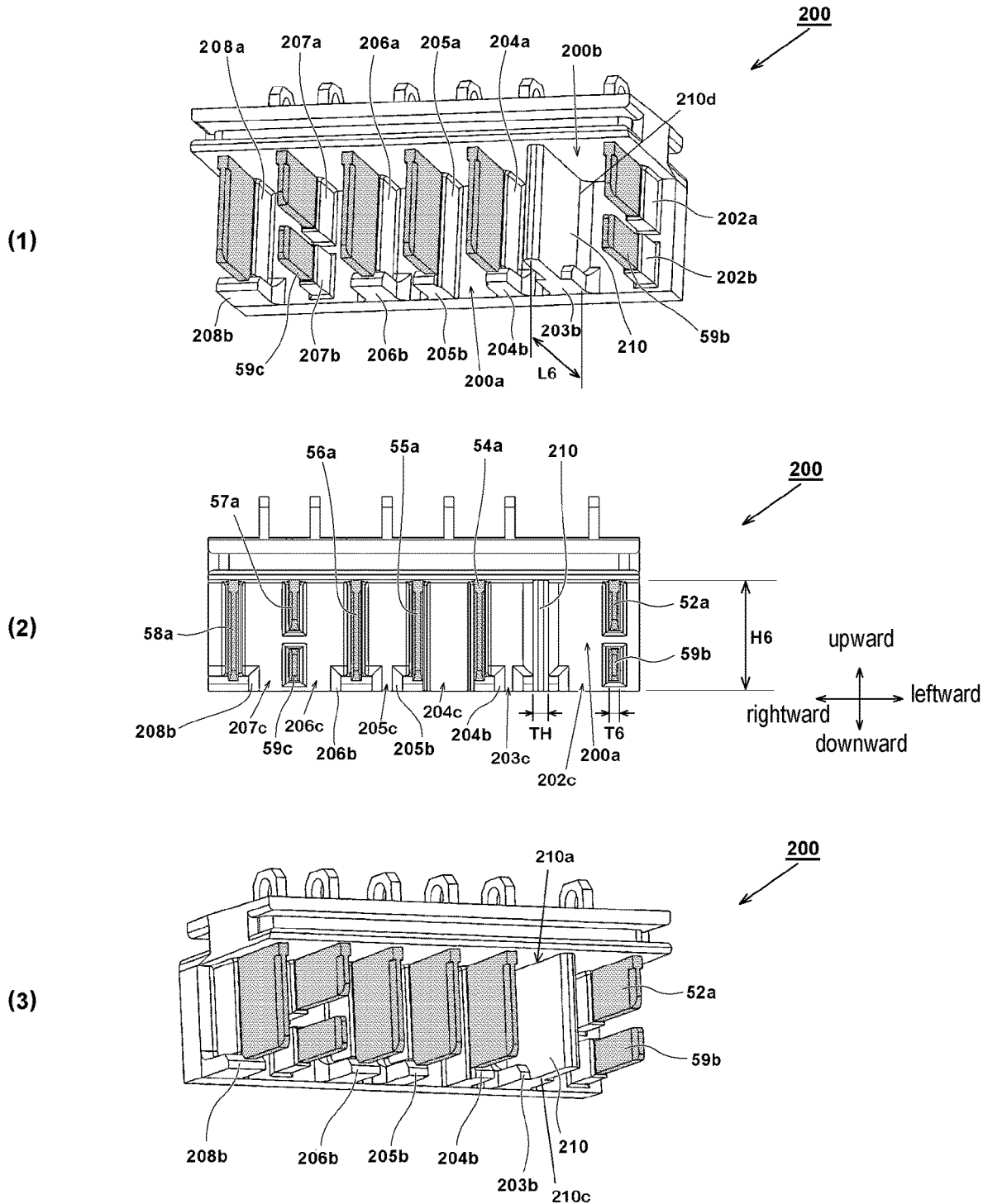

(1) of FIG. 25 and (3) of FIG. 25 are perspective views of the terminal unit 200 from different angles, and (2) of FIG. 25 is a front view thereof.

Figure 26:
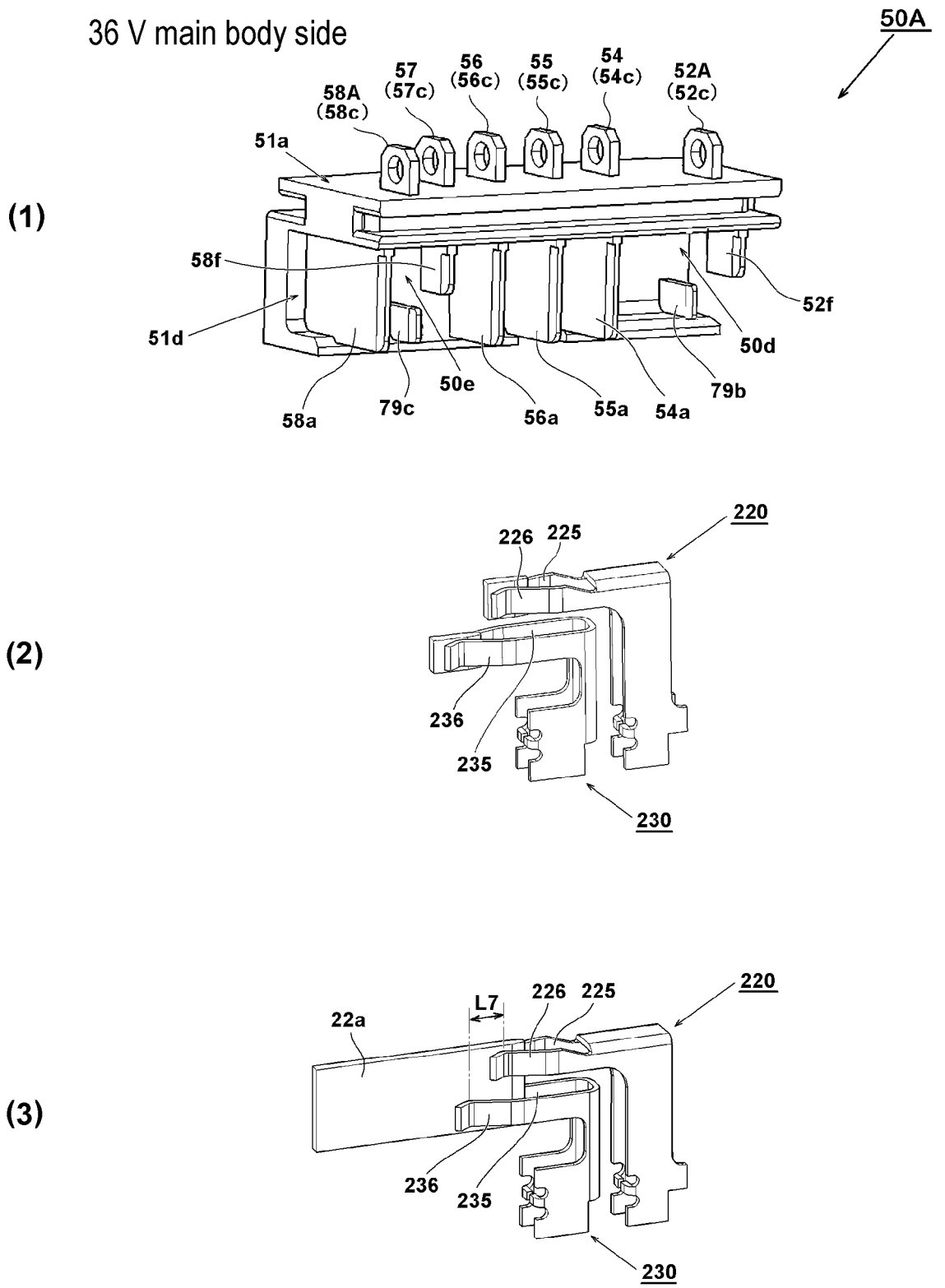

(1) of FIG. 26 is a perspective view of a terminal unit 50A according to a fourth embodiment of the present invention, and (2) of FIG. 26 and (3) of FIG. 26 are perspective views of a power terminal unit.

Figure 27:
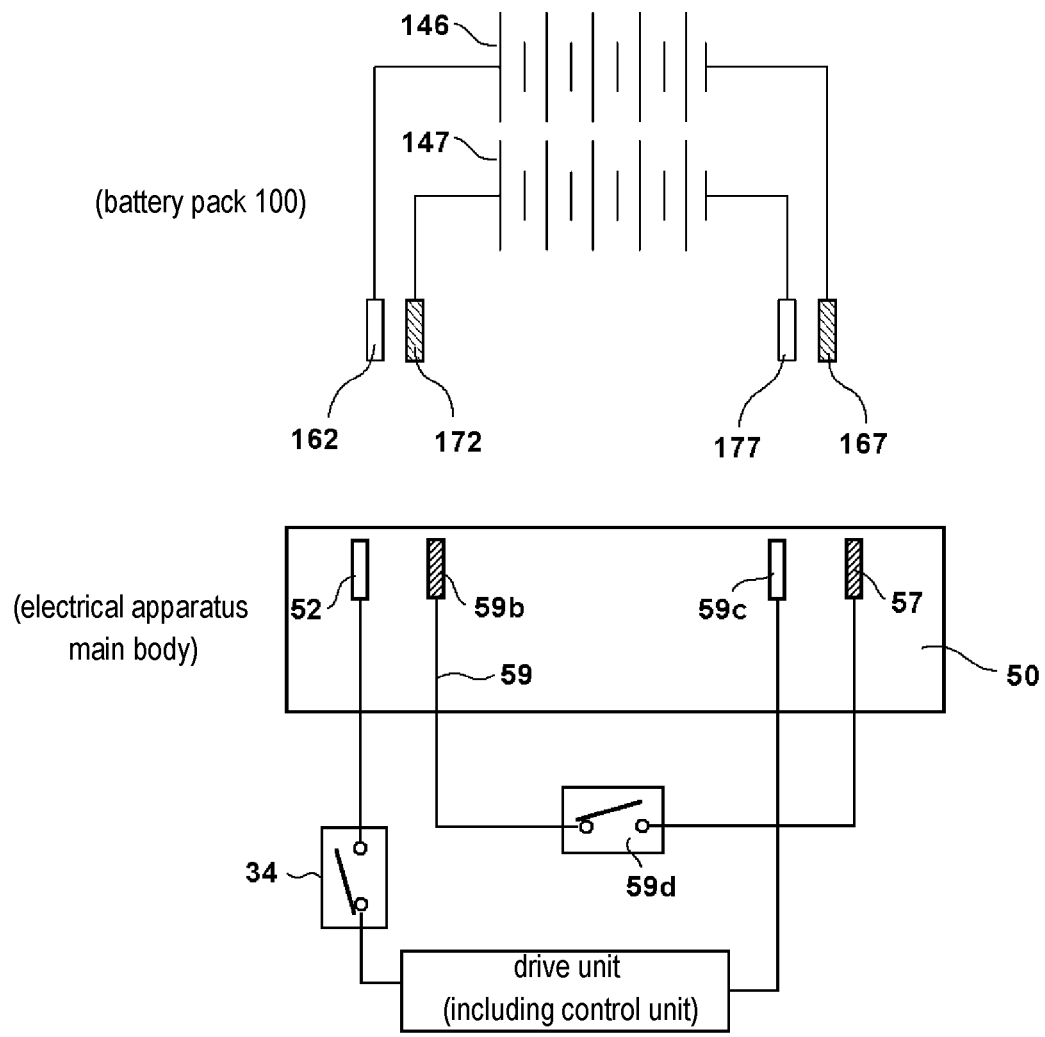

FIG. 27 is a schematic circuit diagram of a battery pack and an electrical apparatus main body according to a fourth embodiment of the present invention.

Figure 28:
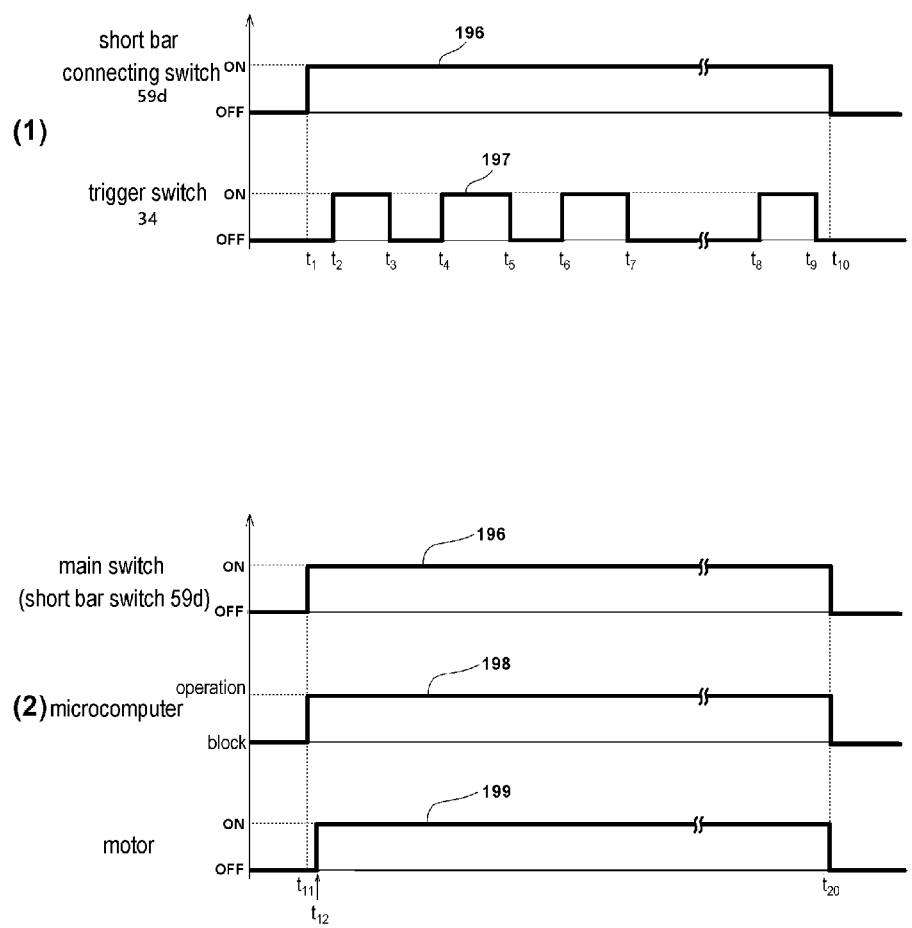

FIG. 28 is a diagram illustrating timings of an operation of the short bar connecting switch 59d illustrated in FIG. 27 and operations of a trigger switch 34 and a motor.

Figure 29:
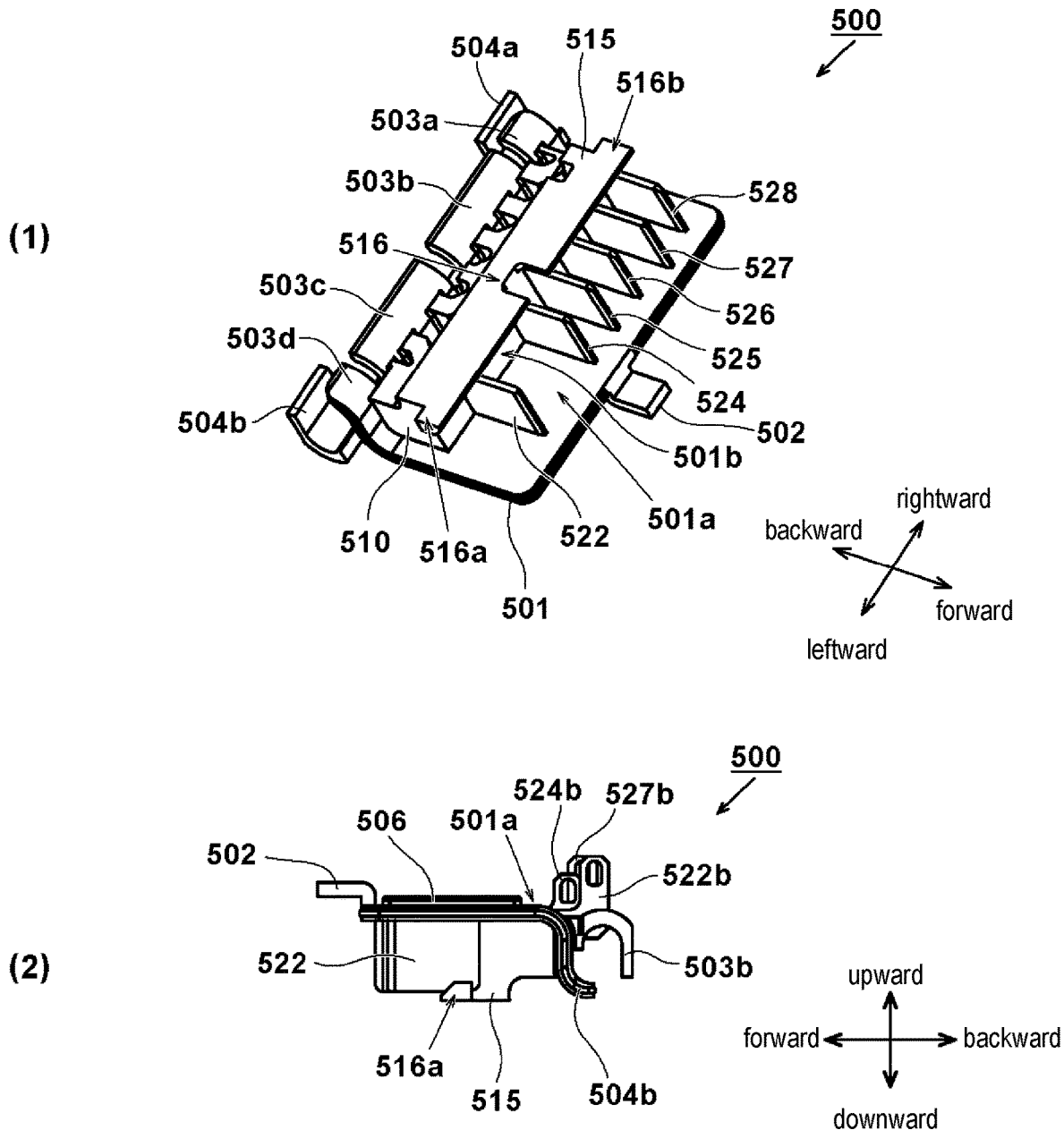

FIG. 29 is a diagram illustrating a terminal holder 500 for 18 V according to a fifth embodiment of the present invention, (1) of FIG. 29 is a perspective view, and (2) of FIG. 29 is a front view.

Figure 30:
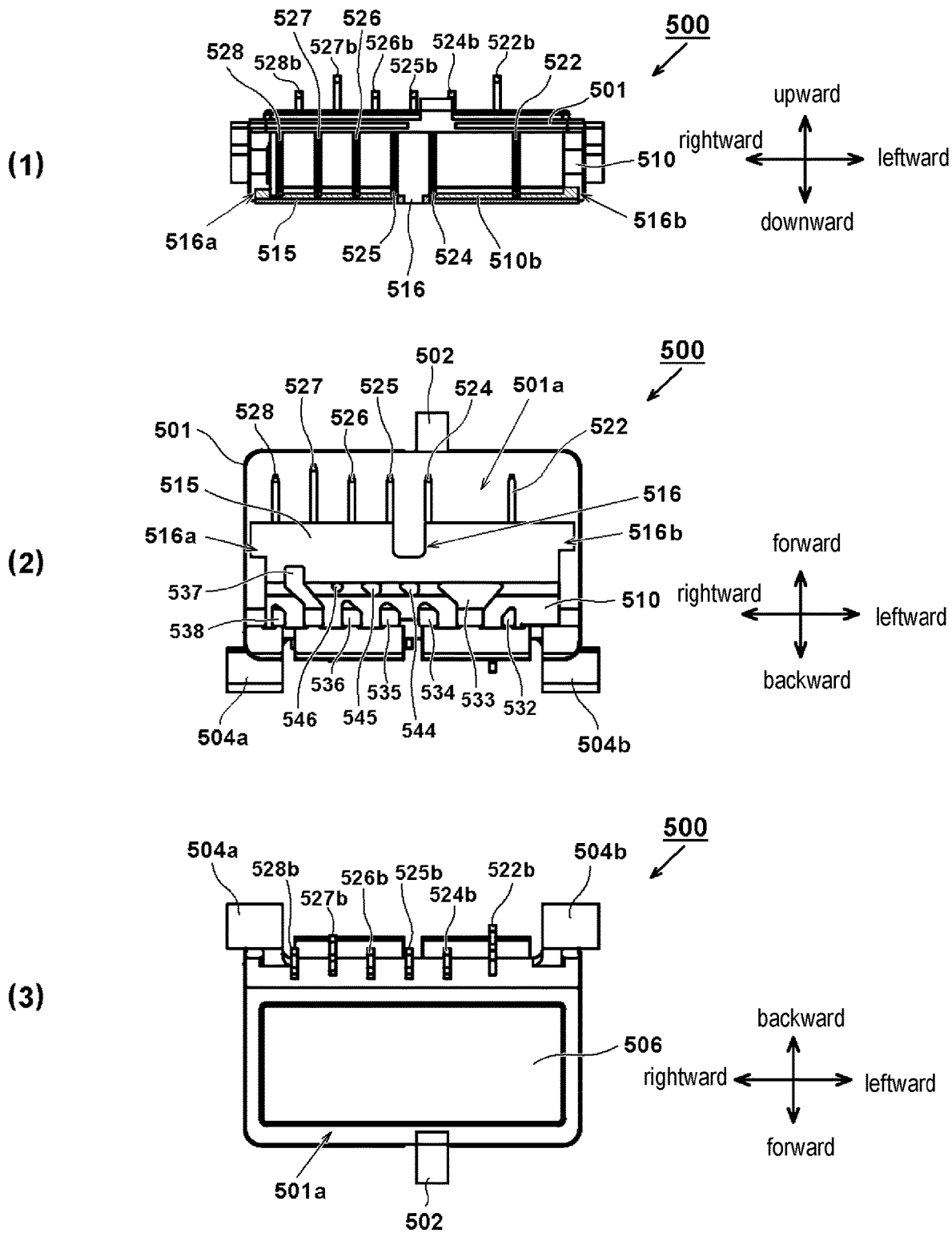

FIG. 30 is a diagram illustrating the terminal holder 500 illustrated in FIG. 29, (1) of FIG. 30 and (3) of FIG. 30 are perspective views, and (2) of FIG. 30 is a front view.

Figure 31:
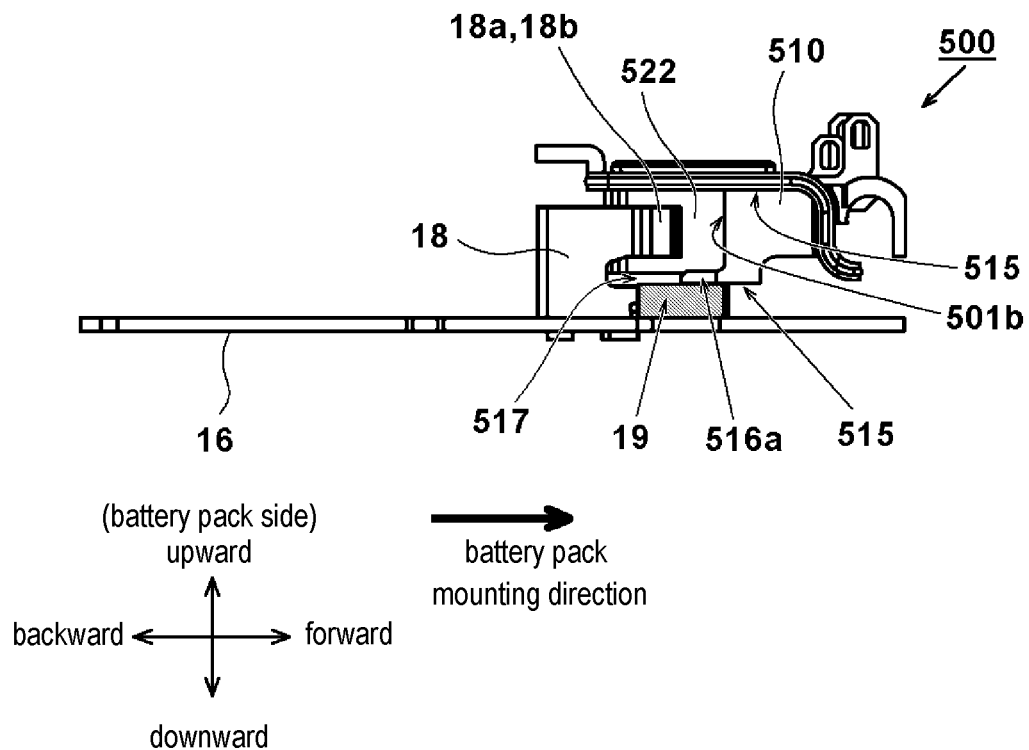

FIG. 31 is a partial side view illustrating a state in which the terminal holder 500 illustrated in FIG. 29 is connected to a conventional battery pack 15.

FIG. 32 is a diagram illustrating a shape of the terminal holder 550 for 36 V according to the fifth embodiment of the present invention, (1) of FIG. 32 is a perspective view seen from below, and (2) of FIG. 32 is a left side view.

Figure 33:
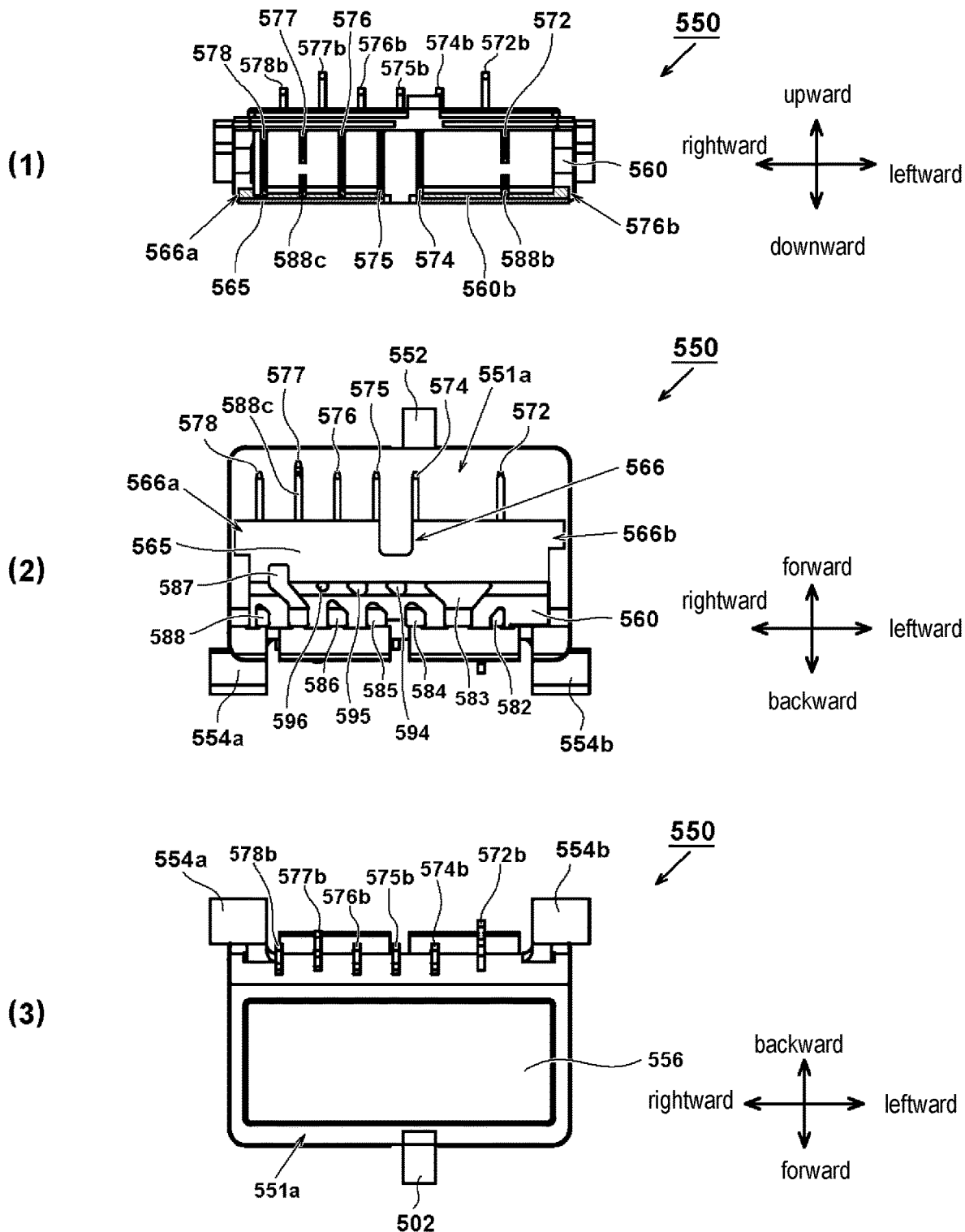

FIG. 33 is a diagram illustrating the terminal holder 550 illustrated in FIG. 32, (1) of FIG. 33 is a front view, (2) of FIG. 33 is a bottom view, and (3) of FIG. 33 is a top view.

(1) of FIG. 34 is a side view of the terminal holder 550 illustrated in FIGS. 32, and (2) of FIG. 34 is a side view in which illustration of a side wall part of the board cover 180 is omitted from (1) of FIG. 34.

Figure 35:
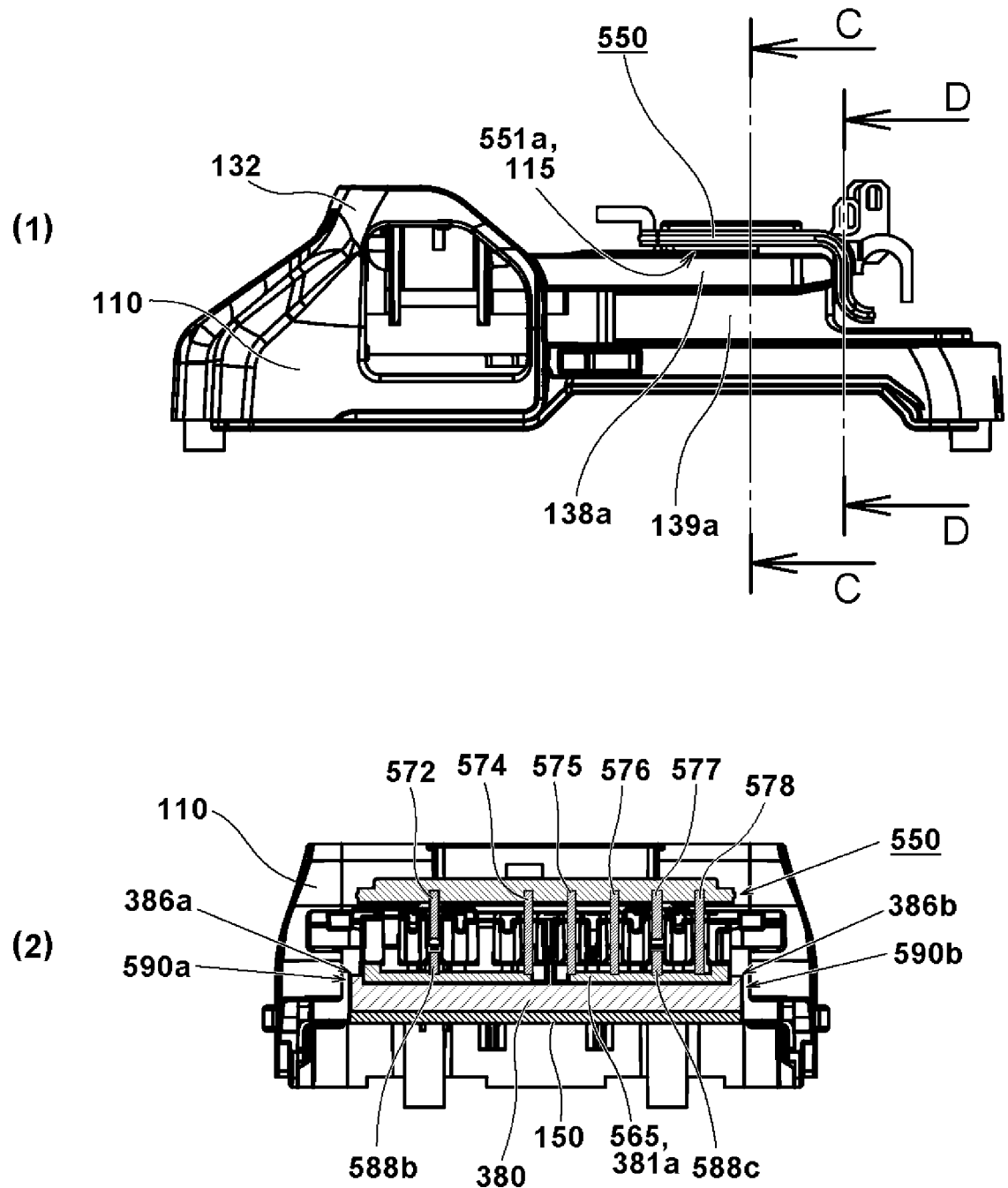

(1) of FIG. 35 is a right side view illustrating a state in which the terminal holder 550 is mounted in the battery pack 100, and (2) of FIG. 35 is a cross-sectional view of a part C-C illustrated in (1) of FIG. 35.

Figure 36:
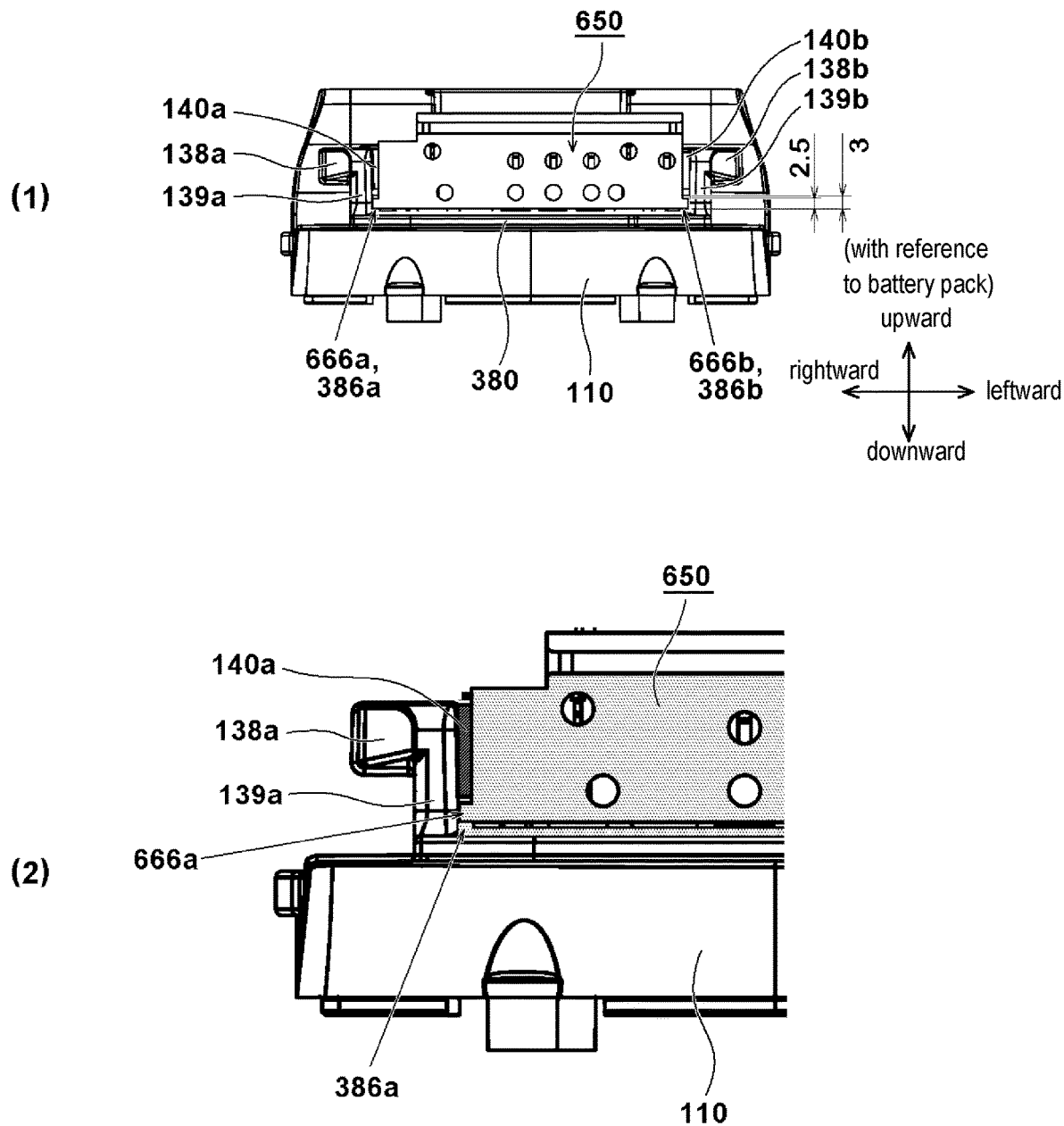

FIG. 36 is a diagram illustrating a terminal unit 650 according to a modified example of the fifth embodiment, (1) of FIG. 36 is a cross-sectional view of a part corresponding to a part D-D illustrated in FIGS. 35, and (2) of FIG. 36 is a partially enlarged view of (1) of FIG. 36.

Figure 37:
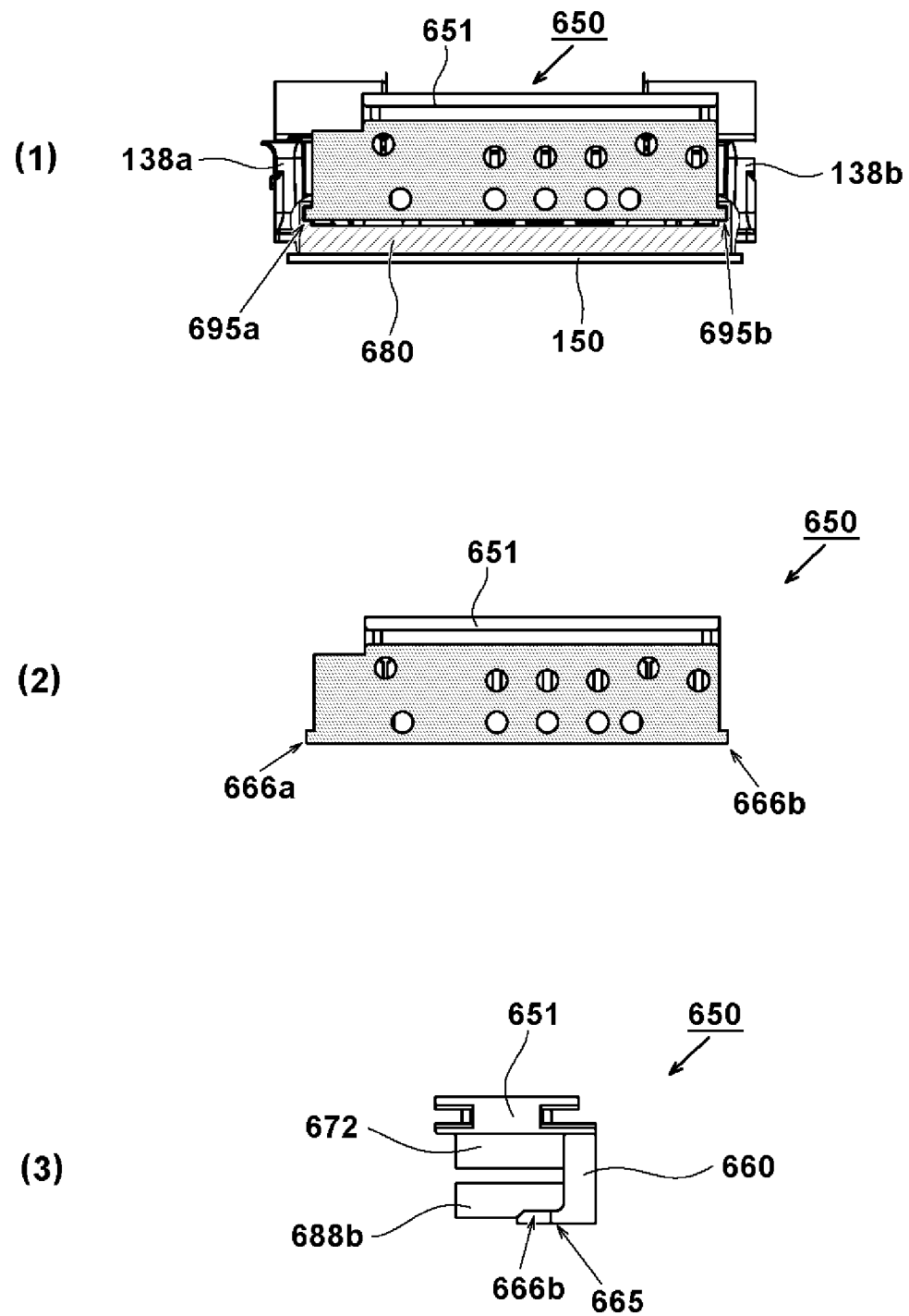

FIG. 37 is a diagram illustrating a modified example in which the terminal unit 650 illustrated in FIG. 36 is fixed to a board cover 680, (1) of FIG. 37 is a cross-sectional view of a part corresponding to the part D-D illustrated in FIG. 35, (2) of FIG. 37 is a diagram of the terminal unit 650 illustrated in (1) of FIG. 37 as a single body, and (3) of FIG. 37 is a left side view of the terminal unit 650.

Figure 38:
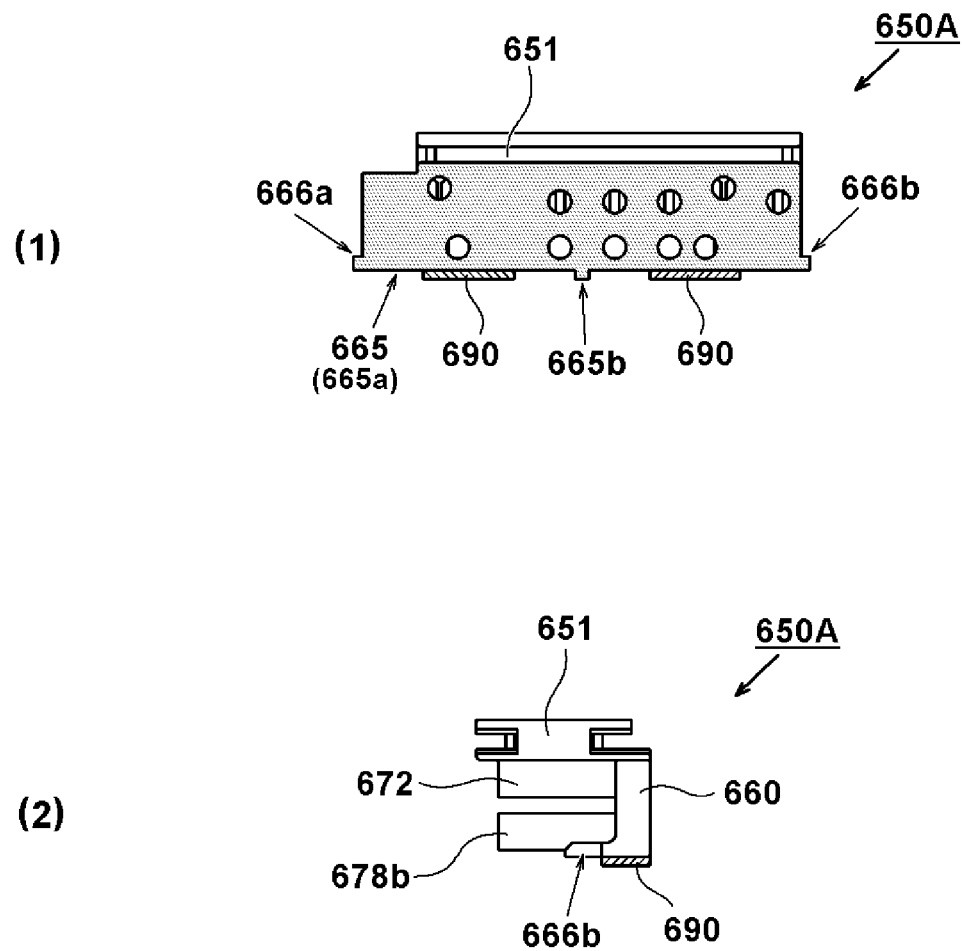

(1) of FIG. 38 is a modified example of the terminal unit 650 illustrated in FIGS. 36, and (2) of FIG. 38 is a left side view of the terminal unit 650.

Figure 39:
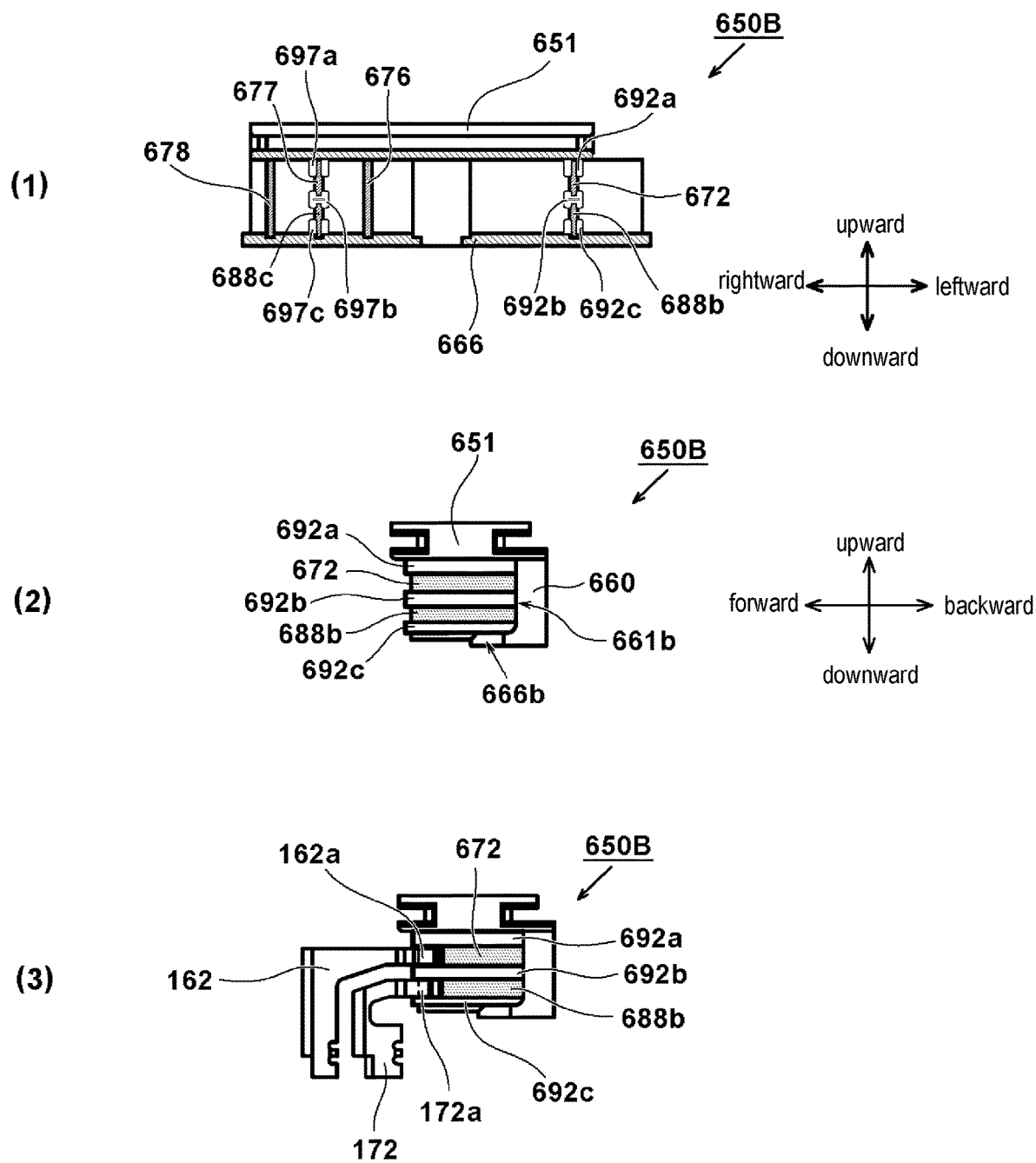

FIG. 39 is a diagram illustrating a terminal unit 650B according to another modified example of the fifth embodiment, (1) of FIG. 39 is a front view, (2) of FIG. 39 is a left side view, and (3) of FIG. 39 is a left side view of the terminal unit 650B that is in the state of being fitted to connection terminals of the battery pack 100 side.

Figure 40:
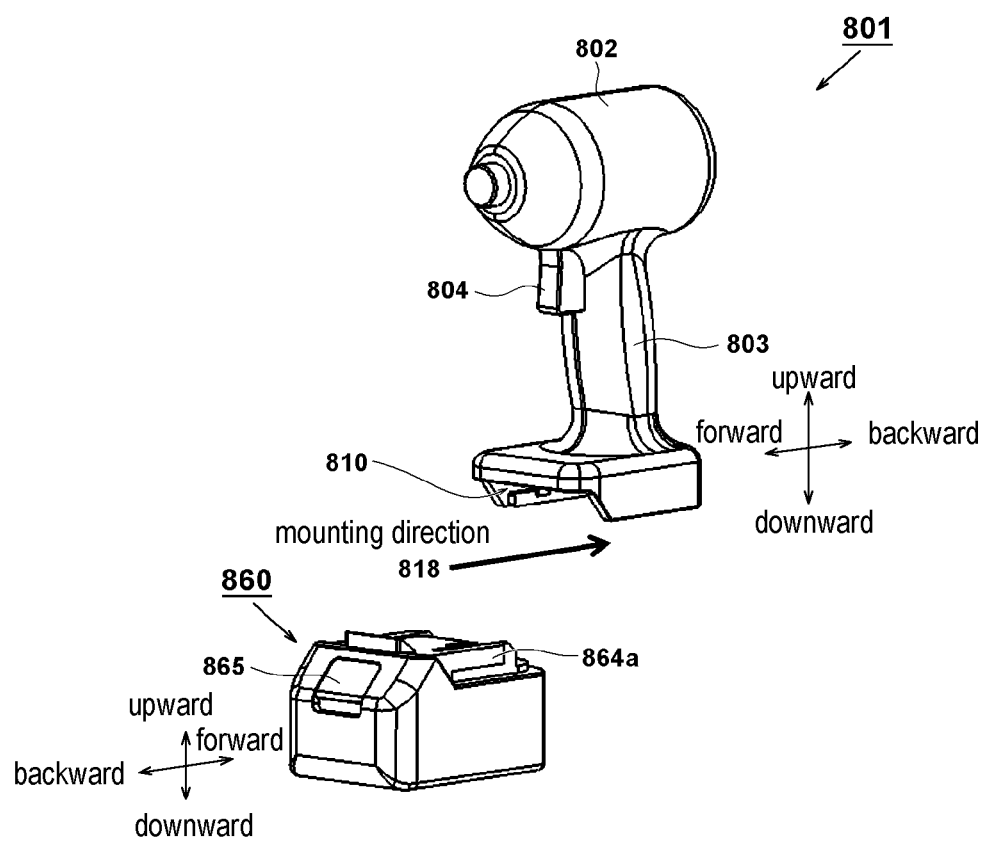

FIG. 40 is a perspective view illustrating a mounting status of a battery pack 860 of a power tool according to a sixth embodiment.

Figure 41:
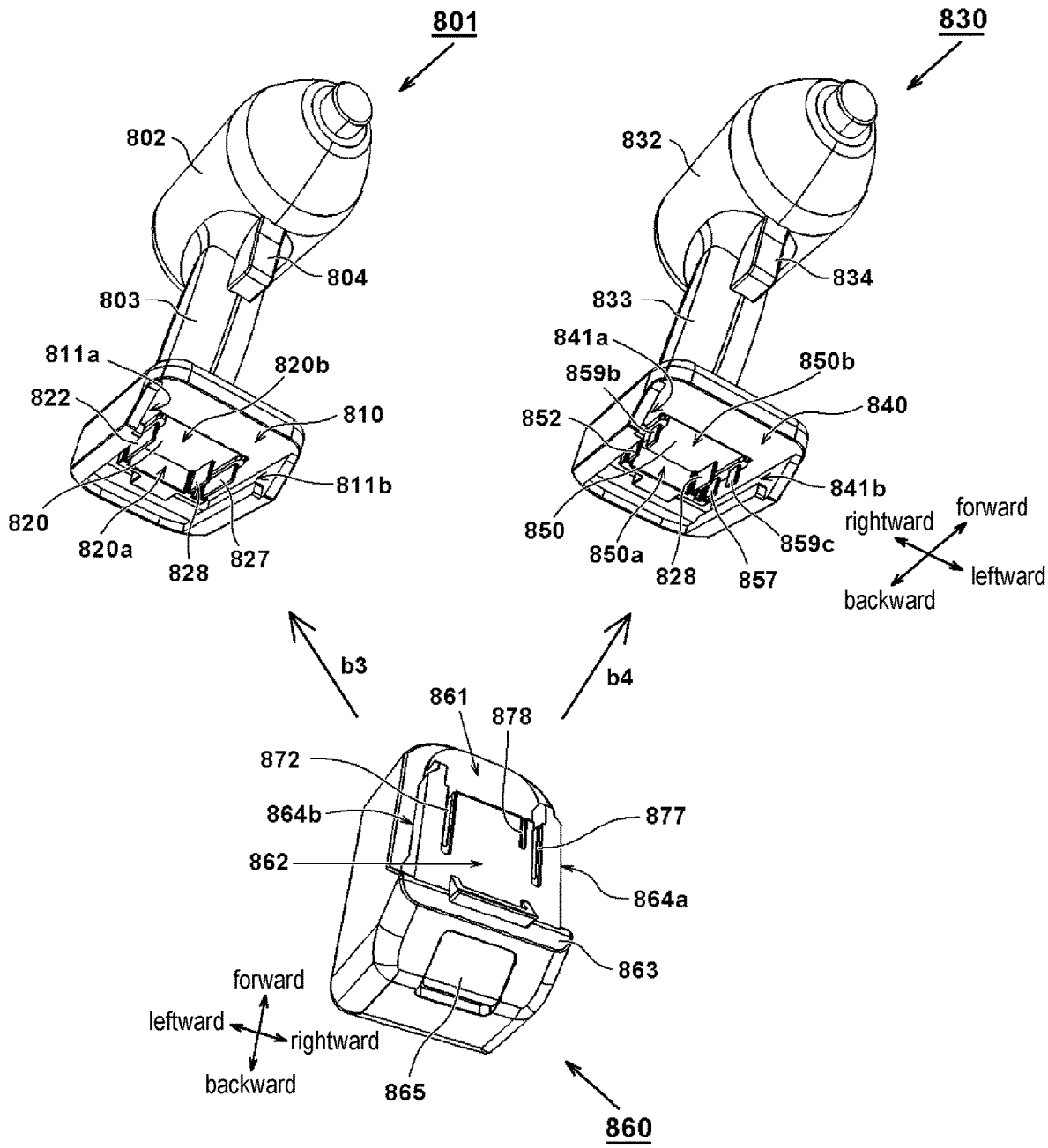

FIG. 41 is a diagram illustrating a mounting status of the battery pack according to the sixth embodiment in a power tool.

Figure 42:
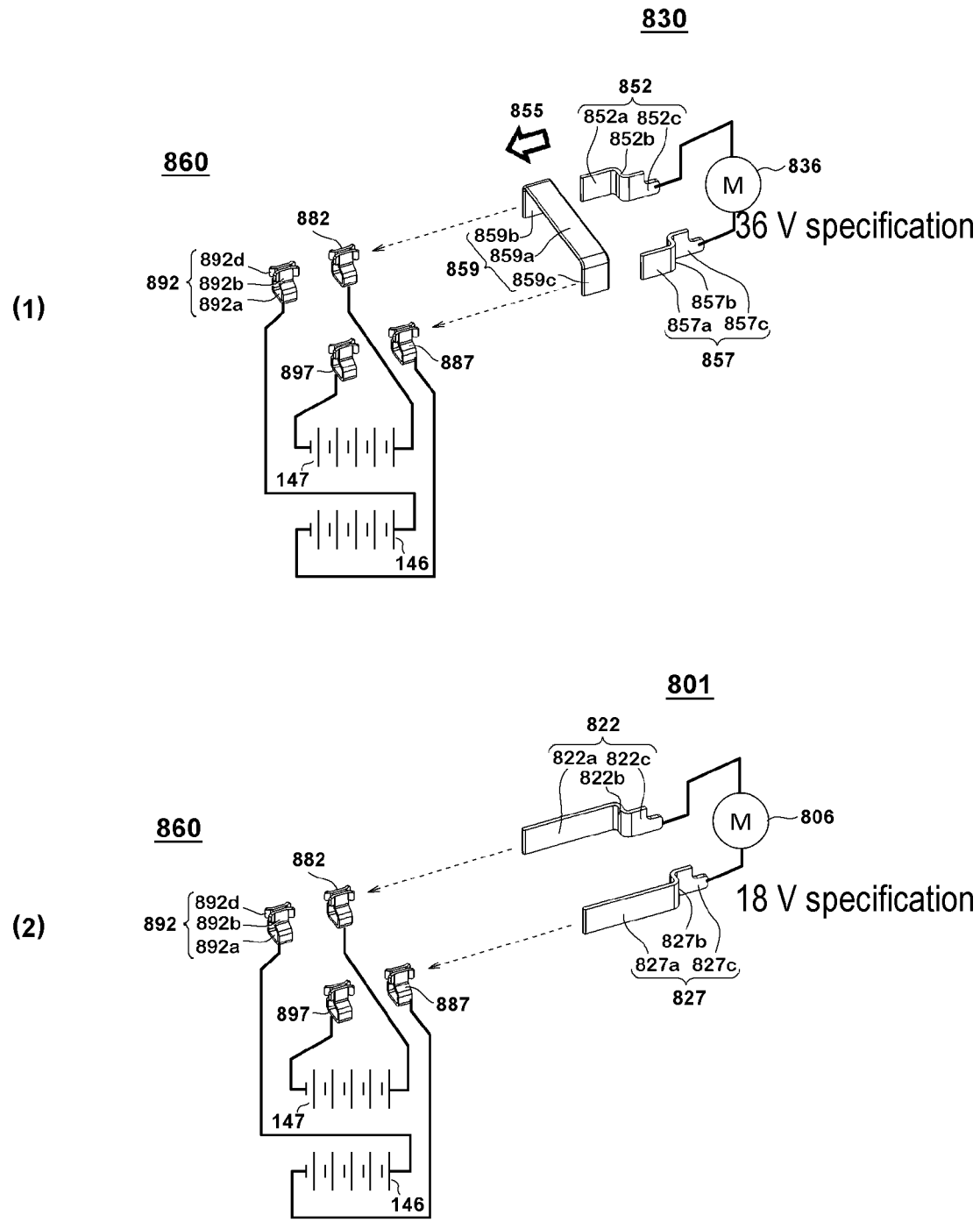

FIG. 42 is a perspective view illustrating a connection state of power terminals for a power tool main body, (1) of FIG. 42 illustrates a state in which the battery pack 860 is mounted in a power tool main body 801 for 18 V, and (2) of FIG. 42 illustrates a state in which the battery pack 860 is mounted in a power tool main body 830 for 36 V.

Figure 43:
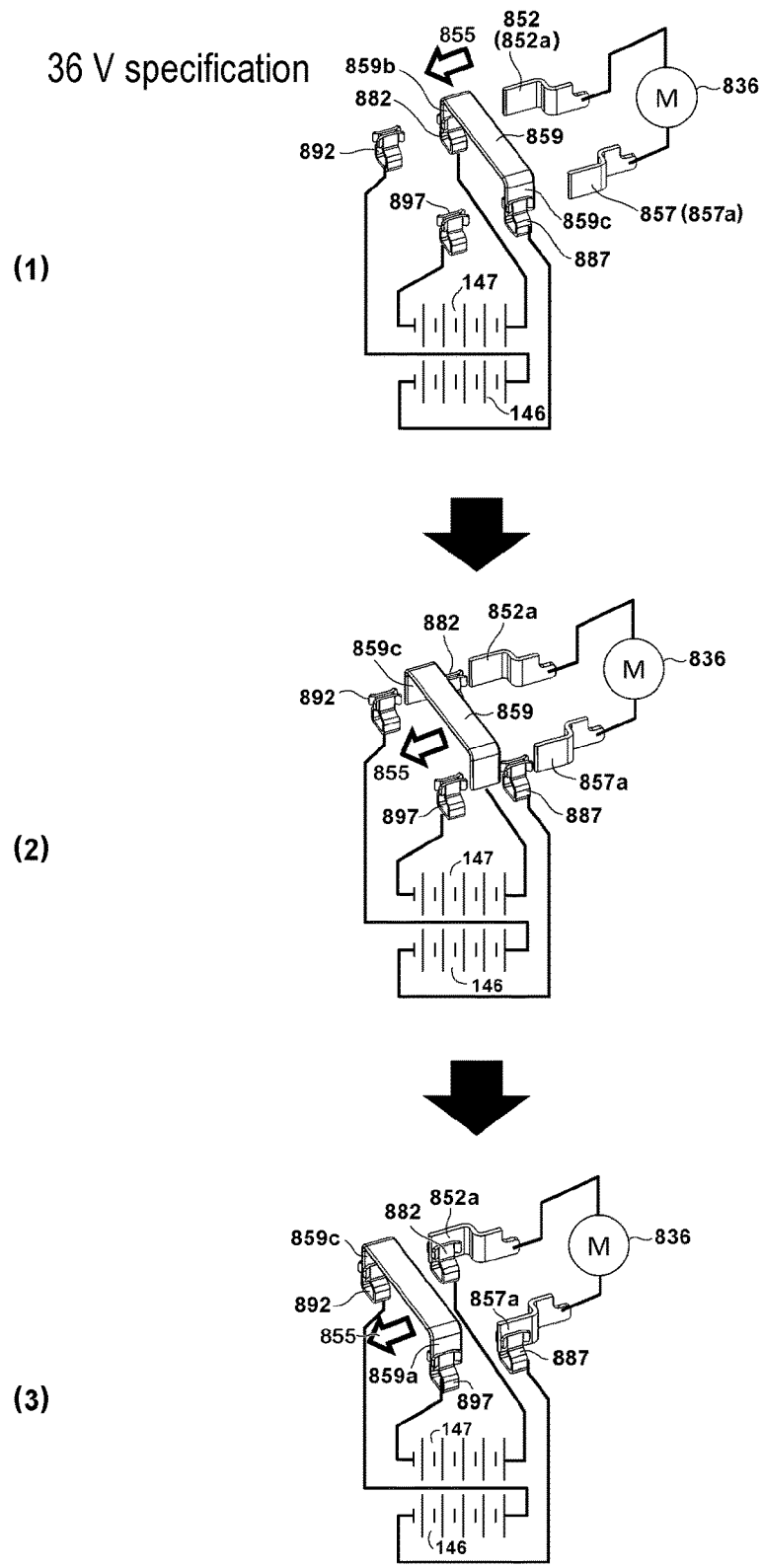

FIG. 43 is a diagram illustrating a status at the time of mounting the battery pack 860 in a power tool main body 830 having a specification of 36 V.

Figure 44:
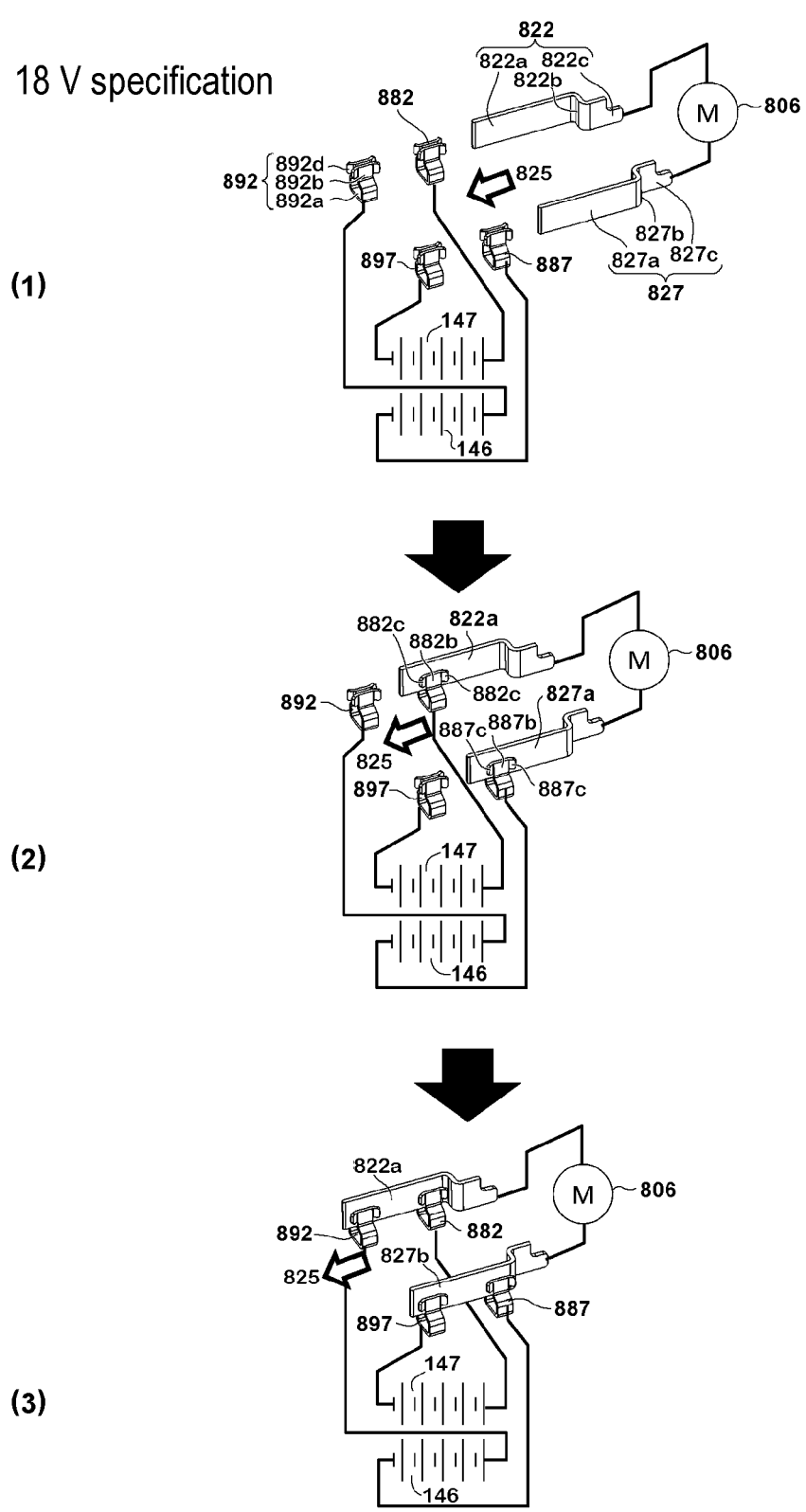

FIG. 44 is a diagram illustrating a status at the time of mounting the battery pack 860 in a Dower tool main body 801 having a specification of 18 V.

FIG. 45 is a top view illustrating an arrangement of terminals on the battery pack 860 side and shapes and an arrangement of terminals of the power tool main body 830.

DESCRIPTION OF EMBODIMENTS

Embodiment 1

Hereinafter, embodiments of the present invention will be described on the basis of the drawings. In the following diagrams, the same reference signs will be assigned to the same parts, and repetitive description will be omitted. In this specification, a power tool operated by a battery pack will be described as one example of an electrical apparatus, forward, backward, leftward, and rightward directions in the main body side of the power tool are assumed to be directions illustrated in FIG. 2, and forward, backward, leftward, rightward, upward, and downward directions when seen from the battery pack as a single unit are assumed to be directions illustrated in FIG. 3 with reference to a mounting direction of the battery pack. In addition, for the convenience of description, the mounting direction of the battery pack will be described as a direction with reference to a status in which the battery pack side is moved without moving the power tool main body side.

Figure 1:
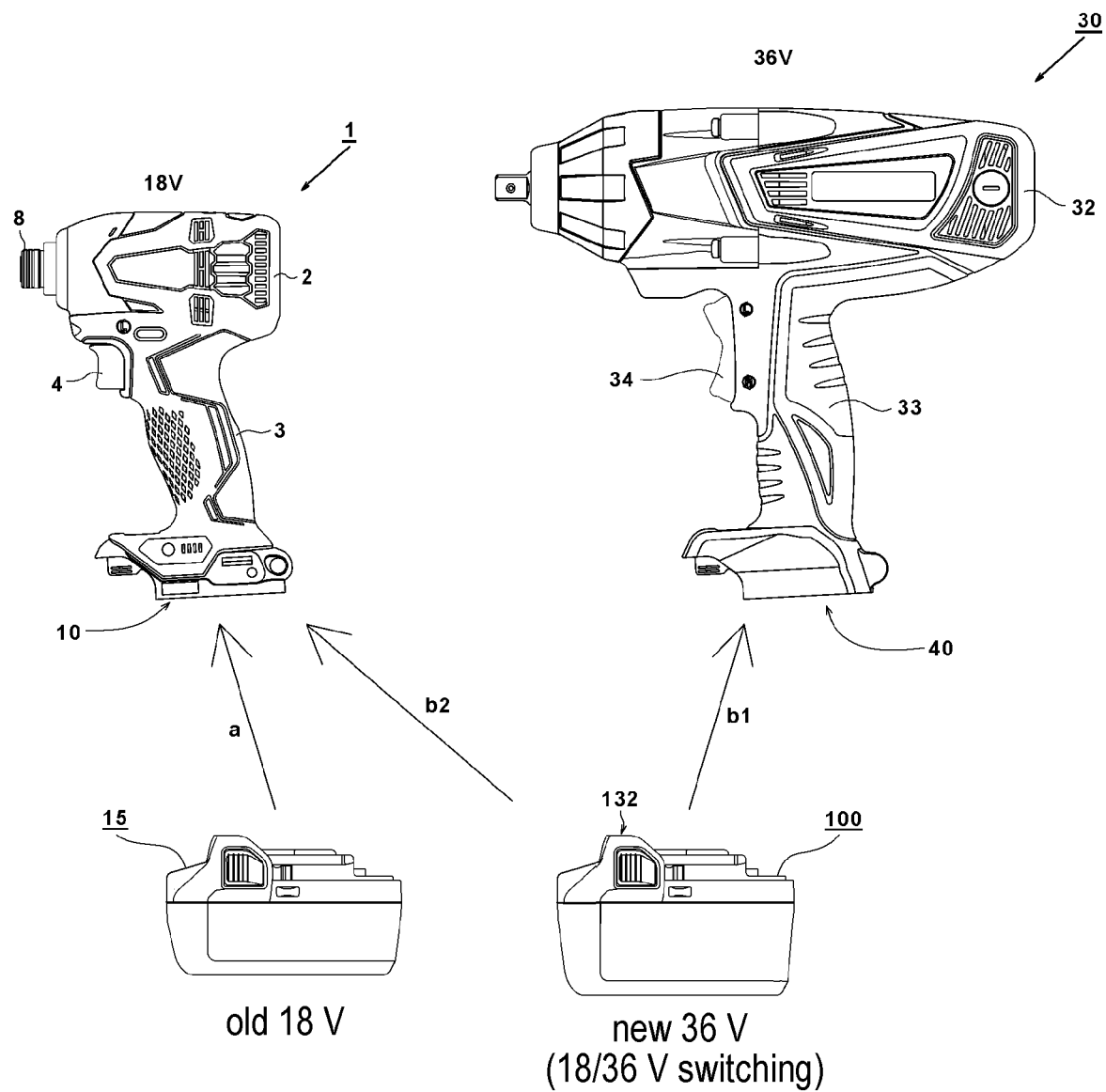
FIG. 1 is a diagram illustrating a mounting status of a battery pack according to the present invention in a power tool.

FIG. 1 is a diagram illustrating a mounting status of a battery pack according to this embodiment in a power tool. The power tool that is one form of an electrical apparatus includes a battery pack and drives a tip tool and an operation device using a rotary drive force according to a motor. While various types of power tools have been realized, both power tool main bodies 1 and 30 illustrated in FIG. 1 are called impact tools. The power tool main bodies 1 and 30 are tools that perform a fastening operation by applying a rotational force or an axial-direction striking force to a tip tool such as a bit, a socket wrench, or the like not illustrated in the drawing. Such power tool main bodies 1 and 30 respectively include housings 2 and 32 that are outer edges forming outer shapes, and handle parts 3 and 33 are respectively formed in the housings 2. Trigger-shaped operation switches 4 and 34 are disposed near parts of the handle parts 3 and 33 with which an index finger is brought into contact when an operator grips the handle parts, and battery pack mounting parts 10 and 40 used for mounting battery packs 15 and 100 are formed below the handle parts 3 and 33.

The power tool main body 1 is a conventional electrical apparatus using a battery pack 15 having a rated voltage of 18 V. The battery pack 15 is a conventional battery pack and can be mounted in the battery pack mounting part 10 of the electrical apparatus (the power tool main body 1) corresponding to 18 V as in a combination of an arrow a. Inside the battery pack 15, one set of cell units is formed by connecting five cells of lithium ion batteries having a rated 3.6 V in series, or two sets of such cell units housed and are connected in parallel to each other. Here, a "cell unit" is acquired by electrically connecting a plurality of battery cells, and examples of the "cell unit" include a connection body acquired by connecting a plurality of battery cells in series, a connection body acquired by connecting a plurality of battery cells in parallel, and a connection body acquired by connecting a plurality of battery cells in series and in parallel. Here, a voltage 18 V may be referred to as a low voltage with a meaning of a relatively low voltage. Similarly, a power tool main body 1 or an electrical apparatus main body having a rated voltage 18 V may be respectively referred to as a low-voltage power tool main body or a low-voltage electrical apparatus main body. In addition, similarly, a battery pack 15 having a nominal voltage of 18 V may be referred to as a low-voltage battery pack.

The power tool main body 30 is an electrical apparatus main body having a rated voltage of 36 V, and, as denoted by an arrow b1, a battery pack 100 that can output 36 V is mounted in the battery pack mounting part 40. Here, the voltage 36 V may be referred to as a high voltage with a meaning of a relatively high voltage. Similarly, the power tool main body 30 or the electrical apparatus main body having a rated voltage 36 V may be respectively referred to as a high-voltage power tool main body or a high-voltage electrical apparatus main body. Inside the battery pack 100, two sets of cell units in which five cells of lithium ion batteries having a rated voltage of 3.6 V are connected in series are housed, and, both an 18 V output and a 36 V output can be switched between by changing a method of connecting the two sets of cell units. In this embodiment, by configuring the battery pack 100 to be able to handle two voltages, outputs of a low voltage and a high voltage can be performed. Accordingly, the battery pack 100 can be either mounted in a power tool main body 1 corresponding to 18 V as denoted by an arrow b2 or mounted in a power tool main body 30 corresponding to 36 V as denoted by an arrow b1. In this way, the battery pack 100 that can output a low voltage and a high voltage may be referred to as a voltage-variable battery pack here. In order to mount the battery pack 100 in the power tool main bodies 1 and 30 of different voltages as denoted by the arrows b1 and b2, it is important to enable the output voltage of the battery pack 100 to be switchable by configuring shapes of rail parts of the battery pack mounting parts 10 and 40 and terminal units to be almost the same. At this time, it is important to prevent occurrence of a voltage setting error by causing an output voltage of the battery pack 100 to be reliably in correspondence with rated voltages of an electrical apparatus main body and a power tool main body on which it is to be mounted.

Figure 2:
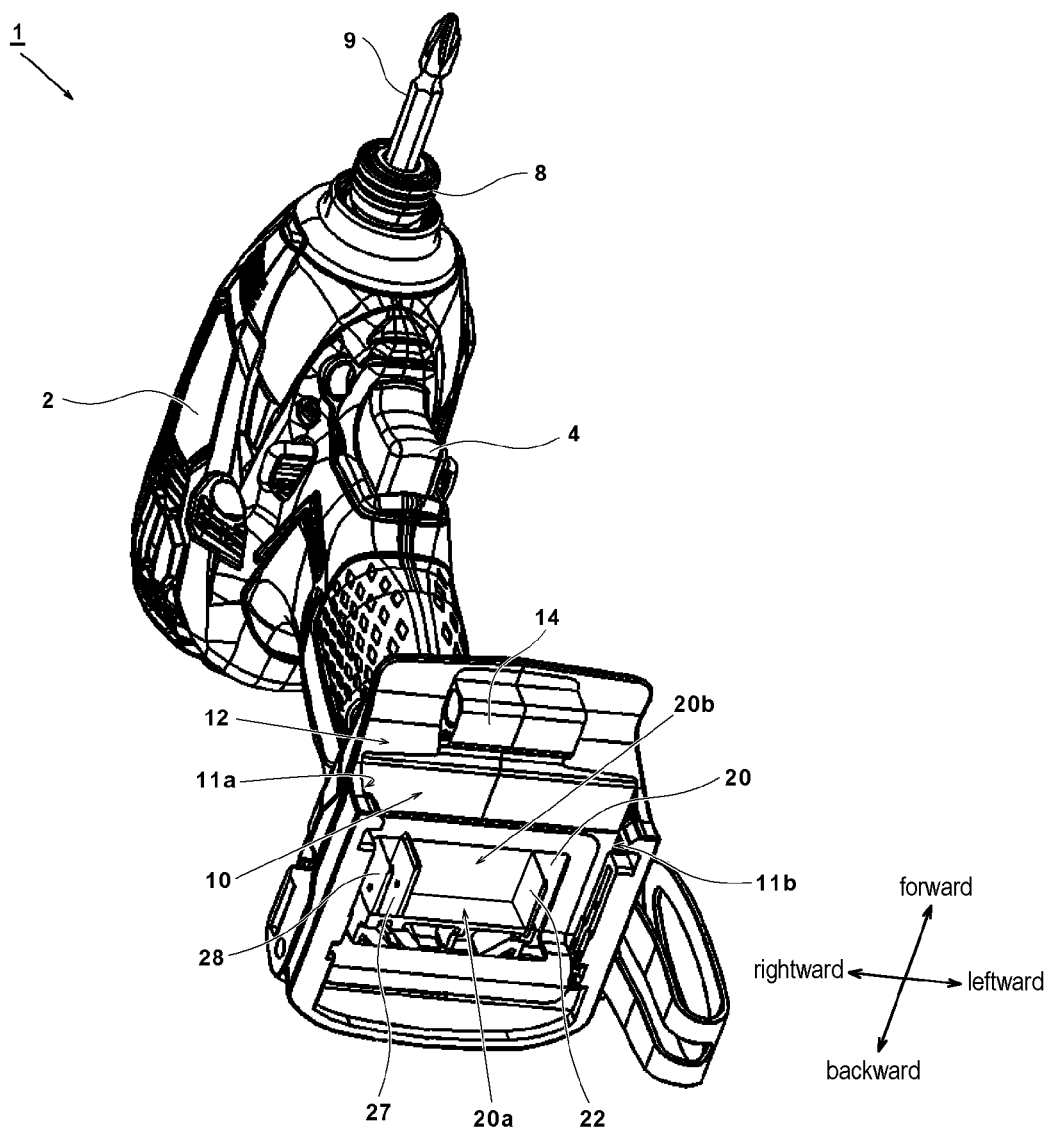
FIG. 2 is a perspective view illustrating a shape of a battery pack mounting part 10 of a power tool main body 1 illustrated in FIG. 1.

FIG. 2 is a perspective view illustrating a shape of the battery pack mounting part 10 of the power tool main body 1. The power tool main body 1 illustrated here is an impact driver, a handle part extending downward from a trunk part of a housing 2 is disposed, and a battery pack mounting part 10 is formed below the handle part. A trigger switch 4 is disposed in the handle part. An anvil (not illustrated in the drawing) that is an output shaft is disposed on a front side of the housing 2, and a tip tool holding part 8 used for mounting a tip tool 9 is disposed at a tip end of the anvil. Here, a plus driver bit is mounted as the tip tool 9. The electrical apparatus is not limited to a power tool, and, in a general electrical apparatus using a battery pack, a battery pack mounting part 10 configured to correspond to the shape of a battery pack to be mounted is formed, and the general electrical apparatus is configured such that a battery pack that is not appropriate for the battery pack mounting part 10 cannot be mounted thereon. In the battery pack mounting part 10, rail grooves 11a and 11b extending parallel to a forward-backward direction are formed in inner wall parts on both left and right sides, and a terminal unit 20 is disposed therebetween. The terminal unit 20 is manufactured through integral molding of a non-conductor material such as a synthetic resin, and a plurality of terminals formed of metal, for example, a positive electrode input terminal 22, a negative electrode input terminal 27, and an LD terminal (an abnormal signal terminal) 28 are cast. In the terminal unit 20, a vertical face 20a that becomes an abutting surface in a mounting direction (a forward-backward direction) and a horizontal face 20b are formed, and the horizontal face 20b becomes a face that is adjacent to and faces an upper-portion face 115 (to be described later in FIG. 3) at the time of mounting the battery pack 100. On the front side of the horizontal face 20b, a bending part 12 that is brought into contact with a raised part 132 (to be described later in FIG. 3) of the battery pack 100 is formed, and protrusion parts 14 are formed near left and right centers of the bending part 12. The protrusion parts 14 serve also as a screw-stopping boss of a housing of the power tool main body 1 formed to be divided into two parts in the leftward-rightward direction and achieve also a role of a stopper restricting relative movement in the mounting direction of the battery pack 100.

FIG. 3 is a perspective view of the battery pack 100 according to an embodiment of the present invention. The battery pack 100 can be attached/detached to/from the battery pack mounting parts 10 and 40 (see FIG. 1), and switching between outputs of a low voltage (here, 18 V) and a high voltage (here, 36 V) is automatically performed in accordance with the terminal shape of the power tool main body 1 or 30 side. In addition, in order to provide attachment compatibility with a conventional battery pack 15 for a rated voltage of 18 V (see FIG. 1), the shape of the mounting part of the battery pack 100 is configured to be the same as that of the conventional battery pack 15. A casing of the battery pack 100 is formed by a lower casing 101 and an upper casing 110 that can be separated in the vertical direction. The lower casing 101 and the upper casing 110 are formed using members not conducting electricity, for example, synthetic resins and are fixed to each other using four screws not illustrated in the drawing. In order to be attached to the battery pack mounting part 10, a mounting mechanism in which two rails 138a and 138b are formed is formed in the upper casing 110. The rails 138a and 138b are formed to have longitudinal directions parallel to the mounting direction of the battery pack 100 and protrude from left and right side faces of the upper casing 110 in the leftward and rightward directions. Front-side end parts of the rails 138a and 138b become opening ends, and rear-side end parts thereof become closed ends connected to front-side wall face of the raised part 132. The rails 138a and 138b are formed in shapes corresponding to the rail grooves 11a and 11b (see FIG. 2) formed in the battery pack mounting part 10 of the power tool main body 1 and are locked by locking parts 142a (a locking part on the right side not seen in FIG. 3) and 142b, which serve as latching claws, in a state in which the rails 138a and 138b are fitted to the rail grooves 11a and 11b, whereby the battery pack 100 is fixed to the power tool main bodies 1 and 30. When the battery pack 100 is detached from the power tool main bodies 1 and 30, by pressing latches 141 that are present on both left and right sides, the latch parts 142a and 142b move inward, and the latched state is released, and accordingly, the battery pack 100 is moved to a side opposite to the mounting direction in that state.

A flat lower-portion face 111 is formed on a front side of the upper casing 110, and an upper-portion face 115 formed to be higher than the lower-portion face 111 is formed near the center. The lower-portion face 111 and the upper-portion face 115 are formed in a stair shape, and a connection portion thereof becomes a level difference part 114 that is a vertical face. A front-side part of the upper-portion face 115 with respect to the level difference part 114 becomes a slot group arrangement area 120. A plurality of slots 121 to 128 extending from the level difference part 114 on the front side to the rear side are formed in the slot group arrangement area 120. The slots 121 to 128 are parts notched to have a predetermined length in a battery pack mounting direction, and, inside the notched parts, a plurality of connection terminals (to be described later with reference to FIG. 4) that can be fitted to apparatus-side terminals of the power tool main bodies 1 and 30 or an external charging device (not illustrated in the drawing) are disposed. As the slots 121 to 128, notches are formed on a top face that is parallel to the mounting direction and a vertical face such that terminals of the power tool main body side can be inserted thereinto from the lower-portion face 111 side. In addition, on a side below the slots 121 to 128, an opening portion 113 that continuously opens in the horizontal direction is formed between the lower-portion face 111 and the slots. In the opening portion 113, both left and right sides of a vertical wall part 185a that is in a rib shape extending in the vertical direction disposed at the center are formed in a planar shape, and the planar shape parts are formed by the board cover 180. The board cover 180 is a component that is manufactured separately from the upper casing 110, and a detailed shape thereof will be described later with reference to FIG. 17 to FIG. 21.

Among the slots 121 to 128, the slot 121 on a side close to the rail 138a on the right side of the battery pack 100 becomes an insertion port of a positive electrode terminal for charging (C+ terminal), and the slot 122 becomes an insertion port of a positive electrode terminal for discharging (+terminal). In addition, the slot 127 on a side close to the rail 138b on the left side of the battery pack 100 becomes an insertion port of a negative electrode terminal (−terminal). In the battery pack 100, generally, a positive electrode side and a negative electrode side of power terminals used for transmitting electric power are disposed to be sufficiently separate from each other, and, when seen from a vertical virtual plane positioned at the left/right center, a positive electrode terminal is disposed at a position sufficiently distant on the right side, and a negative electrode terminal is disposed at a position sufficiently distant on the left side. Between the positive electrode terminal and the negative electrode terminal, a plurality of signal terminals for signal transmission used for controlling the battery pack 100, the power tools main bodies 1 and 30, and an external charging device (not illustrated in the drawing) are disposed, and, here, four slots 123 to 126 for signal terminals are disposed between power terminal groups. The slot 123 is a preliminary terminal insertion port, and no terminal is disposed therein in this embodiment. The slot 124 is an insertion port for a T terminal used for outputting a signal that is identification information of the battery pack 100 to a power tool main body or a charging device. The slot 125 is an insertion port for a V terminal used for inputting a control signal from an external charging device (not illustrated in the drawing). The slot 126 is an insertion port for an LS terminal used for outputting temperature information of a battery according to a thermistor (thermo sensitive device), which is not illustrated in the drawing, disposed in contract with a cell. A slot 128 for an LD terminal that outputs an abnormal stop signal according to a battery protection circuit, which will be described later, further included inside the battery pack 100 is disposed on the left side of the slot 127 that is an insertion port of the negative electrode terminal (−terminal).

The raised part 132 which has a raised form is formed on the rear side of the upper-portion face 115. The raised part 132 has a shape of which the exterior is raised higher than the upper-portion face 115, and a stopper part 131 having a cavity shape is formed near the center thereof. The stopper part 131 causes the protrusion part 14 (see FIG. 2) to serve as an abutting surface when the battery pack 100 is mounted in the battery pack mounting part 10, and, when the battery pack 100 is inserted until the protrusion part 14 of the power tool main body 1 side is brought into contact with the stopper part 131, a plurality of terminals (apparatus-side terminals) disposed in the power tool main body 1 and a plurality of connection terminals (to be described later with reference to FIG. 4) disposed in the battery pack 100 are brought into contact with each other and are caused to be in a conductive state. In addition, the latch parts 142a (a latch part disposed on the right side and not seen in FIG. 3) and 142b of the latch 141 of the battery pack 100 pop out in a leftward-rightward direction at lower parts of the rails 138a and 138b in accordance with actions of springs and are engaged with concave parts, which are not illustrated in the drawing, formed in the rail grooves 11a and 11b of the power tool main body 1, whereby dropping-out of the battery pack 100 is prevented. A slit 134 that is a cooling air flow introduction port connected to the inside of the battery pack 100 is disposed on the inner side of the stopper part 131. In addition, in a state in which this battery pack 100 is mounted in the power tool main body 1, the slit 134 is covered such that it cannot be visually recognized from the outside and is brought into a closed state. The slit 134 is an airflow hole used for forcing a cooling air to flow to the inside of the battery pack 100 when the battery pack 100 is charged by being connected to a charging device not illustrated in the drawing, and the cooling air flow received inside the battery pack 100 is discharged to the outside from the slit 104 that is an airflow hole for discharging disposed in a front wall of the lower casing 101.

Figure 4:
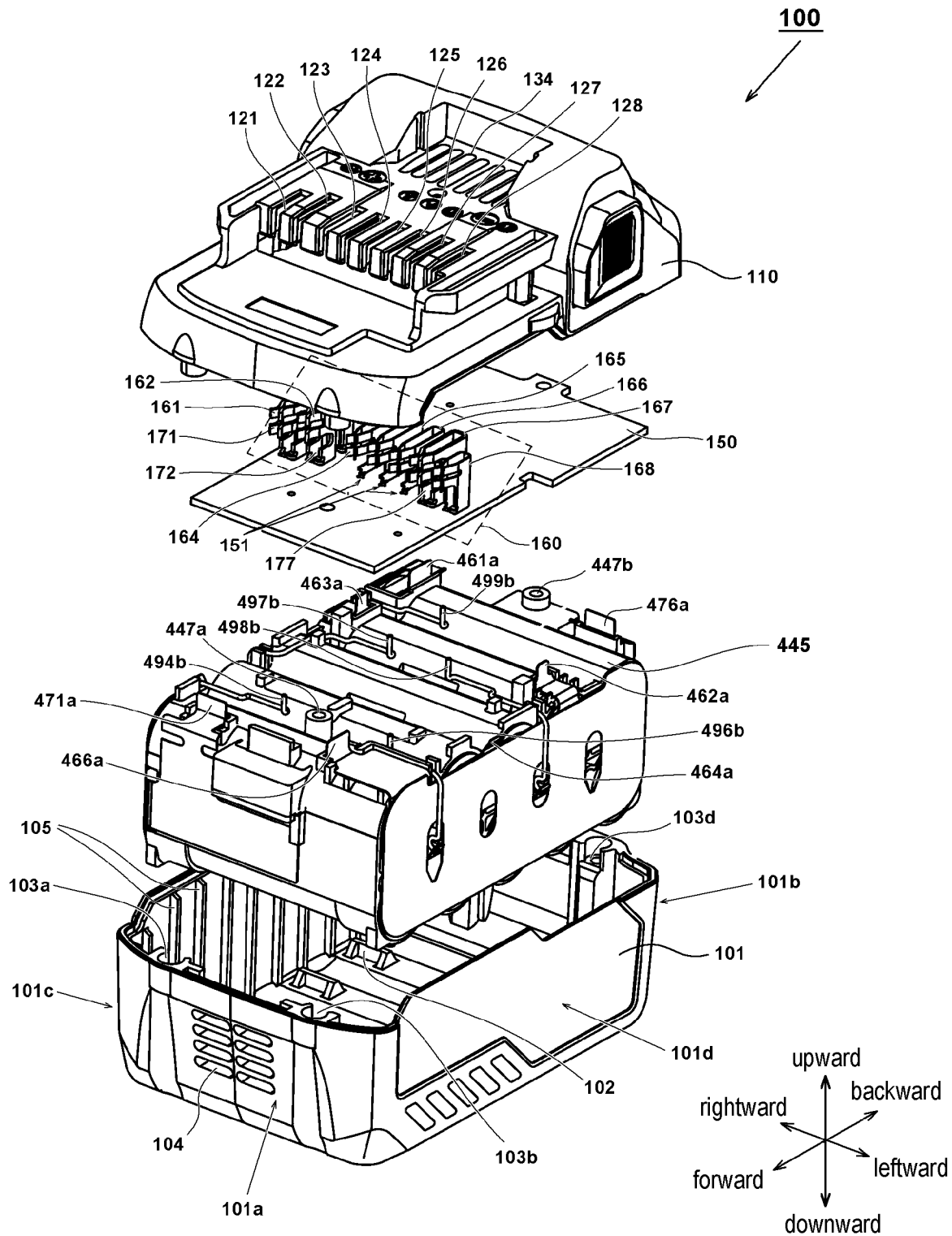
FIG. 4 is an exploded perspective view of the battery pack 100 illustrated in FIG. 3.

FIG. 4 is an exploded perspective view of the battery pack 100 illustrated in FIG. 3. A casing of the battery pack 100 is formed by an upper casing 110 and a lower casing 101 that can be separated in the vertical direction, and ten battery cells are housed in an internal space of the lower casing 101. Two screw holes 103a and 103b are formed for stopping screws for the upper casing 110 on the front side wall faces of the lower casing 101, and screws not illustrated in the drawing pass through the screw holes 103a and 103b in an upward direction from below. In addition, two screw holes 103c (not seen in the drawing) and 103d are formed also in the rear wall face of the lower casing 101. A plurality of battery cells (not illustrated in the drawing) are fixed to the separator 445 composed of a non-conductor such as a synthetic resin or the like in a state in which battery cells are stacked in two stages for every five battery cells. The separator 445 holds a plurality of battery cells with only both left and right sides that are both end parts of the battery cells open.

A circuit board 150 is fixed above the separator 445. The circuit board 150 is fixed by soldering a plurality of connection terminals 161, 162, 164 to 168, 171, 172, and 177 and electrically connects these connection terminals and a circuit pattern not illustrated in the drawing to each other. In addition, various electronic elements (here, not illustrated in the drawing) such as a battery protection IC, a microcomputer, a PTC thermistor, resistors, capacitors, a fuse, a light emitting diode, and the like are mounted in the circuit board 150. The circuit board 150 is called a printed board acquired by printing a pattern wiring using a conductor such as a copper foil or the like on a board into which a resin having insulating properties as a material is impregnated, and a single-layer board, a double-side board, or a multiple-layer board can be used. In this embodiment, wiring patterns are formed on an upper face (a face that is a front face and is a face on the upper side seen from FIG. 4) and a lower face (rear face) of the circuit board 150 using a double-side board. A slot group arrangement area 160 is disposed slightly forward from the center of the circuit board 150 in the forward-backward direction, and a plurality of connection terminals 161, 162, 164 to 168, 171, 172, and 177 are aligned in the horizontal direction and are fixed therein.

Positive electrode terminals 161, 162, 171, and 172 and negative electrode terminals 167 and 177 are disposed at positions that are far apart in the leftward-rightward direction, and three signal terminals (the T terminal 164, the V terminal 165, and the LS terminal 166) are disposed therebetween. In this embodiment, although a total of two sets of arm parts extending in the horizontal direction including one set on the left and right sides on the upper side and one set on the left and right sides on the lower side are disposed and used as components for power terminals, a detailed shape thereof will be described later with reference to FIG. 11. In addition, regarding signal terminals 164 to 166 and 168, a signal terminal component in which one arm part is disposed in the vertical direction, which is conventionally used, may be used as it is. However, in this embodiment, in order to configure fitting states of the positive electrode terminals 161, 162, 171, and 172 and the negative electrode terminals 167 and 177 and apparatus-side terminals such that they are the same, a signal terminal component (to be described later with reference to FIG. 11) having two arm parts above and below each other also on the signal terminal side is used.

An LD terminal 168 is disposed on the left side of a negative electrode terminal pair 167 and 177. The LD terminal 168 is also formed to include two sets of arm parts on the upper side and the lower side. All the signal terminals 164 to 166 and 168 have leg parts which pass through front faces and rear faces of a plurality of formed attachment holes 151 in the circuit board 150 and are fixed on the rear face side through soldering. This embodiment has a feature also in the method of fixing the three signal terminals 164 to 166, and details thereof will be described later with reference to FIG. 11 and FIG. 12. As described above, after electronic devices not illustrated in the drawing are mounted on the circuit board 150, and a plurality of connection terminals are fixed through soldering, a board cover 180 to be described later with reference to FIG. 17 is disposed, and, the front face of the circuit board 150 is hardened using a resin and then is fixed to the separator 445 using screws not illustrated in the drawing. In FIG. 4, illustration of the board cover 180 is omitted.

The lower casing 101 has an approximately rectangular parallelepiped shape having an open upper face and is composed of a bottom face and a front face wall 101a, a rear face wall 101b, a right side wall 101c, and a left side wall 101d extending in a perpendicular direction with respect to the bottom face. An inner space of the lower casing 101 has a shape that is preferable for housing the separator 445, and, a plurality of fixing ribs 102 formed on the inner side of the bottom face for stably holding the separator 445 and a plurality of ribs 105 formed to be continuous in the vertical direction for reinforcing the wall faces are formed. A slit 104 is disposed at almost a center of the front face wall 101a. The slit 134 of the upper casing 110 is used as an inflow port used for causing a cooling air flow sent out from the charging device side to flow into the internal space of the battery pack 100 when charging is performed by the charging device, and the slit 104 of the lower casing 101 is used as a discharge port of the cooling air flow.

The connection of the output of the battery cell side to the circuit board 150 is performed through connection drawing tabs 461a, 466a, 471a, 476a extending upwardly in a plate shape. In addition, ends 494b and 496b to 499b of lead wires from intermediate connection points of battery cells connected in series are disposed to extend upwardly and are soldered on the circuit board. Furthermore, intermediate drawing tabs 462a and 463a from intermediate connection points of battery cells connected in series are disposed to extend upwardly so as to be connected to the circuit board 150. On the upper side of the separator 445, screw bosses 447a and 447b for fixing the circuit board 150 are formed.

Next, a stacking status of battery cells and a method of wiring thereof using the separator 445 will be described using an exploded perspective view illustrated in FIG. 5. In the separator 445, ten battery cells 146a to 146e and 147a to 147e are stacked in two stages, five battery cells in each of an upper portion and a lower portion. Although FIG. 5. Illustrates a state in which the battery cells 146a to 146e and 147a to 147e are drawn out from the separator 445, at the time of assembly, the battery cells are inserted into the inside of a cylindrical space 446 of the separator 445 and mutually connected using connection plates 462 to 465 and 472 to 475 between terminals exposed to both left and right sides of the separator, and the drawing plates 461, 466, 471, and 476 are connected to the battery cells. Thereafter, for insulation, insulating sheets 482a and 482b may be attached on the connection plates 462 to 465 and 472 to 475 and the drawing plates 461, 466, 471, and 476.

The battery cells are stacked such that axial lines thereof are parallel to each other and are disposed such that directions of adjacent cells are alternately reversed, and positive electrode terminals and negative electrode terminals of adjacent battery cells are connected using the connection plates 462 to 465 and 472 to 475 formed of metal. Both the terminals of the battery cells and the connection plates 462 to 465 and 472 to 475 are fixed through spot welding of a plurality of spots. Here, five battery cells connected in series which are disposed in the upper portion form an upper cell unit 146 (to be described later with reference to FIG. 8), and five battery cells connected in series which are disposed in the lower portion form a lower cell unit 147 (to be described later with reference to FIG. 8). In addition, the upper side and the lower side of the cell units described here do not represent physical positions indicating whether a battery cell is present in the upper portion or the lower portion inside the lower casing 101, and, when two cell units are connected in series, a cell unit positioned on the ground side will be referred as a "lower cell unit", a cell unit positioned on a high voltage side at the time of the series connection will be referred to as an "upper cell unit", and the electric potential is used as a criterion. In the battery pack according to this embodiment, although the upper cell unit 146 is disposed in the upper portion, and the lower cell unit 147 is disposed in the lower portion, the arrangement is not limited to this arrangement. Thus, in the method of arranging battery cells, the battery cells may be divided into a front side and a rear side instead of the upper portion and the lower portion.

As the battery cells 146*a* to 146*e* and 147*a* to 147*e*, lithium ion battery cells (not illustrated in the drawing) having a diameter of 18 mm and a length of 65 mm called a 18650 size which can be charged and discharged a plurality of number of times are used. In this embodiment, in order to allow an output voltage from the battery pack 100 to be switchable, forms of a series connection voltage of a plurality of cell units (a high voltage-side output) and a parallel connection voltage thereof (a low voltage-side output) can be selected. Thus, according to an idea of the present invention, the number of cell units is arbitrary as long as the numbers of cells connected in series in cell units are the same. The battery cells to be used are not limited to the 18650 size and may be battery cells of a so-called 21700 size or a battery cell of any other size. In addition, the shape of a battery cell is not limited to a cylindrical shape and may be, rectangular parallelepiped, a laminated shape or any other shape. The type of battery cell is not limited to a lithium ion battery, and a secondary battery of an arbitrary type such as a nickel hydride battery cell, a lithium ion polymer battery cell, a nickel cadmium battery cell, or the like may be used. Two electrodes are disposed at both ends in the longitudinal direction of the battery cell. Out of the two electrodes, one is a positive electrode, and the other is a negative electrode. However, the positions at which the electrodes are disposed are not limited to both end sides, and an arbitrary electrode arrangement may be employed as long as cell units can be easily formed inside a battery pack.

A positive electrode of the upper cell unit 146 is connected to the circuit board 150 using the drawing plate 461 in which the drawing tab 461*a* is formed, and a negative electrode of the upper cell unit 146 is connected to the circuit board 150 using the drawing plate 466 in which the drawing tab 466*a* is formed. Similarly, a positive electrode of the lower cell unit 147 is connected to the circuit board 150 using the drawing plate 471 in which the drawing tab 471*a* is formed, and a negative electrode of the lower cell unit 147 is connected to the circuit board 150 using the drawing plate 476 in which the drawing tab 476*a* is formed. On an upper face of the separator 445, tab holders 450 to 452 and 455 to 457 used for holding tabs of the drawing plates 461, 466, 471, and 476 having a shape acquired by folding a thin metal plate are formed. The tab holders 450 to 452 and 455 to 457 are tab holding parts formed for holding the drawing tabs 461*a*, 462*a*, 463*a*, 466*a*, 471*a*, and 476*a* bent in an "L" shape and are integrally formed as concave parts having a bearing face, a rear face, and two side faces at the time of molding the separator 445, and the drawing tabs 461*a*, 462*a*, 463*a*, 466*a*, 471*a*, and 476*a* are respectively fitted into these concave parts. Two screw bosses 447*a* and 447*b* used for stopping screws of the circuit board 150 are formed in an upper part of the separator 445. The right side of the drawing plates 461 and 471 and the connection plates 463, 465, 473, and 475 is covered with the insulating sheet 482*a*, and the right side of the drawing plates 466 and 476 and the connection plates 462, 464, 472, and 474 is covered with the insulting sheet 482*b*. The insulating sheet 482*a* is formed using a material that is not electrically conductive and has an inner part coated with a sealing material.

Figure 6:
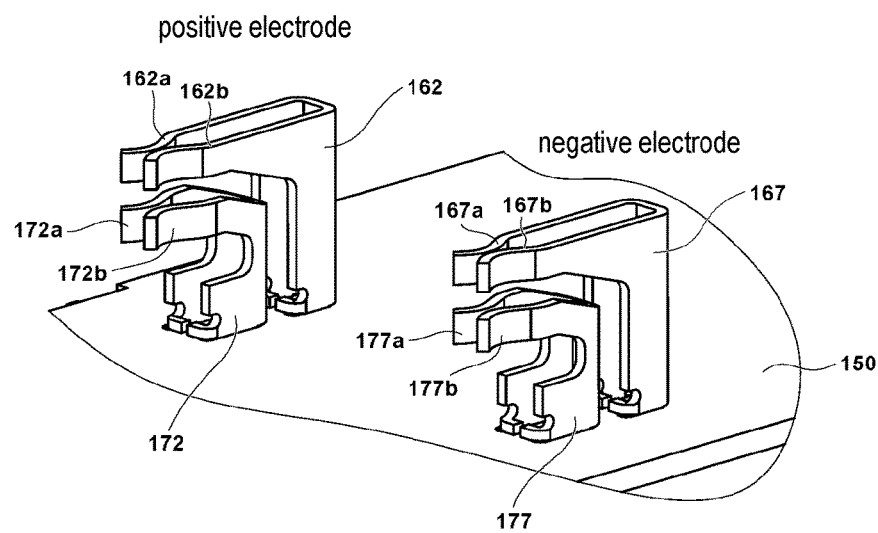
FIG. 6 is a diagram illustrating single-body shapes of positive electrode terminal pairs 162 and 172 and negative electrode terminal pairs 167 and 177 used for discharging among power terminals illustrated in FIG. 4.

Next, shapes of two sets of power terminals will be described with reference to FIG. 6. FIG. 6 is a partial diagram of the circuit board 150 illustrated in FIG. 4 and illustrates only a positive electrode terminal pair (an upper positive electrode terminal 162 and a lower positive electrode terminal 172) and a negative electrode terminal pair (an upper negative electrode terminal 167 and a lower negative electrode terminal 177) fixed to the circuit board 150. As positive electrode terminals for output, the upper positive electrode terminal 162 and the lower positive electrode terminal 172 that are electrically independent are disposed to be aligned in a forward/rearward direction seen from a mounting position of the circuit board 150. These are a plurality of terminals 162 and 172 disposed to be close to each other and function as a switching terminal group used for voltage switching. The upper positive electrode terminal 162 and the lower positive electrode terminal 172 include arm part sets (arm parts 162*a* and 162*b* and arm parts 172*a* and 172*b*) extending to the front side. Here, the arm parts 162*a* and 162*b* and the arm parts 172*a* and 172*b* are located at positions separate in the vertical direction and have shapes in which positions of fitting parts in the forward-backward direction are almost the same. These positive electrode terminal pairs 162 and 172 are disposed inside a single slot 122. Similar to the shape of the positive electrode terminal pair, the negative electrode terminal pair is also composed of an upper negative electrode terminal 167 and a lower negative electrode terminal 177, and these negative electrode terminal pair 167 and 177 are disposed inside a single slot 127. These are a plurality of terminals 167 and 177 disposed to be close to each other and function as a switching terminal group used for voltage switching. Inside the slot 127, an arm part set of the upper negative electrode terminal 167 is disposed on the upper side, and an arm part set of the lower negative electrode terminal 177 is disposed below the arm part set of the upper negative electrode terminal 167. In addition, although not illustrated in FIG. 6, a positive electrode terminal-pair for charging (the upper positive electrode terminal 161 and the lower positive electrode terminal 171; see FIG. 4) is disposed on the right side of the positive electrode terminal pair for discharging (the upper positive electrode terminal 162 and the lower positive electrode terminal 172). The shapes of the positive electrode terminal pair 161 and 171 for charging are the same as those of the upper positive electrode terminal 162 and the lower positive electrode terminal 172.

Figure 7:
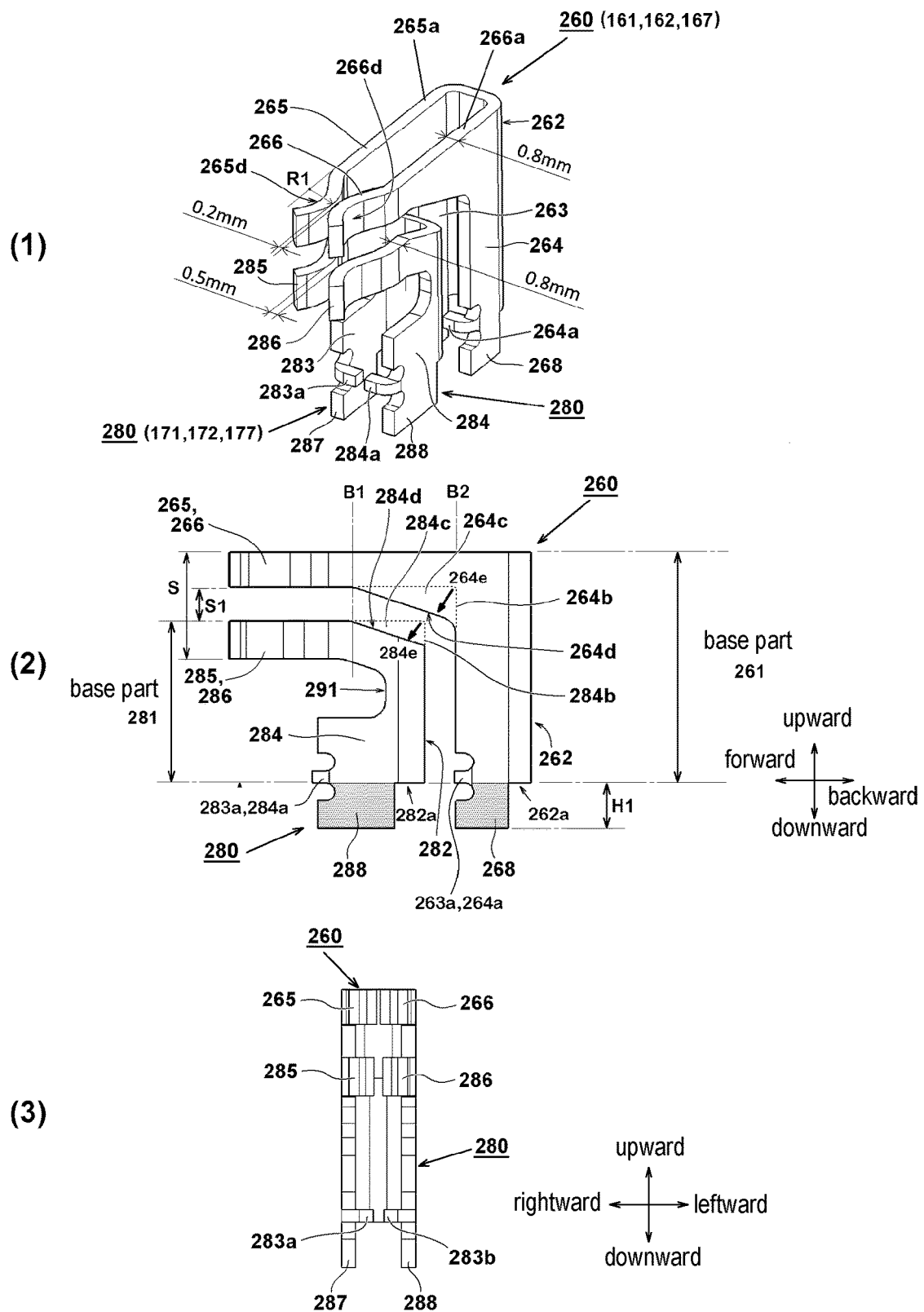
FIG. 7 is a diagram illustrating single-body shapes of power terminals 161 and 171, 162 and 172, and 167 and 177 illustrated in FIG. 4, (1) of FIG. 7 is a perspective view of all the power terminals, (2) of FIG. 7 is a side view of all the power terminals, and (3) of FIG. 7 is a front view of all the power terminals.

FIG. 7(1) is a perspective view illustrating components of an upper terminal component 260 and a lower terminal component 280 as single bodies. The upper terminal component 260 is a component commonly used as the upper positive electrode terminals 161 and 162 and the upper negative electrode terminal 167, and the lower terminal component 280 is a component commonly used as the lower positive electrode terminals 171 and 172 and the lower negative electrode terminal 177. The upper terminal component 260 and the lower terminal component 280 are formed by cutting out a flat plate formed from conductive metal through press processing and then bending the plate in a "U" shape. The upper terminal component 260 is bent such that a face that becomes a bottom part of the "U" shape, in other words, a bridge part 262 is on a rear side, and the lower terminal component 280 is bent such that a bridge part 282 is on a rear side. In the upper terminal component 260, long arm parts 265 and 266 extending to the upper side of the lower terminal component 280 are formed. When seen in a forward-backward direction in which the arm parts 265 and 266 extend, the bridge part 262 has an orthogonal face, and the face becomes a vertical face extending in the vertical direction.

The upper terminal component 260 includes a right side face 263 and a left side face 264 that are formed to be in parallel with each other by being bent in a "U" shape and a bridge part 262 that connects these side faces and becomes a rear face. On a front side of the right side face 263 and the left side face 264, arm parts 265 and 266 having apparatus-side terminals interposed therebetween from both left and right sides toward the inner side. The arm parts 265 and 266 are formed to extend in a planar shape in the vertical direction from a lower side to a position close to an upper end in a front side portion of the left side face 264 and extend to the front side from a position near the top end. The shape of the right side face 263 is formed to have plane symmetry with respect to the left side face 264. The arm part 265 is disposed to extend from an upper front side of the right side face 263 to the front side, and the arm part 266 is disposed to extend from an upper front side of the left side face 264 to the front side. In this way, the arm parts 265 and 266 are formed to extend from an upper part of the front side part of a base part 261 to the front side, in other words, in a direction parallel to the mounting direction of the battery pack 100. The arm parts 265 and 266 are press processed such that, when seen in the leftward-rightward direction, both the arm parts face each other and approach each other with a minimum gap portion, in other words, a position at which device connection terminals and a fitting part to be fitted are almost brought into contact with each other and thus have a spring property. Here, the press processing is plastic processing performed using a press machine. In the press processing, a material such as a sheet metal is pressed to a mold with a high pressure, shear processing such as cutting, punching, perforating, or the like is performed, and bending processing and drawing are performed as is necessary, whereby the material is sheared and molded into a necessary shape. In this embodiment, the upper terminal component 260 and the lower terminal component 280, for example, are formed into a flat plate having a thickness of 0.8 mm. Accordingly, the upper positive electrode terminals 161 and 162 and the upper negative electrode terminal 167 have high mechanical strength, and a fitting pressure at the time of being fitted to apparatus-side terminals becomes high. In addition, a thermal treatment, a plating treatment, or the like may be performed after the press processing.

The lower terminal component 280 is also manufactured in this way and includes a right side face 283 and a left side face 284 that are formed to be in parallel with each other by being bent in a "U" shape and a base part 281 formed from a bridge part 282 that connects these side faces, and arm parts 285 and 286 are formed on a front side near long and narrow upper parts of the right side face 283 and the left side face 284. The arm parts 285 and 286 have shapes having apparatus-side terminals interposed therebetween from both left and right sides toward the inner side. A distance S between an upper end position of the upper arm part set 265 and 266 and a lower end position of the lower arm part set 285 and 286 is configured to be almost equal to a width of power terminals disposed in a conventional battery pack for 18 V. Meanwhile the upper arm part set 265 and 266 and the lower arm part set 285 and 286 are disposed to be spaced by a predetermined distance S1 in the vertical direction. A notch part 291 that is largely notched from the front side is formed below the lower arm part set 285 and 286. A rear side of the lower terminal component 280 is spaced from the right side face 263 and the left side face 264 of the upper terminal component 260 by a predetermined gap and is fixed with being aligned in the forward-backward direction so as not to be in contact therewith.

In FIG. 7(2), hatching is applied to parts of leg parts 267 and 268, and ranges thereof are clearly illustrated. The base part 261 described in this specification is a part exposed from the front face of the mounted circuit board 150 to the upper side and is a part acquired by excluding the arm parts 265 and 266. The base part 261 of the upper terminal component 260 is composed of a right side face 263, a left side face 264, and a bridge part 262. The leg parts 267 and 268 are connected below a lower side part of the base part 261. The right side face 263 and the left side face 264 have approximately rectangular shapes extending in the vertical direction and are formed such that the arm parts 265 and 266 extend from a part close to the upper ends to the front side. Near rear-side roots of the arm parts 265 and 266, in other words, near a chain line B2, a width (a length in the vertical direction) is large, the width gradually decreases toward the front side, and the width becomes constant on a further front side than a virtual line B1. The fitting parts 265d and 266d can be bent in a curved shape having a predetermined radius R1 of curvature to the inner side in the top view. In this way, the arm parts 265 and 266 are formed to extend from an upper front side portion of the "U"-shaped base part to the front side, and the arm parts 265 and 266 are formed to have a spring property in a mutually non-contacting state.

The leg parts 267 and 268 are inserted into attachment holes (through holes) of the circuit board 150, the leg parts 267 and 268 are caused to protrude from an attachment face (a front face) of the circuit board 150 to a face (a rear face) on a side opposite to the attachment face, and the leg parts 267 and 268 are soldered to the circuit board 150 on the rear face. In addition, the arm parts 265 and 266 are electrically connected to a battery cell, electronic devices, and the like mounted in the circuit board 150 through soldering. Here, the leg parts 267 and 268 are formed to have a height H1 larger than the thickness of the circuit board 150 and smaller than twice thereof. In lower portions of the rear sides of the right side face 263 and the left side face 264, as denoted by an arrow 262a, the bridge part 262 protrudes to bent to the rear side, and accordingly, this protruding part is used for determining a position in the vertical direction when the upper terminal component 260 and the lower terminal component 280 are mounted in the circuit board 150. On a front side of lower portions of the right side face 263 and the left side face 264, parts extending in a convex shape in the horizontal direction are formed, and bending parts 263a (not seen in the drawing) and 264a acquired by bending the convex-shaped portions to the inner side are formed. Cutout parts having an approximately circular shape are formed for allowing bending processing to be easily performed on the upper side and the lower side of the bending parts of the bending parts 263a and 264a. The bending parts 263a and 264a and the level difference part 262a are brought into contact with the upper face near the attachment hole of the circuit board 150 and are formed for determining a position of the upper terminal component 260 in the vertical direction.

The base part 261 has an approximately inverted "L" shape in a side view. In rear portions of the arm parts 265 and 266, planar parts 265a and 266a respectively acquired by extending the right side face 263 and the left side face 264 in the same planar shape are formed from near rear-side connection portions to the front side. In tip end portions of the arm parts 265 and 266, fitting parts 265d and 266d bending to spread to the outer side with a large radius R1 of curvature are respectively formed. Curved face portions on the inner sides of the fitting parts 265d and 266d are respectively brought into contact with terminals of the power tool main bodies 1 and 30, whereby the upper terminal component 260 is electrically conducted to connection terminals of the power tool main bodies 1 and 30 sides. The inner sides of the fitting parts 265d and 266d have shapes having a slight gap in a state in which the battery pack 100 is detached from the power tool main bodies 1 and 30. The front sides of the fitting parts 265d and 266d are formed such that the gap rapidly increases toward the front side and guide the terminals of the power tool main bodies 1 and 30 sides.

The lower terminal component 280 includes a right side face 283 and a left side face 284 that are formed to be in parallel with each other by being bent in a "U" shape and a bridge part 282 that connects these side faces, and arm parts 285 and 286 are disposed to extend from long and narrow upper parts of the right side face 283 and the left side face 284 toward the front side and a slanting upper side. Widths of the arm parts 285 and 286 in the vertical direction are formed to be almost constant in the forward-backward direction and extend in the horizontal direction on a further front side than a virtual line B1, and a further rear side than the virtual line B1 is disposed to be inclined. A notch part 291 that is largely notched from the front side is formed below the arm part set 285 and 286 of the lower terminal component 280. As a result of the formation described above, a length of the arm parts 265 and 266 of the upper terminal component 260 (a length in the forward-backward direction and a further front side than B2) is longer than a length of the arm parts 285 and 286 of the lower terminal component 280 (a length in the forward-backward direction and a further front side than a position of an arrow 291). Also in the arm part set having different lengths in the forward-backward direction, it is preferable that a fitting pressure in the fitting part of the upper terminal component 260 is the same as a fitting pressure of the lower terminal component 280. The reason for this is that, when the fitting pressures are not equal, there is a concern that contact resistance with flat plate-shaped apparatus-side terminals on the power tool main bodies 1 and 30 sides change, and a slight difference in heat dissipation occurs, or a wear statuses according to use for a long period are different. In a modified example, in order to keep balance between the fitting pressures according to the upper terminal component 260 and the lower terminal component 280, initial gaps in a state in which the battery pack is not mounted are differently configured. In other words, in a state in which the battery pack 100 is not mounted in the power tool main bodies 1 or 30 (a detached state), a minimal gap between the left and right arm parts 265 and 266 is different from a gap between the arm parts 285 and 286. Here, although the gap between the arm parts 265 and 266 of the upper terminal component 260 is 0.2 mm, the minimal gap between the arm parts 285 and 286 of the lower terminal component 280 is 0.5 mm.

In order to uniformize fitting pressures, the shapes of the upper terminal component 260 and the lower terminal component 280 are also devised. In other words, as illustrated in FIG. 7(2), when an inner angle of an almost right angle as denoted by a dotted line 264b is to be originally formed in the upper terminal component 260, here, a shape in which a reinforced face 264c having an isosceles triangle shape in a side view is added by extending a contour of a dotted line 264b in the direction of an arrow 264e is formed. As a result, the contour of this inner angle portion is inclined as denoted by an arrow 264d, and the mounting rigidity of the arm parts 265 and 266 of the upper terminal component is improved in accordance with this shape change. In accordance with the change in the shape of the inner angle portion of the upper terminal component 260, the shape of an outer angle portion of the lower terminal component 280 is formed as a shape in which a cut-down part 284c having an isosceles triangle shape in a side view is disposed by cutting down a portion of a dotted line 284b in the direction of an arrow 284e. As a result, the contour of this outer angle portion is formed as denoted by an arrow 284d, and the rigidity of the arm parts 285 and 286 of the lower terminal component 280 is reduced. The contours are determined such that contour portions denoted by arrows 264d and 284d are separate by a predetermined gap as being almost parallel to each other in a side view. When the cut-down part 284c is formed, a length of the bridge part 282 in the vertical direction is shortened. However, since the lower terminal component 280 is small and thus is sufficiently stronger than the upper terminal component 260 in terms of strength, and accordingly, strength balance is kept in accordance with such a shape change. In this way, by changing the shape of the inner angle portion such that the reinforced face 264c is added to the upper terminal component 260 and changing the shape of the outer angle portion such that such that strength is adjusted by forming the cut-down part 284c in the lower terminal component 280, the balance between strengths of both components is kept, and fitting pressures for a main body-side terminal according to the arm parts 265 and 266 and 285 and 286 can be configured to be equivalent.

FIG. 7(3) is a diagram of the upper terminal component 260 and the lower terminal component 280 seen from the front face. In a state in which the battery pack 100 is not mounted, minimal gaps of the upper and lower arm part sets are configured to be different. In other words, a gap between the lower arm parts 285 and 286 in the leftward-rightward direction is configured to be larger than a gap between the upper arm parts 265 and 266 in the leftward-rightward direction. This corresponds to a relation in which lengths of the arm parts 265 and 266 and the arm parts 285 and 286, which are disposed to be vertically aligned, in the mounting direction (the forward-backward direction) are in inverse proportion to each other. The long arm parts 265 and 266 face each other with a small gap in an initial state. On the other hand, the short arm parts 285 and 286 face each other with a long gap.

As described above, the power terminal uses the upper terminal component 260 and the lower terminal component 280 having a large plate thickness of 0.8 mm. Since only a minute current flows through a signal terminal component, similar to a conventional battery pack 15, the signal terminal component may be manufactured using a metal plate having a thickness of about 0.3 mm. In this modified example, the rigidity of power terminals through which a large current flows is further improved, and a fitting status can be sufficiently maintained not only during an operation but also over long-time use. In addition, in order to configure the fitting pressures of the upper and lower arm part sets to be almost the same, it is not limited to the adjustment of the gaps between the fitting parts and change the shape near a mounting root. Thus, it can be also achieved by using other changes, particularly, adjustment of a plate thickness, selection of a material of the terminal components, and the like.

Next, shapes of terminal units 20 of the power tool main bodies 1 and 30 sides and a connection state between the battery pack 100 and a connection terminal when the battery pack 100 is mounted in the power tool main bodies 1 and 30 will be described with reference to FIG. 8. FIG. 8(1) is a diagram illustrating a state in which the battery pack 100 is mounted in the power tool main body 30 for 36 V. As described above, 10 battery cells are housed inside the battery pack 100, five battery cells among them configure an upper cell unit 146, and the remaining five battery cells configure a lower cell unit 147. The power tool main body 30 operates a drive unit 35 by causing an upper positive electrode terminal 162 and an upper negative electrode terminal 167 to be fitted to each other. At this time, a short bar disposed in the power tool main body 30 forms an electric connection circuit denoted by a dotted line 59, and accordingly, the upper cell unit 146 and the lower cell unit 147 are in the state of being connected in series. In other words, the negative electrode of the upper cell unit 146 is connected to the positive electrode of the lower cell unit 147, the positive electrode of the upper cell unit 146 is connected as a positive electrode output of the battery pack 100, and the negative electrode of the lower cell unit 147 is connected as a negative electrode output. In this way, a series output of the upper cell unit 146 and the lower cell unit 147, in other words, a rated voltage of 36 V is output.

FIG. 8(2) is a diagram illustrating a state in which the battery pack 100 is mounted in the power tool main body 1 for 18 V. In the power tool main body 1 for 18 V, a positive electrode input terminal (to be described later with reference to FIG. 10) having a size simultaneously fitted to the upper positive electrode terminal 162 and the lower positive electrode terminal 172 is disposed. Similarly, a negative electrode input terminal (to be described later with reference to FIG. 10) having a size simultaneously fitted to the upper negative electrode terminal 167 and the lower negative electrode terminal 177 is disposed. In other words, a parallel connection state in which a positive electrode output is formed in a state in which positive electrodes of the upper cell unit 146 and the lower cell unit 147 are connected, and a negative electrode output is formed in a state in which negative electrodes of the upper cell unit 146 and the lower cell unit 147 are connected is formed. As a result, when the battery pack 100 is connected to the power tool main body 1, a rated voltage of 18 V is automatically output. In this way, by changing a connection relation with a switching terminal group (162, 167, 172, and 174) performing switching of the voltage of the battery pack 100, an output voltage acquired from the battery pack 100 can be switched.

FIG. 9(1) is a perspective view of a terminal unit 50 of a power tool main body 30 according to this embodiment, FIG. 9(2) is a perspective view of a short bar 59 as a single body, and FIG. 9(3) is a diagram illustrating a method of connecting the terminal unit 50 and the power terminals of the battery pack 100. In the terminal unit 50 of the power tool main body 30 having a rated voltage of 36 V, a terminal part 52a of a positive electrode input terminal 52 for receiving power and a terminal part 57a of a negative electrode input terminal 57 as input terminals for electric power are formed to be small and are disposed on the upper side. At the time of mounting, the terminal part 52a of the positive electrode input terminal 52 is fitted to only an upper positive electrode terminal 162, and the terminal part 57a of the negative electrode input terminal 57 is fitted to only the upper negative electrode terminal 167. On the other hand, a short bar 59 (59a to 59c) shorting the lower positive electrode terminal 172 and the lower negative electrode terminal 177 is disposed in the terminal unit of the power tool main body 30. As illustrated in FIG. 9(2), the short bar 59 is a short member formed from a metal conductive member and is a member that is bent in the shape of " ⊐ ". The terminal part 59b is formed on one end side of the connection part 59a of the short bar 59 and is disposed below the terminal part 52a. The terminal part 59c is formed on the other end side of the connection part 59a of the short bar 59, and the terminal part 59c is disposed below the terminal part 57a. The terminal part 59b is fitted to the lower positive electrode terminal 172, and the terminal part 59c is fitted to the lower negative electrode terminal 177. The short bar 59 is fixed by being cast to a base stand 51 formed using a synthetic resin (to be described later with reference to FIG. 7) together with other apparatus-side terminals such as the positive electrode input terminal 52, the negative electrode input terminal 57, and the like. At this time, the short bar 59 is not in contact with other metal terminals 52 and 54 to 58. In addition, the short bar 59 is used only for shorting the lower positive electrode terminal 172 and the lower negative electrode terminal 177, and accordingly, wiring to a control circuit of the power tool main body and the like does not need to be performed.

The positive electrode input terminal 52 is a part fitted to the upper positive electrode terminal 162 and is formed by a terminal part 52a formed in a flat plate shape, a wiring part 52c used for soldering a lead wire for connecting a wire to a circuit board side of the power tool main body 30 side, and a connection part (not illustrated in the drawing) that connects the terminal part 52a and the wiring part 52c and is cast to the base stand 51 formed using a synthetic resin. Similar to the positive electrode input terminal 52, the negative electrode input terminal 57 is formed such that the height of the terminal part 57a is degree of size that is about a half of those of the other terminal parts 54a to 56a and 58a or is smaller than about the half of those. The other terminal parts 54a to 56a and 58a are terminals for signal transmission and are connected to a control circuit board of the power tool main body 30 side using lead wires (not illustrated in the drawing) through the wiring parts 54c to 56c and 58c. On the front side and the rear side of the base stand 51, which is formed using a synthetic resin, of the terminal unit 50, concave parts 51b and 51c used for being pinched by the housing are disposed.

In FIG. 9(3), at the time of mounting the battery pack 100, when the battery pack 100 is relatively moved in a plugging direction with respect to the power tool main body 30, the positive electrode input terminal 52 and the terminal part 59*b* pass through the same slot 122 (see FIG. 3) and are inserted into the inside and are respectively fitted to the upper positive electrode terminal 162 and the lower positive electrode terminal 172. At this time, the positive electrode input terminal 52 presses and widens a space between the fitting parts of the upper positive electrode terminal 162 and is pressingly inserted between the arm parts 162*a* and 162*b* of the upper positive electrode terminal 162, and the terminal part 59*b* of the short bar 59 is presses and widens a space between the arm parts 172*a* and 172*b* of the lower positive electrode terminal 172 and is pressingly inserted therebetween. Similarly, the negative electrode input terminal 57 and the terminal part 59*c* pass through the same slot 127 (see FIG. 3), are inserted into the inside, and are respectively fitted to the upper negative electrode terminal 167 and the lower negative electrode terminal 177. At this time, the terminal part 57*a* of the negative electrode input terminal 57 presses and widens a space between the fitting parts and is pressingly inserted between the arm parts 167*a* and 167*b* of the upper negative electrode terminal 167. In addition, the terminal part 59*c* of the short bar 59 presses and widens a space between the arm parts 177*a* and 177*b* of the lower negative electrode terminal 177 and is pressingly inserted therebetween.

Since the plate thickness of the terminal parts 52*a*, 57*a*, 59*b*, 59*c* is slightly larger than an initial gap (a gap when the battery pack 100 is not mounted) of the fitting parts of the arm parts, a predetermined fitting pressure is applied to fitting points between the terminal parts 52*a*, 57*a*, 59*b*, and 59*c* and the upper positive electrode terminal 162, the lower positive electrode terminal 172, the upper negative electrode terminal 167, and the lower negative electrode terminal 177. As a result of such connection, the apparatus-side terminals (the terminal parts 52*a*, 57*a*, 59*b*, and 59*c*) of the power tool main body 30 and the power terminals (the upper positive electrode terminal 162, the lower positive electrode terminal 172, the upper negative electrode terminal 167, and the lower negative electrode terminal 177) of the battery pack sufficiently come into contact with each other in a state in which electrical contact resistance is decreased. In this way, the power tool main body 30 includes the third terminal 52*a* that is inserted into the signal slot 122 and is connected only to the first terminal 162 out of the first and second terminals 162 and 172 and the fourth terminal 59*b* that is inserted into the single slot 122 and is connected only to the second terminal 172. When the battery pack 100 is connected to the power tool main body 30, inside the single slot 121, the first and third terminals 162 and 52*a* are connected to each other to be a first electric potential together, and the second and fourth terminals 172 and 59*b* are connected to each other to be a second electric potential that is different from the first electric potential. Since a similar connection state is formed also on the negative electrode terminal pair 167 and 177 side, in accordance with realization of a connection form illustrated in FIG. 9(3), an output of serial connection between the upper cell unit 146 and the lower cell unit 147, in other words, a rated voltage of 36 V is output from the battery pack 100.

On the other hand, when the battery pack 100 is mounted in the conventional power tool main body 1 for 18 V, a connection relation as illustrated in FIG. 10 is formed. When the battery pack 100 is mounted in the power tool main body 1, the terminal part 22*a* of the positive electrode input terminal 22 is fitted and pressingly inserted to press and widen both opening ends of the upper positive electrode terminal 162 and the lower positive electrode terminal 172, an upper partial area of the terminal part 22*a* of the positive electrode input terminal 22 is brought into contact with the upper positive electrode terminal 162, and a lower partial area is brought into contact with the lower positive electrode terminal 172. In this way, by fitting the terminal part 22*a* to the arm parts 162*a* and 162*b* of the upper positive electrode terminal 162 and the arm parts 172*a* and 172*b* of the lower positive electrode terminal 172 at the same time, two positive electrode terminals 162 and 172 come into a short state. Similarly, the terminal part 27*a* of the negative electrode input terminal 27 is fitted and pressingly inserted to press and widen both opening ends of the upper negative electrode terminal 167 and the lower negative electrode terminal 177, an upper partial area of the terminal part 27*a* of the negative electrode input terminal 27 is brought into contact with the upper negative electrode terminal 167, and a lower partial area is brought into contact with the lower negative electrode terminal 177. In this way, by fitting the terminal part 27*a* to the arm parts 167*a* and 167*b* of the upper negative electrode terminal 167 and the arm parts 177*a* and 177*b* of the lower negative electrode terminal 177 at the same time, two negative electrode terminals 167 and 177 come into a short state, and an output of parallel connection between the upper cell unit 146 and the lower cell unit 147, in other words, a rated voltage of 18 V is output to the power tool main body 1. The terminal part 22*a* of the positive electrode input terminal 22 and the terminal part 27*a* of the negative electrode input terminal 27 are formed from metal plates having a constant thickness. Accordingly, it is important to configure the fitting pressure according to the arm parts of the upper positive electrode terminal 162 and the upper negative electrode terminal 167 and the fitting pressure according to the arm parts of the lower positive electrode terminal 172 and the lower negative electrode terminal 177 to be equivalent.

As described above, by mounting the battery pack 100 according to this embodiment in one of the power tool main body 1 for 18 V and the power tool main body 30 for 36 V, the output of the battery pack 100 is automatically switched, and accordingly, a battery pack 100, which corresponds to a plurality of voltages, that can be easily used can be realized. This voltage switching is not performed by the battery pack 100 side but is automatically performed in accordance with the shapes of the terminal units of the power tool main bodies 1 and 30 side, and accordingly, there is no concern that an erroneous voltage setting occurs. In addition, on the battery pack 100 side, a dedicated voltage switching mechanism such as a mechanical switch does not need to be disposed, and accordingly, a battery pack having low concern about a malfunction due to a simple structure and having a long life can be realized. The short bar 59 shorting the lower positive electrode terminal 172 and the lower negative electrode terminal 177 can be mounted together with the existing terminal unit 20 of the battery pack for 18 V inside the same space, and accordingly, a battery pack of a voltage switching type can be realized with a size compatible with a conventional battery pack. When charging is performed using an external charging device, charging can be performed using a connection method as illustrated in FIG. 10(2), and a charging device for charging both a high voltage/a low voltage does not need to be prepared.

In a case in which the battery pack 100 is charged using an external charging device (not illustrated in the drawing), charging can be performed using the same charging device as a conventional battery pack for 18 V. In such a case, the terminal of the charging device has a shape equivalent to that illustrated in FIG. 10(1), instead of the positive electrode terminals 162 and 172 for discharging, the positive electrode terminals for charging (the upper positive electrode terminal 161 and the lower positive electrode terminal 171) are connected to a positive electrode terminal of a charging device (not illustrated in the drawing). The connection status at that time is almost equivalent to the connection relation illustrated in FIG. 10(2). In this way, as a state in which the upper cell unit 146 and the lower cell unit 147 are connected in parallel, charging is performed using a charging device for 18 V, and accordingly, when the battery pack 100 according to this embodiment is charged, there is an advantage that a new charging device does not need to be prepared.

Next, a shape of a component used in three terminals 164 to 166, in other words, the signal terminal component 240 will be described with reference to FIG. 11. The signal terminal component 240 is manufactured by performing press processing for one metal plate. An arm part set (arm part base stands 245 and 246) extend from a base part 241 acquired by bending a metal thin plate such that a bridge part 242 that becomes a bottom portion of a "U" shape becomes a vertical face of the rear side to the front side, an arm part base stand 245 is formed to be divided into an upper and lower arm part set (arm parts 251 and 253), and the arm part base stand 246 is formed to be divided into the upper and lower arm part set 252 and 254 by forming a notch groove 246b extending in the horizontal direction. The metal plate used for the press processing is a flat plate having a thickness of 0.3 mm and may be thinner than the plate thickness of 0.5 mm of the upper terminal component 260 and the lower terminal component 280 used for power terminals. The upper and lower arm part sets are formed in the same shape and have the same length in the forward-backward direction, the same width in the vertical direction, the same plate thickness, and the like. Fitting parts 251d, 253d, and the like are formed in the upper arm part set (arm parts 251 and 252) and the lower arm part set (arm parts 253 and 254), have the same upper and lower shapes curved for the fitting parts, and the left and right arm parts have shapes having plane symmetry. Meanwhile, attachment positions of leg parts 249 and 250 are arranged to be shifted much in the forward-backward direction. A shape of a lower side portion of the base part 241 is different on left and right sides, and the shapes of a right side face 243 and a left side face 244 are asymmetrical. The leg part 249 is disposed to be shifted much to a further front side than the position of the previous leg part 250, and the leg parts 249 and 250 are spaced with a long distance apart in the forward-backward direction. In this way, the leg part 249 and the leg part 250 are not aligned to be adjacent to each other in the leftward-rightward direction but are disposed to be shifted to the front/read sides. Accordingly, an extending part 243a extending much to the front side is formed near a lower side of the right side face 243, and the leg part 249 is formed to extend from the front end thereof in a downward direction. The leg part 249 and the leg part 250 are caused to pass through a through hole (not illustrated in the drawing) formed in the circuit board 150 from the front face to the rear face side, and a portion protruding to the rear face side is soldered and fixed to the circuit board 150, and the upper arm part set (the arm parts 251 and 252) and the lower arm part set (the arm parts 253 and 254) are electrically connected to electronic devices mounted in the circuit board 150.

Above the leg part 249, a bending part 243b, which is used for restricting the amount of insertion of the circuit board 150 into the attachment hole 151 (see FIG. 4), bending toward the left side is formed. On the upper side and the lower side of a bending portion of the bending part 243b, cutout parts 243c and 249a that are cut out into a half circle shape for allowing easy bending processing are formed. For positioning the leg part 250 of the rear side in the circuit board 150, level difference parts 250a and 250b formed on the front side and the rear side of the leg part 250 are used. The level difference part 250a is formed by extending a lower side portion of the left side face 244 to the front side, and the level difference part 250b is formed using a lower side portion of the bridge part 242 curving in the "U" shape. In this way, by bringing the level difference parts 250a and 250b into contact with the front face of the circuit board 150, the mounting position of the leg part 250 in the vertical direction can be determined. The mounting positions of the leg parts 249 and 250 in the forward-backward direction are regulated by the position of the attachment hole 151 (see FIG. 4) of the circuit board 150.

FIG. 11(2) is a diagram of the signal terminal component 240 as a single body seen from the front lower side. As can be known from this diagram, by forming notch groove 245b extending in the horizontal direction on the front side of the arm part base stand 245, the upper and lower arm part set (the arm parts 251 and 253) is formed. In addition, the leg part 249 on the right side is larger than the leg part 250 on the left side and is disposed to be shifted to the front side. As a result, even when a force toward the upper side or the lower side is applied to the four arm parts 251, 252, 253, and 254, the signal terminal component 240 can be firmly held in the circuit board. An external force applied to the arm parts 251, 252, 253, and 254 is applied to press the arm part set to the rear side when the battery pack 100 is mounted in the power tool main bodies 1 and 30, and this force is applied in a direction for pulling the signal terminal component 240 down to the rear side. To the contrary, when the battery pack 100 is detached from the power tool main bodies 1 and 30, a force pressing the arm part set to the front side is formed, and this force is applied in a direction for pulling the signal terminal component 240 to the front side. In this way, an external force applied when the battery pack 100 is mounted and detached can be effectively received by shifting the positions of the leg parts 249 and 250 in the forward-backward direction, and the mounting rigidity of the signal terminal component 240 can be greatly reinforced, whereby the durability of the battery pack 100 can be improved. In addition, since the arm part set is formed into two stages of the upper side and the lower side, even when various vibrations or an external force is received during an operation of the power tool, a satisfactory contact state with the power tool main body-side terminals can be maintained using four contact areas of the arm parts. Here, "contact areas" represent areas in which the arm parts 251, 252, 253, and 254 of the signal terminal component 240 and input terminal (for example, the positive electrode input terminal 52 and the negative electrode input terminal 57) come into contact when the battery pack 100 is mounted in the power tool main body. On the other hand, the number of attachment holes and the number of soldering spots of the circuit board 150 that are required when this signal terminal component 240 is manufactured are the same as those of a conventional case, and accordingly, an increase in the manufacturing cost can be suppressed.

According to the signal terminal component 240 of this embodiment, there is not only improvement of rigidity but also other advantages. In a conventional signal terminal component (not illustrated in the drawing), while two leg parts that are electrically/mechanically attached to the circuit board through soldering are disposed, the leg parts are aligned in the leftward-rightward direction, a space between the leg parts is narrow, and soldered portions are frequently connected. Accordingly, wiring passing a signal pattern cannot be performed between the left and right leg parts. In the battery pack 100 according to this embodiment, one leg part 249 of the signal terminal component 240 is disposed on the front side, and the other leg part 250 is disposed on the rear side, whereby both leg parts are disposed to be separated from each other. Accordingly, a distance between the leg parts of the signal terminal component 240 becomes long, and it is easy to wire a plurality of wirings or a thick pattern through which a main current is caused to flow. Such a signal terminal component 240 is appropriate in a case in which the battery pack 100 according to this embodiment, in other words, high functionality of a conventional battery pack needs to be achieved, or a decrease in size in terms of a voltage ratio is desired to be promoted. Particularly, when a voltage switching function is realized after raising the voltage, the number of electronic devices mounted in the circuit board 150 increases. Thus, it is necessary to thicken a wiring through which a main current is caused to flow together with achieving efficiency of pattern wiring. In this embodiment, the circuit board 150 of which the circuit size is larger than that which is conventionally used is used, and electronic devices are mounted on not only the rear side of the connection terminal group but also the front area. At that time, wiring patterns are disposed also in the lower side of the signal terminal component 240. A method of the disposition will be described with reference to FIG. 12.

FIG. 12 is a diagram illustrating a status of a plurality of signal terminal components 240 fixed to the circuit board 150, FIG. 12(1) is a diagram seen from the front side, and FIG. 12(2) is a diagram of a signal terminal component 240 seen from the left side. The signal terminal component 240 is a common component and is fixed to be aligned in the leftward-rightward direction in the circuit board 150 as a T terminal 164, a V terminal 165, and an LS terminal 166. Since a notch part is formed to generate a gap S2 near the center of an arm part, the signal terminal component 240 has a shape in which an arm part set 251 and 252 on the upper side and an arm part set 253 and 254 on the lower side are vertically present in two stages. In a state in which an apparatus-side terminal is not mounted, parts (fitting parts) of the arm part set 251 and 252 on the upper side and the arm part set 253 and 254 on the lower side that approach the most are disposed to be separated by a slight gap or be brought into contact with each other. Leg parts 249 and 250 pass through attachment holes (see FIG. 4) of the circuit board 150, protrude to the lower side, and are fixed by the lower side (rear face) of the circuit board 150 through soldering 256.

In the side view illustrated in FIG. 12(2), the leg part 249 positioned on the front side and the leg part 250 positioned on the rear side are configured to be separate by a distance S3. The distance S3 may be longer than a gap (a distance in the leftward-rightward direction) between the leg parts 249 and 250. By forming a gap as denoted by an arrow 257, it becomes easy to wire a circuit pattern in this gap portion. FIG. 12(3) is a bottom view of the circuit board 150 illustrated in FIG. 12(1) seen from the lower side. In the rear face 150b of the circuit board 150, a through hole is formed at the center for soldering the signal terminal component 240, and lands 153a to 155a and 153b to 155b in which a soldering copper foil having an approximately rectangular shape is disposed on the periphery of the through hole are formed. Connection wiring patterns from the lands 153a to 155a and 153b to 155b to the upper cell unit 146 or the lower cell unit 147 are on the front face side of the circuit board 150 and not seen in FIG. 12(3). The lands 153a to 155a for the leg parts on the left side and the lands 153b to 155b for the leg parts on the right side are disposed to be shifted to the front and rear sides. As a result, as illustrated in the drawing, a plurality of wiring patterns 157 to 159 can be disposed between the lands 153a to 155a and the lands 153b to 155b. Here, although three wiring patterns 157 to 159 are illustrated to be disposed, one thick wiring or a combination of any other number of wirings may be disposed. In this way, since the wiring patterns are disposed between the leg parts 249 and 250 disposed to be shifted in the forward-backward direction, a plurality of wiring patterns 157 to 159 connecting the rear side and the front side of the signal terminals 164 to 166 can be disposed with a gap between the signal terminals 164 and 165 and 165 and 166 adjacent to each other maintained as in a conventional case. In addition, as another method for increasing the number of wiring patterns connecting the rear sides and the front sides of the signal terminals 164 to 166, a method of disposing a cutout part 243c as denoted by a dotted line in FIG. 12(2) may be used together. In a portion that is disposed near the lower side of the right side face 243 and comes into contact with the circuit board 150, a cutout part 243c that is upwardly notched as denoted by a dotted line is formed. Then, a part denoted by an arrow 257 becomes a gap that is separate from the circuit board 150 by a distance. Similar to the wiring patterns 157 to 159 illustrated in FIG. 12(3), circuit patterns can be disposed between this gap and the circuit board 150. In this way, not only on the rear face side 150b of the circuit board but also the front face side 150a, a plurality of wiring patterns connecting the rear sides and the front sides of the signal terminals 164 to 166 can be disposed, and accordingly, execution efficiency of the circuit board 150 can be improved.

FIG. 13 is a side view of a separator 445 after the components illustrated in FIG. 5 are assembled, FIG. 13(1) is a right side view, and FIG. 13(2) is a left side view. Here, for the convenience of description, as a connection terminal group, only two sets of positive electrode terminals 162 and 172 and negative electrode terminals 167 and 177 for discharging are illustrated, and illustration of the other connection terminals 161, 164 to 166, 168, and 171 is omitted. An upper cell unit 146 is composed of battery cells 146a to 146e disposed on the upper portion side and is connected to the circuit board 150 at a drawing tab 461a upwardly extending from a drawing plate 461 on the positive electrode side and a drawing tab 466a upwardly extending from a drawing plate 466 on the negative electrode side. A through hole (not illustrated in the drawing) having a slit shape is open in the circuit board 150, and upper portions of the drawing tabs 461a and 466a are exposed from the front face of the circuit board 150 to the upper side by causing the drawing tabs to pass through the through hole from the lower side to the upper side. By soldering the portions, electrical connection between the circuit board 150 and the drawing tabs 461a and 466a is performed. Similarly, a lower cell unit 147 is composed of battery cells 147a to 147e disposed on the lower end side and is connected to the circuit board 150 at drawing tabs 471a and 476a for connection extending from drawing plates 471 and 476 disposed at both ends to the upper side. A through hole (not illustrated in the drawing) having a slit shape is open in the circuit board 150, and upper portions of the drawing tabs 471a and 476a are exposed from the front face of the circuit board 150 to the upper side by causing them to pass through through hole from the lower side to the upper side. By soldering the portions, electrical connection between the circuit board 150 and the drawing tabs 471a and 476a is formed.

An intermediate drawing tab 463a extending to the upper side is disposed in the connection plate 463 illustrated in FIG. 13(1), an intermediate drawing tab 462a extending to the upper side is disposed in the connection plate 462 illustrated in FIG. 13(2). The intermediate drawing tabs 462a and 463a are bending bodies of thin metal plates in which intermediate drawing tabs 462a and 463a are formed by extending plate-shaped members from the connection plates 462 and 463 disposed on the upper end side, bending the extended plate-shaped members to the inner side along the circuit board 150, and bending the bent extended plate-shaped members to the upper side again. A through hole (not illustrated in the drawing) having a slit shape is open in the circuit board 150, and upper portions of the intermediate drawing tabs 462a and 463a are exposed from the front face of the circuit board 150 to the upper side by causing them to pass the through hole from the lower side to the upper side. The intermediate drawing tabs 462a and 463a are fixed by being soldered to the circuit board 150. The intermediate drawing tabs 462a and 463a are formed to have a width (a distance in the forward-backward direction) smaller than widths (lengths in the forward-backward direction) of the drawing tab 461a illustrated in FIG. 13(1) and the drawing tab 466a illustrated in FIG. 13. The reason for this is that, while the drawing tabs 461a, 466a, 471a, and 476a are terminals for output of electric power and is a terminal through which a large current flows, the intermediate drawing tabs 462a and 463a are terminals connected for measurement of an intermediate electric potential through which only a slight light current flows. Intermediate drawing tabs can be formed also in the other connection plates 464 and 465 disposed on the upper end side. However, here, from a relation of wiring patterns, the connection terminals 464a and 465a are disposed and are connected to the circuit board 150 using lead wires not illustrated in the drawing. Since it is difficult to make a connection to the circuit board 150 using a drawing tab for the connection plates 472 to 475 disposed on the lower-portion side, the connection terminals 472a to 475a are disposed and are connected to the circuit board 150 using lead wires 496 to 499.

FIG. 14 is a perspective view illustrating a state in which the circuit board 150 is fixed to the separator 445 and illustrates a state seen from the left front upper side. In the circuit board 150, upper portions of the through holes 152c and 152b having a slit shape are exposed from the front face of the circuit board 150 to the upper side. By soldering those portions, electrical connection between the circuit board 150 and the drawing tabs 471a and 476a is performed. As described above, although the battery cells 146a to 146e of the upper cell unit 146 are connected in series, and the battery cells 147a to 147e of the lower cell unit 147 are connected in series, lead wires 496 to 499 (however, lead wires 497 and 499 are not seen in FIG. 14) used for measuring electric potentials of the connection plates 462 to 464 and the connection plates 472 to 474 are connected. Ends 494b, 496b, 497b, 498b, and 499b of the lead wires illustrated in FIG. 4 are soldered to the circuit board 150. After fixing the circuit board 150 to the separator 445 by soldering these lead wires to the circuit board side first, ends on a side opposite to the ends 494b, 496b, 497b, 498b, and 499b of the lead wires are respectively soldered to the connection plates 464, 465, and 472 to 475. On the other hand, the connection plates 462 and 463 approaching the circuit board 150 are not connected to the circuit board 150 using lead wires and thus are directly connected using the intermediate drawing tabs 462a and 463a that are bent in an "L" shape and have vertical plate parts extending to the upper side.

The drawing tabs 461a and 466a for outputs (+output, −output) of the upper cell unit 146 have a shape that is an approximate "L" shape in a front view or a rear view, and the longitudinal direction thereof is disposed parallel to the longer side of the circuit board 150 having an approximately rectangular shape. The drawing tabs 461a and 466a are bending bodies of thin metal plates in which bent vertical wall portions are set as drawing tabs 461a and 466a by extending faces of the drawing plates 461 and 466 fixed to the terminals of the battery cells to the upper side and bending the faces to the inner side, slightly extending the upper face of the separator to the inner side in the horizontal direction, and upwardly bending the upper faces in an "L" shape at appropriate spots. However, for a battery cell disposed in the lower portion, electrodes for a battery cell are positioned in the upper portion, and thus, a similar drawing method cannot be employed. The reason for this is that, although it is possible to employ such a method, a drawing plate is superimposed on connection tabs disposed in electrodes of an upper cell part, and it is necessary to secure a sufficient insulating property. Thus, in this embodiment, the drawing plate 471 from the terminal face 471b (see FIG. 13(1)) of the lower cell is extended to the front side and then is bent to the left side at a right angle to form a side face part 471c is formed, and the side face part 471c is extended to the upper side. In other words, the drawing plate 471 is laid on a side face that becomes a shorter side in a top view of the separator 445 and is upwardly extended and is bent to the rear side at the front side face of the separator 445 to form a horizontal face part 471d, and the horizontal face part 471d is extended to the upper side at a right angle in a tab shape to form a drawing plate 471a. The drawing plate 471a is caused to pass through the through hole 152c having a slit shape formed in the circuit board 150 from the rear face to the front face and is soldered. The longitudinal direction of the drawing tabs 471a and 476a is disposed parallel to a shorter side of an approximately rectangular shape. By forming as such, the drawing plate 471 from the battery cell of the lower portion side can be disposed without interfering with the drawing plate of the battery cell of the upper portion side.

The drawing plate 476 from the minus terminal of the lower portion is drawn using a similar method and is drawn up to the drawing tab 476a. In this way, the separator is upwardly drawn using not only both left and right side faces but also the front side face and the rear side face, and accordingly, an output of a battery cell disposed in the lower portion can be drawn up to an upper part of a battery cell of the upper portion, in other words, the upper face part of the separator with high efficiency. In this embodiment, a heat dissipating part 471h of which the surface area is enlarged by extending from a part denoted by a dotted line to the left side is further formed in the drawing plate 471. The reason for this is that, since the drawing plate 471 is formed using a thin metal plate, the heat dissipating part is formed for cooling the battery cell of which the temperature has risen using the heat dissipating part 471. A position at which the heat dissipating part 471h is disposed is precisely a position facing the slit 104 (see FIG. 4) of the lower casing 101, and accordingly, there is an advantage in terms of heat dissipating. In addition, in a case in which a temperature rise in the battery cell does not matter, a left part (the heat dissipating part 471h) of the dotted line of the drawing plate 471 does not need to be arranged. A part of which the width of a connection path is greatly narrowed down, in other words, a fuse part 471e is further formed in the drawing plate 471. The fuse part 471e forms a cutout part 471f from the right side of the drawing plate 471, forms a cutout part 471g from the left side, and a remaining width (a width in the leftward-rightward direction) is greatly narrowed, whereby a function as a power fuse is included in the drawing plate 471 using this part. In a case in which a current more than a regulated current flows through the fuse part 471e in a predetermined time or more, the fuse part 471e first melts and cuts, thereby blocking one (an output from the lower cell unit) of the output path from the battery pack 100. A similar fuse function is similarly provided also near the drawing tab 461a of the drawing plate 461 (see FIG. 13(1)) from the plus terminal of the upper cell unit 146. Oval-shaped connection plates 462, 464, 473, and 474 used for connecting electrodes of battery cells adjacent to each other are formed using thin plates of metal such as stainless steel and are fixed to the battery cells through spot welding.

In the upper cell unit 146, a drawing tab 461a is provided for a plus output, and a drawing tab 466a is provided for a minus output. In addition, in the lower cell unit 147, a drawing tab 471a is provided for a plus output, and a drawing tab 476a is provided for a minus output. In this embodiment, the installation positions of the drawing tabs 461a, 466a, 471a, and 476a are also devised. A horizontal center line of the circuit board 150 or a center line of the positive electrode terminal pair 162 and 172 and the negative electrode terminal pair 167 and 177 is set as a horizontal center line A1 denoted by a dotted line. In addition, a line joining two center positions including a center position between leg parts of the upper positive electrode terminal 162 and the lower positive electrode terminal 172 and a center position between leg parts of the upper negative electrode terminal 167 and the lower negative electrode terminal 177 is set as a virtual line A2 denoted by a dotted line. When these horizontal center line A1 and the leg part center line A2 in the forward-backward direction are drawn, a positive electrode drawing tab 461a of the upper cell unit 146 is present inside an area in which the leg parts of the upper positive electrode terminal 162 are present, and a positive electrode drawing tab 471a of the lower cell unit 147 is present inside an area in which the leg parts of the lower positive electrode terminal 172 are present. By disposing the drawing tabs 461a and 471a in this way, efficient connection can be performed using a wiring pattern in which the drawing tab 461a and the upper positive electrode terminal 162 and the drawing plate 471a and the lower positive electrode terminal 172 are arranged on the circuit board 150. Similarly, a negative electrode drawing tab 476a of the lower cell unit 147 is present inside an area in which the leg parts of the upper negative electrode terminal 167 are present, and a negative electrode drawing tab 466a of the upper cell unit 146 is present inside an area in which the leg parts of the lower negative electrode terminal 177 are present. By disposing the drawing tabs 476a and 466a in this way, efficient connection can be performed using a wiring pattern in which the upper negative electrode terminal 167, the lower negative electrode terminal 177 are arranged on the circuit board 150.

FIG. 15 is a perspective view illustrating a state in which the circuit board 150 is fixed to the separator 445 and illustrates a state seen from the right rear upper side. Here, soldering spots of ends 497b and 498b of lead lines 497 and 498 (see FIG. 14) which are not seen in FIG. 14 can be also checked. In left and right edge portions near the center when seen in the forward-backward direction of the circuit board 150, concave parts 150c and 150d used for positioning the separator 445 of the circuit board 150 are formed, and convex parts 445c and 445d formed in the separator 445 are engaged therewith. In addition, on the front side of the separator 445, an abutting part 445e holding the front end of the circuit board 150 is formed and butts a front edge portion of the circuit board 150. In addition, in the drawing plate 461, a terminal face 461b extending in parallel with the electrodes of the battery cell and a horizontal face part 461c bent from the terminal face 461b to the upper side of the separator 445 at a right angle are formed, and a drawing tab 461a is formed by extending the horizontal face part 461c to the upper side at a right angle in a tab shape. By forming a cutout part 461e acquired by largely cutting out a part of the horizontal face of the fuse part 461d from the front side, the width (a distance in the forward-backward direction) of the fuse part 461d is decreased. Not only the drawing plate 461 but also the other drawing plates 466, 471, and 476 and the connection plates 462 to 465 and 472 to 475 are formed by performing press processing of a thin plate formed using stainless steel or the like. Accordingly, a separation body-type fuse device does not need to be added to the upper cell unit 146 and the lower cell unit 147. In the circuit board 150, screw holes 445a and 445b (not illustrated in the drawing) communicating with screw bosses 447a and 447b of the separator 445 are formed, and the circuit board 150 is fixed to the separator 445 using a screw 145.

FIG. 16 is a diagram illustrating a method of connecting drawing plates 461, 466, 471, and 476 of the battery pack 100 to positive electrode terminals 162 and 172 and negative electrode terminals 167 and 177. FIG. 16(1) is a diagram seen from the front side, and FIG. 16(2) is a diagram seen from the rear side. Illustration of connection terminals other than the positive electrode terminals 162 and 172 and the negative electrode terminals 167 and 177 for discharging among a connection terminal group is omitted. A drawing tab 461a that becomes an +output of the upper cell unit 146 is connected to the circuit board 150 at an area circle 2 on the rear side of the upper positive electrode terminal 162. Accordingly, as denoted by a dotted line, the drawing tab 461a and the upper positive electrode terminal 162 can be connected at a short distance in a straight line. A drawing tab 466a that becomes a −output of the upper cell unit 146 is connected to the circuit board 150 at an area circle 3 on the front side of the lower negative electrode terminal 177. Accordingly, as denoted by a dotted line, the drawing tab 466a and the lower negative electrode terminal 177 can be connected at a short distance in a straight line. A drawing tab 471a that becomes an +output of the lower cell unit 147 is connected to the circuit board 150 at an area circle 1 on the front side of the lower positive electrode terminal 172. Accordingly, as denoted by a dotted line, the drawing tab 471a and the lower positive electrode terminal 172 can be connected at a short distance in a straight line. A drawing tab 476a that becomes a −output of the lower cell unit 147 is connected to the circuit board 150 at an area circle 4 on the rear side of the upper negative electrode terminal 167. Accordingly, as denoted by a dotted line, the drawing tab 476a and the upper negative electrode terminal 167 can be connected at a short distance in a straight line. As described above, as denoted by dotted lines illustrated on the circuit board 150, connection to the connection terminals 162, 167, 172, and 177 for electric power can be performed in a straight line, and accordingly, a thick wiring pattern can be efficiently disposed without any intersection of such a wiring pattern.

FIG. 17 is a diagram illustrating shapes of a connection terminal group 161 to 162 and 164 to 168 and a board cover 180 disposed on the periphery thereof, FIG. 17(1) is a perspective view seen from the left front upper side, and FIG. 17(2) is a perspective view seen from the right rear upper side. Although illustration of a circuit board 150 is omitted here, after leg parts of a plurality of connection terminal groups 161 to 162, 164 to 168, 171, 172, and 177 are fixed to the circuit board 150 through soldering, the board cover 180 is mounted on the periphery of the connection terminals. The board cover 180 is manufactured through integral molding of a non-conductor, for example, a synthetic resin and protects the circuit board such that electrical short between connection terminals adjacent to each other does not occur by covering the periphery of the connection terminals, particularly, the periphery of leg parts. The purpose of disposition of the board cover 180 is to divide connection terminals using insulators. Accordingly, a plurality of partition walls 182 to 189 extending in the vertical direction are disposed and are connected to the front side using a connection member 181. A flat upper face 181a of the connection member 181 is formed to be the same face as a lower-portion face 111 (see FIG. 3) of an upper casing 110 and allows relative movement of a main body-side terminal unit reaching from the lower-portion face 111 to the connection member 181 to be easily performed. A horizontal wall of the connection member 181 is held in a state of floating from the circuit board 150, and a plurality of leg parts 181b to 181f are formed such that a gap is generated between the horizontal wall lower face of the connection member 181 and the circuit board 150. In addition, at both left and right ends of the connection member 181, fitting ribs 191a (see FIGS. 17(2)) and 191b for positioning that performs fitting such that both left and right sides of the circuit board 150 are interposed therebetween are formed. Furthermore, a vertical wall part 185a extends to the front side near the horizontal center of the connection member 181 and divides the center of the upper face 181a. A tip end of this vertical wall part 185a is used for positioning when an external charging device not illustrated in the drawing is mounted.

The board cover 180 also achieves a function as a lid unit for closing an opening of an area (a slot 123 illustrated in FIG. 3) that is not used. As illustrated in FIG. 17(1) and FIG. 17(2), vertical wall parts 184a and 184d and a closing plate 184c connecting those on the rear side are formed in a portion corresponding to the slot 123. In this way, the board cover 180 closes an area (the slot 123 illustrated in FIG. 3) portion that is not used and makes it difficult for a contaminant and a dust to enter from an empty slot the inside of the casing of the battery pack 100.

As can be understood from FIG. 17(2), rear positions of a plurality of partition walls 182 to 189 are located on a further rear side than rear positions of the connection terminals 161 to 168. Here, although illustration of the circuit board 150 is omitted, lower side portions of the partition walls 182 to 189 extend up to positions coming into contact with the front face of the circuit board 150. On the left side (see FIG. 17(1)) of the partition wall 188 and the right side of the partition wall 182, level difference parts 192a and 192b are formed. The level difference parts 192a and 192b become contact parts with which protrusion parts 516a and 516b of the terminal unit to be described with reference to FIG. 29 come into contact. Power terminals 161, 162, and 167 used for transmitting electric power are formed using metal plates thicker than those of signal terminals 164 to 166 and 168 that transmit only signals. The power terminals according to this embodiment include upper terminals 161, 162, and 167 and lower terminals 171, 172, and 177 (see FIG. 14) that are electrically independent from each other, and each thereof include an arm part set of arm parts adjacent in the leftward-rightward direction. The board cover 180 protects the power terminals such that they do not form a short circuit with terminals (a power terminal or a signal terminal) adjacent thereto in the leftward-rightward direction and prevents occurrence of short between arm part sets of the upper terminals 161, 162, and 167 and arm part sets of the lower terminals 171, 172, and 177 (see FIG. 14) adjacent to each other in the vertical direction. Accordingly, in the board cover 180, the partition walls 182, 183, 184, 187, and 188 adjacent to the power terminals become walls that are upwardly high, and, as illustrated in FIG. 17(1), horizontal wall parts 182b, 183b, 183c, 184b, 187b, and 188b also extending in the horizontal direction are additionally formed.

FIG. 17(3) is a front view of a connection terminal group 161 to 162 and 164 to 168 and a board cover 180. Among the partition wall parts, the partition walls 185 and 186 disposed between signal terminals are configured as low wall parts having a height H2 from the upper face 181a, and upper end positions thereof are positions lower than the lower arm parts of the signal terminals 164 to 166 and the LD terminal 168. In contrast to this, the partition walls 182 to 184 and 187 to 189 adjacent for power terminals become high wall parts having a height of H3 from the upper face 181a, and upper end positions thereof are located on a further upper side than the upper end positions of the lower positive electrode terminals 171 and 172 and the lower negative electrode terminals 177 and are located on a further lower side than the arm parts of the upper positive electrode terminals 161 and 162 and the upper negative electrode terminal 167.

Among the connection terminal groups, the power terminals, as described with reference to FIG. 6 to FIG. 12, are disposed such that the leg parts of the upper positive electrode terminals 161 and 162 and the lower positive electrode terminals 171 and 172 are aligned in a forward-backward direction, and the arm part sets thereof are separated from each other in the vertical direction. Similarly, the leg parts of the upper negative electrode terminal 167 and the lower negative electrode terminal 177 are aligned in the forward-backward direction, and the arm part sets thereof are disposed to be separated from each other in the vertical direction. When the battery pack 100 is mounted in an electrical apparatus main body having a rated voltage of 18 V, the electric potentials of the arm parts of the upper positive electrode terminals 161 and 162 and the upper negative electrode terminal 167 and the electric potentials of the lower positive electrode terminals 171 and 172 and the lower negative electrode terminal 177 are the same, and accordingly, there is no problem even in a case in which an upper terminal component and a lower terminal component come into contact with each other. However, when the battery pack 100 is mounted in an electrical apparatus main body having a rated voltage of 36 V, the electric potentials of the upper positive electrode terminals 161 and 162 and the lower positive electrode terminals 171 and 172 are different from each other, the electric potentials of the upper negative electrode terminal 167 and the lower negative electrode terminal 177 are also different from each other, and accordingly, it is important to prevent formation of a short circuit according to a contact between upper and lower arm parts. In addition, it is also important to configure the shape for which it is difficult for formation of a short circuit according to insertion of a foreign material to occur. Thus, in the board cover 180 according to this embodiment, among a plurality of partition walls 182 to 189 formed to upwardly extend, for the partition walls 182 to 184, 187, and 188 adjacent to the power terminals (the positive electrode terminal and the negative electrode terminal), the upper end positions are largely formed up to the upper side to have a height of H3 and largely extend also to the rear side. In addition, the horizontal wall parts 182*b*, 183*b*, 183*c*, 184*b*, 187*b*, and 188*b* extending also in the leftward/rightward horizontal direction from upper end positions of the vertical wall parts 182*a*, 183*a*, 184*a*, 187*a*, and 188*a* of the partition walls 182 to 184, 187, 188 are also formed.

The partition wall 182 includes a vertical wall part 182*a* and a horizontal wall part 182*b* and has a cross-sectional shape of an "L" shape. The horizontal wall part 182*b* has a shape extending in the horizontal direction such that it reaches from near the upper end of the vertical wall part 182*a* to the inside of a space between arm parts of power terminals (the upper positive electrode terminal 161 and the lower positive electrode terminal 171) adjacent to each other. In addition, the partition wall 183 has a cross-sectional shape of a "T" shape and is formed by a vertical wall part 183*a* and horizontal wall parts 183*b* and 183*c* extending in both directions from an upper end portion of the vertical wall part 183*a*. The horizontal wall part 183*b* extends to a side approaching an adjacent horizontal wall part 182*b* and has a tip end reaching inside a space between arm parts of the upper positive electrode terminal 161 and the lower positive electrode terminal 171. Similarly, the horizontal wall part 183*c* extends to a side approaching an adjacent horizontal wall part 184*b* and has a tip end reaching inside a space between arm parts of the upper positive electrode terminal 162 and the lower positive electrode terminal 172. As in FIG. 17(3), when the positive electrode terminal group is seen from the front side, the position of the right side face of the upper positive electrode terminal 161 and the position of the right side face of the lower positive electrode terminal 171 are the same position. A left end position 182*c* of the horizontal wall part 182*b* is on a further left side than the positions of the right side faces of the upper positive electrode terminal 161 and the lower positive electrode terminal 171, in other words, the horizontal wall part 182*b* extends by a length to enter the lower portion of the arm part 161*a* of the upper positive electrode terminal 161. At this time, the horizontal wall part 182*b* is positioned on an upper side of the arm part 171*a* of the lower positive electrode terminal 171.

The vertical wall part 182*a* and the horizontal wall part 182*b* are formed to have a length in the forward-backward direction, as can be understood from FIG. 17(2), to be longer than a length of the lower positive electrode terminal 171 in the forward-backward direction, a front end position thereof is almost the same as the position of the tip end of the arm part of the lower positive electrode terminal 171, and a rear end position thereof is on a further rear side than a rear end position of the lower positive electrode terminal 171. In this way, the vertical wall part 182*a* covers the entire right side face and the entire left side face of the lower positive electrode terminal 171 and covers also an upper part except for a space into which apparatus-side terminals are inserted near the horizontal center. Here, although only the shapes of the vertical wall part 182*a* and the horizontal wall part 182*b* of the lower positive electrode terminal 171 have been described, also for the lower positive electrode terminal 172, partition walls 183 and 184 of which the entire right side face, the entire left side face, and the upper part except for the center portion are covered are disposed. Accordingly, even when an external force is applied to the lower positive electrode terminals 171 and 172, and a force for bending these is applied, the terminals can be effectively maintained by the board cover 180, and a concern that a lower terminal component and an upper terminal component for power transmission unintentionally form a short circuit can be significantly reduced.

Also the negative electrode terminal side 167 and 177 is devised similar to the positive electrode terminal side 161, 162, 171, and 172, and large partition walls 187 and 188 are disposed on both left and right sides of the negative electrode terminal. The partition wall 187 has a shape similar to that of the partition wall 182, is formed by a vertical wall part 187*a* and a horizontal wall part 187*b*, and has a cross-sectional shape to be an "L" shape. The horizontal wall part 187*b* is formed to extend from an upper end part of the vertical wall part 187*a* to the negative electrode terminal side. The partition wall 188 is formed to be horizontally symmetrical with respect to the partition wall 187 and is formed by a vertical wall part 188*a* and a horizontal wall part 188*b*. The horizontal wall parts 187*b* and 188*b* have a degree of size for which a tip end portion enters into a space between the arm part set of the upper negative electrode terminal 167 and the arm part set of the lower negative electrode terminal 177. In this way, the partition walls 187 and 188 are formed to cover the periphery of the negative electrode terminals 167 and 177 that are power terminals, and, accordingly, even when a strong external pressure is applied to the upper negative electrode terminal 167 or the lower negative electrode terminal 177, and the terminal moves (is bent) in a forward-backward direction, a possibility that a short phenomenon occurs due to the presence of wall parts such as the horizontal wall parts 187*b* and 188*b* and the like can be significantly reduced.

The partition walls 185 and 186 between the signal terminal group 164 to 166 have only an upwardly low height H2. This reason for this is that, since only a low-power signal flows through the signal terminal group 164 to 166, the degree of risk at the time of short for the signal terminal group is lower than that of the power terminal side, and accordingly, the degree of necessity for insulation is low. In addition, each of the signal terminal group 164 to 166 is one component, and the arm part of the upper side and the arm part of the lower side have the same electric potential, and accordingly, the degree of necessity for worrying about short between the upper and lower arm parts is low. The partition wall 184 includes vertical wall parts 184*a* and 184*d*, and a space therebetween is connected at the closing plate 184*c* and the rear connection plate 184*e*. The closing plate 184*c* is a flat plate extending in the vertical direction and the leftward-rightward direction and performs an action of closing an empty space (the internal space of the empty slot 123 illustrated in FIG. 3) between the upper positive electrode terminal 162 and the T terminal 164. A horizontal wall part 184*b* extending to the positive electrode terminal side is formed near the upper end of the vertical wall part 184*a*.

The connection member 181 connects front side portions of the vertical wall parts 182*a*, 183*a*, 184*a*, 184*d*, 185, 186, 187*a*, and 188*a* positioned between connection terminals. A horizontal wall forming the upper face 181*a* of the connection member 181 is in a floating state from the circuit board 150. Lower side portions of the vertical wall parts 182*a*, 183*a*, 184*d*, 185, 186, 187*a*, 188*a*, and 189 are positioned to come into contact with the circuit board 150 not illustrated in the drawing. Also a lower portion of this connection member 181 is filled with a liquid curable resin covering the upper face of the circuit board 150 as will be described later with reference to FIG. 23, and then the curable resin is cured. In accordance with solidification of the curable resin, portions near lower ends of a plurality of vertical wall parts 182*a*, 183*a*, 184*a*, 184*d*, 185, 186, 187*a*, 188*a*, and 189 and the circuit board 150 are firmly fixed. On the front wall face of the connection member 181, a plurality of leg parts 181*b* to 181*f* are formed, and spaces between the leg parts 181*b* to 181*f* become notch parts. The reason for forming the notch parts instead of configuring the leg parts 181*b* to 181*f* as wall parts that are continuous in the leftward-rightward direction is for uniformly spreading a liquid resin widely in the rear portion and the front portion of the circuit board 150. Since the liquid resin has relatively low viscosity, the resin passes between the leg parts 181*b* to 181*f* and flows in the forward-backward direction (details will be described later).

FIG. 18 is a diagram illustrating the board cover 180 as a single body, and FIG. 18(1) is a perspective view seen from the left front upper side. In FIG. 18(1), a length L1 of the horizontal wall parts 182*b*, 183*b*, 183*c*, 184*b*, 187*b*, and 188*b* in the forward-backward direction corresponds to a length of the arm parts 265 and 266 of the upper terminal component 260 and the arm parts 285 and 286 of the lower terminal component 280 illustrated in FIG. 7. Here, the length has a degree for which the front ends of the horizontal wall parts 183*b*, 183*c*, 184*b*, 187*b*, and 188*b* are located on a further front side than the front end positions of the arm parts 265 and 266 of the upper terminal component 260 and the arm parts 285 and 286 of the lower terminal component 280 illustrated in FIG. 7, and the rear ends thereof are located on a further rear side than that of the right side face 263 and the left side face 264 of the upper terminal component 260 illustrated in FIG. 7. A closing plate 184*c* extending in the vertical direction is formed in the partition wall 184, and a rear connection plate 184*e* is formed on the rear side thereof. A space 184*f* is formed between the rear connection plate 184*e* and the closing plate 184*c*.

FIG. 18(2) is a perspective view of the board cover 180 as a single body seen from the right front lower side. As can be understood from this drawing, the bottom side positions of the partition walls 182 to 189 are the same as the bottom side positions of the leg parts 181*b* to 181*f*, and the board cover 180 is placed such that the bottom side portions come into contact with the front face of the circuit board 150. In the leg parts 181*b* and 181*f*, two fitting ribs 191*a* and 191*b* protruding in a further downward direction are formed, and, by positioning the circuit board 150 inside a space between the fitting ribs 191*a* and 191*b* facing each other, the position of the board cover 180 in the leftward-rightward direction is determined. A bottom plate 184*g* is disposed between the vertical wall parts 184*a* and 184*d*, and the lower face of the slot 123 (see FIG. 3) that is not used is closed.

FIG. 18(3) is a front view of the board cover 180 as a single body. After the connection terminal group is fixed to the circuit board 150, in other words, as illustrated in FIG. 14, after the connection terminal group 161 to 162, 164 to 168, 171 to 172, and 177 are fixed to the circuit board 150, the board cover 180 mounts the circuit board 150 by sliding the circuit board 150 from the front side in the direction of the connection terminal group. Accordingly, the board cover 180 has a positional relation in which it can be mounted without being brought into contact with the arm parts of the connection terminal group, the right side face, and the left side face, and it is not brought into contact with the arm parts of the connection terminal group, the right side face, and the left side face at a normal time also after mounting. A height H7 of the fitting ribs 191*a* and 191*b* is equal to or larger than a plate thickness of the circuit board 150 not illustrated in the drawing.

FIG. 19 is a diagram illustrating the connection terminal group and the board cover 180 disposed on the periphery thereof, FIG. 19(1) is a top view, and FIG. 19(2) is a rear view. The positive electrode terminal pair 161 and 171 for charging is slightly offset to the front side and is disposed on a further front side than the positive electrode terminal pair 162 and 172 that is adjacently disposed. This is due to restriction on space and is for avoiding a moving range of a latch mechanism (not illustrated in the drawing) that is disposed on the right rear side of the positive electrode terminal pair 161 and 171. Accordingly, when there is no restriction on space, the positive electrode terminal pair 161 and 171 may be disposed such that front end positions of the positive electrode terminal pair 162 and 172 and the negative electrode terminal pair 167 and 177 are aligned. In addition, the LD terminal 168 has a size different from those of the other signal terminals (the T terminal 164, the V terminal 165, and the LS terminal 166) and is formed to have a slightly smaller size. This is also due to the restriction on space, and since a latch mechanism not illustrated in the drawing reaches a right rear side of the LD terminal 168, and that is for avoiding the latch mechanism. From the relation in which the LD terminal 168 is configured to be small, a length of the partition wall 189 in the forward-backward direction is formed to be small.

FIG. 20(1) is a right-side view of the connection terminal group and the board cover 180 disposed on the periphery thereof. Here, hatching is applied to a board cover 180 part except for the vertical wall part 185*a* near the horizontal center so as to be differentiated from the connection terminal unit. As can be understood from this drawing, almost the entire right side of the lower positive electrode terminal 171 is covered with the partition wall 182 of the board cover 180. In addition, in the upper positive electrode terminal 161 except for the rear end portion, a part of the lower side than the arm part set 161*a* and 161*b* is covered. In addition, since illustration of the circuit board 150 is omitted in the drawing, although leg parts of the upper positive electrode terminal 161 and the lower positive electrode terminal 171 are seen, actually, the leg parts are disposed inside of through holes of the circuit board. FIG. 20(2) is a left side view. Here, since the partition wall 189 is disposed on the left side of the LD terminal 168, most of the part is covered. In addition, from the drawing, it can be understood that the upper end position of the partition wall 188 has reached between the aim part 167*b* of the upper negative electrode terminal 167 and the arm part 177*b* of the lower negative electrode terminal 177.

FIG. 21 is a diagram illustrating a status in which apparatus-side terminals are inserted into the board cover 180 and illustrates the periphery of the upper positive electrode terminal 162 and the lower positive electrode terminal 172. In the partition walls 183 and 184 positioned on both left and right sides of the upper positive electrode terminal 162, horizontal wall parts 183*c* and 184*b* are formed to enter between the arm parts 162*a* and 162*b* of the upper positive electrode terminal 162 and the arm parts 172*a* and 172*b* of the lower positive electrode terminal 172. A gap between the horizontal wall parts 183*c* and 184*b* in the horizontal direction is L2. As denoted by a dotted line, the terminal unit 52*a* of the positive electrode input terminal 52 enters between arm part sets 162*a* and 162*b* between the horizontal wall parts 183*c* and 184*b*. Here, since the thickness of the terminal part 52*a* is TH1, a relation of TH1<L2 is formed, and L2 is a gap that is about twice TH1. As a result, even when the terminal part 52a is violently inserted, or a certain foreign material is inserted, a phenomenon in which a minimal gap portion of the arm parts 162a and 162b and a minimal gap portion of the arm parts 172a and 172b become separate by L2 or more in the leftward-rightward direction can be effectively inhibited. In addition, since front end positions of the horizontal wall parts 183c and 184b are configured to be located on a further front side than front end positions of the arm parts 162a and 162b by the distance F1, when the terminal part 52a of the positive electrode input terminal of the electrical apparatus main body side is inserted, it is reliably guided between the arm parts 162a and 162b by the horizontal wall parts 183c and 184b. By configuring the gap and the front end positions of the horizontal wall parts 183c and 184b in this way, damages in the arm parts 162a and 162b and the arm parts 172a and 172b are prevented, and a fitting status between the upper positive electrode terminal 162 and the lower positive electrode terminal 172 can be satisfactorily maintained over a long period.

FIG. 22 is a diagram in which only the upper casing 110 illustrated in FIG. 3 is extracted and is a diagram illustrating the shape of the upper-portion face 115 of the upper casing 110. FIG. 22(1) is a perspective view of the upper casing 110, and FIG. 22(2) is a perspective view seen in a direction of an arrow B illustrated in FIG. 22(1). In FIG. 22(1), hatching is applied to a portion having a level difference shape, and a range thereof is clearly illustrated. As described with reference to FIG. 17(3), the power terminals 161, 162, and 167 are formed to be higher in an upward direction than the signal terminals 164 to 166 and 168 by the distance H. The reason for this is that the power terminals are formed using plates thicker than those of the signal terminals. Accordingly, in the shape of the upper-portion face of a conventional upper casing, the upper end portions of the power terminals 161, 162, and 167 interfere with an inner wall of the upper-portion face. Thus, in this embodiment, the position of the inner wall face seen in a vertical direction of the upper-portion face 115 of the upper casing 110 is configured to be partially shifted to the upper side so as to gain upper clearances of the power terminals 161, 162, and 167. Although a method in which only the position of the inner wall face is configured as a concave part that is concave in an upward direction may be considered, when the screen shape of the upper-portion face 115 is not changed, the thickness of a part of the upper-portion face 115 of the upper casing 110 is insufficient, and there is concern that the strength locally decreases. Thus, in this embodiment, upper parts near positions, at which the power terminals 161, 162, and 167 are positioned, that are an outer side face of the upper-portion face 115 are caused to protrude toward the outside, whereby convex parts 115a and 115b are formed. In this way, since a part of the wall face of the upper-portion face 115 is configured to be shifted to the upper side, a housing space can be increased in the inner portion, and a decrease in the strength of the wall face can be prevented. In this embodiment, since the protrusion height H4 of the outer wall face of the upper-portion face 115 is configured to be lower than the cavity height H5 of the inner wall face, the sizes of the convex parts 115a and 115b in the upper-portion face 115 can be suppressed to be small and is within a range in which the battery pack can be mounted in a conventional power tool main body 1 without any problem. In addition, the upper-portion face 115 is not in the same plane, a partial level difference part is formed therein, and the level difference part is formed such that the height of the hatched portion becomes high, whereby, the strength becomes equal to or higher than that of a conventional upper casing formed in the same plane.

Next, a method of coating a circuit board 150A with a resin will be described with reference to FIG. 23. FIG. 23 is a perspective view of the circuit board 150A, here, the shapes of a connection terminal group mounted in the circuit board 150A and a board cover 180A are slightly different from those of the structure of the circuit board 150 illustrated in FIG. 4, the resin coating method is the same. On an upper face (front face) of the circuit board 150A, a main area 156a and a sub area 156b for mounting multiple electronic devices not illustrated in the drawing are disposed. The main area 156a is disposed on a further rear side than a connection terminal group, and a protection management IC (to be described later) including a microcomputer is mounted therein. The sub area 156b is an area disposed on a further front side than the connection terminal group. Here, all the mounted electronic devices are covered with a curable resin. The curable resin is cured from a liquid state, and, for example, a urethane resin may be used. In order to uniformly fill the upper face of the circuit board 150A with a liquid urethane resin, first, an adhesive resin 155 having the role of a bank blocking flow-out of a liquid resin is attached to an outer edge portion of a device group mounted in the circuit board 150A. As the adhesive resin 155, for example, an adhesive agent extracted in a cylindrical shape through a thin extraction port from the inside of a tube-shaped container is continuously attached along an outer edge of an area that is desired to be filled with the urethane resin. At this time, it is important to attach the adhesive agent along the outer edge portion without any break, and one end and the other end are formed to come into contact with the board cover 180. When the adhesive resin 155 serving as an outer frame is attached to almost one round of the outer edge portion into which the resin is caused to flow in this way, thereafter, a urethane resin that is in the liquid state is caused to flow to the inner side of the upper face of the circuit board 150A.

The amount of the urethane resin caused to flow is an amount sufficiently filling the range enclosed by the adhesive resin 155. At this time, for a spot that is not desired to be covered by a resin, an outer edge of the spot is enclosed by adhesive resins 155a to 155c, and a resin flowing into the outer side thereof does not reach inside the range enclosed by the adhesive resins 155a to 155c. In addition, in a case in which a position into which a urethane resin flows is near a position of the main area denoted by an arrow 156a, the resin does not flow into the inside of the range enclosed by the adhesive resin 155a. Furthermore, in a state in which the horizontal wall face of the upper face the board cover 180A is floating, a rear side wall face of the lower part thereof is in an open state, the front side becomes a wall face, and a notch part is formed in a part thereof, whereby a resin can satisfactorily flow from the main area 156a to the sub area 156b. In this way, by performing curing after the entire device mounting face of the circuit board 150A is covered with the resin, the inside of the target range is covered with a resin without any gap with a uniform height on the front face side of the circuit board 150A, and mounted electronic devices can be prevented from the influences of water and dust. In addition, in a case in which a double-sided board is used as the circuit board 150A, the rear face side may be covered with a resin in a similar procedure. In addition, parts for which resin filling using the adhesive resins 155a to 155c is excluded, for example, a portion near a screw hole and a soldering portion of a lead wire may be covered with a resin at the time of performing a process after completion of screw fastening or at the time of performing a process after completion of soldering.

Embodiment 2

FIG. 24(1) and FIG. 24(2) are perspective views illustrating a terminal unit 200 according to a second embodiment of the present invention. The terminal unit 200 is used in an electrical apparatus having a rated voltage of 36 V, and the arrangement of terminals and a basic shape are the same as those illustrated in FIG. 9. The same reference signs are assigned to the same components. The terminal unit 200 may be mounted in a power tool main body 30 for 36 V replacing the terminal unit 50. At that time, the shapes of connection terminals of a battery pack 100 may be the same. In FIG. 24, hatching is applied to portions in which a metal terminal is exposed, whereby a resin part and a metal part can be easily differentiated from each other in the illustration. Here, a different point is the shape of a base stand 201, which is formed of a synthetic resin, holding terminal parts 52a and 54a to 58a formed using metal and terminal parts 59b and 59c of a short bar. The basic shape is equivalent, an upper face 201a is included, and concave parts 201c and 201d that are in parallel with the upper face 201a are formed on a front side and a rear side near the upper face 201a, and lid parts 202a, 204a to 206a, and 208a formed using resins are formed near rear end roots of the terminal parts 52a to 58a. The lid parts are parts in which a metal surface is covered by a synthetic resin so as not to be exposed to the outside and are formed by being integrally molded with the base stand 201 near a rear end root not interfering with a connection terminal of the battery pack 100. Also near rear roots of the terminal parts 59b and 59c of the short bar 59, lid parts 202b and 207b are formed similarly.

In the second embodiment, a partition 210 formed using a synthetic resin is additionally formed at a position corresponding to an empty slot 123 (see FIG. 3) in which no terminal is disposed. The partition 210 is a partition plate formed using an insulating material that is used for making it difficult for a positive electrode input terminal 52 and the terminal part 59b of the short bar 59 to form short circuits with the other terminal parts. The material of the metal terminal parts 52a, 54a to 58a, 59b, and 59c is phosphor bronze used for a spring, has a high strength, is strong for bending, and has high wear resistance. The terminal parts 52a and 54a to 58a and the terminal parts 59b and 59c are firmly fixed to the base stand 201 formed using a synthetic resin through casting, and, particularly, also an upper side portion is cast to the inside of the base stand 201. However, the terminal parts 59b and 59c extend only to the front side at a rear vertical face of the terminal unit 200, and an upper side portion and a lower side portion are in an open state. The partition 210 is a wall-shaped part formed by being integrally molded with the base stand 201, and the partition 210 is formed to have a size in the vertical direction to be large in a downward direction and a forward direction from an adjacent terminal part 54a.

FIG. 25(1) and FIG. 25(3) are perspective views of the terminal unit 200 from different angles, and FIG. 25(2) is a front view. As can be understood from FIG. 25(1) and FIG. 25(3), horizontal holding parts 204b, 205b, 206b, and 208b extending in the horizontal direction are formed near lower roots of the lid parts 204a, 205a, 206a, and 208a formed using a resin. Lower faces of the horizontal holding parts 204b, 205b, 206b, and 208b, as can be understood from the front view of FIG. 25(2), are uniformly formed to be the same face when seen in a height direction, and such lower faces are located at positions approaching or coming into contact with an upper face 181a of a board cover 180 (see FIG. 17) at the time of mounting the battery pack 100. By causing the lower faces of the horizontal holding parts 204b, 205b, 206b, and 208b to approach or come into contact with the board cover 180, an electrical insulating property between metal terminals adjacent to each other is improved, and a range in which the terminal unit 200 relatively moves with respect to the battery pack 100 in the vertical direction can be restricted. In addition, predetermined gaps 202c to 207c are open between the horizontal holding parts 204b, 205b, 206b, and 208b in the leftward-rightward direction. Due to a shape in which connection terminals of the battery pack 100 side have terminal parts of the terminal unit 200 interposed therebetween from the leftward-rightward direction, contaminants and dust attached to the metal terminal parts are pushed to the rear side in accordance with an operation of mounting the battery pack 100, and contaminants and dust may be easily attached near rear roots of the metal terminals. Thus, the gaps 202c to 207c are formed for causing contaminants and dust attached thereto to easily fall in a downward direction. As can be checked from the front view of FIG. 25(2), the horizontal holding parts 204b, 205b, 206b, and 208b are formed in a so-called taper shape in which a horizontal width thereof in the leftward-rightward direction is widened from the front side toward the rear side. On the other hand, no horizontal holding part is formed in the lower faces of the terminal parts 59b and 59c of the short bar. The reason for this is that, by configuring the terminal parts 59b and 59c to be easily deformed in the downward direction, it becomes difficult for them to come into contact with the terminal parts 52a and 57a when a strong shock according to a fall of the battery pack 100 or the like is applied.

The partition 210 has an approximately rectangular shape in a leftward/rightward side view, an upper side 210a is integrally formed so as to come into contact with the base stand 201, and a rear side 210d that is a base comes into contact with the base stand 201. A lower side 210c is integrally formed with the horizontal holding part 203b. The partition 210 can be simultaneously formed at the time of molding the base stand 201. A thickness TH (a width TH in the leftward-rightward direction) of the partition 210 is formed to be larger than a plate thickness T6 of the terminal parts 52a and 54a to 58a that are metal parts. A height H6 of the partition 210 is the same as a height of the vertical wall 200a of the terminal unit 200, and a length L6 in the forward-backward direction (see FIG. 25(1)) is almost the same as the length of the horizontal wall 200b of the terminal unit 200. In addition, the partition 210 is longer in the forward direction and is larger in the downward direction than the terminal parts 52a to 58a, 59b, and 59c. Furthermore, when the battery pack 100 is mounted in the power tool main body 30, the partition 210 is only inserted into the inside of an empty slot 123 (see FIG. 3) and does not come into contact with any connection terminal of the battery pack 100. In addition, the partition wall 184 of the board cover 180 (see FIG. 17) may be configured not to be interfered at the time of inserting the partition 210 by shifting the position of the closing plate 184c to the rear side. While two small positive electrode terminal parts 52a and 59b disposed in the vertical direction may be deformed much in accordance with a large shock such as falling of the battery pack 100 or the like, the positive electrode terminal parts 52a and 59b have a considerably large elastic deformation area on the basis of the relation of the material and may be deformed but is not easily bent. In this embodiment, when the positive electrode terminal parts 52a and 59b are deformed to the inner side (the terminal part 54a side), the positive electrode terminal parts are caused to come into contact with the partition 210, and the deformation range can be restricted.

Embodiment 3

FIG. 26 is a third embodiment of the present invention. A terminal unit 50A illustrated here is acquired by partly deforming the shape of the terminal unit 50 illustrated in FIG. 9. The same reference numeral is assigned to parts using the same constituent components. Here, a terminal part 52f of a positive electrode input terminal 52A that is a power terminal is configured to have a length that is only a half of the front side of the terminal part 52a illustrated in FIG. 25, and a terminal part 79b of a short bar is configured to have a length that is only a half of the rear side of the terminal part 59b illustrated in FIG. 25. In this way, since the lengths of the terminal part 52f and the terminal part 79b are shortened, the terminal part 52f and the terminal part 79b of the short bar do not overlap each other in the forward-backward direction when seen in the vertical direction. As denoted by an arrow 50d, no metal terminal is disposed on the rear side of the terminal part 52f. This similarly applies also to the negative electrode input terminal 57A side, a terminal part 58f and a terminal part 79c of the short bar are disposed to deviate from each other in the forward-backward direction, and the terminal part 58f and the terminal part 79c do not overlap each other when seen in the vertical direction and when seen in the forward-backward direction. As denoted by an arrow 50e, no metal terminal is disposed on the rear side of the terminal part 58f.

FIG. 26(2) and FIG. 26(3) are perspective views of an upper terminal component 220 and a lower terminal component 230 corresponding to the terminal unit 50A. Here, a point in which leg parts of the upper terminal component 220 and the lower terminal component 230 are disposed to be separated from each other in the forward-backward direction and a point in which an arm part set 225 and 226 and an arm part set 235 and 236 are disposed to be separated from each other in the vertical direction are similar to those in the case of the upper terminal component 260 and the lower terminal component 280 illustrated in FIG. 7. However, the length of the upper arm part set 225 and 226 in the forward-backward direction is configured to be short, and the length of the lower arm part set 235 and 236 in the forward-backward direction is configured to be long. FIG. 26(3) illustrates a state in which a conventional terminal unit 20 (see FIG. 10) is fitted to the upper terminal component 220 and the lower terminal component 230 illustrated in FIG. 26(2). Here, when a terminal part 22a of the positive electrode input terminal 22 is inserted, positions of a fitting area of the upper terminal component 220 and a fitting area of the lower terminal component 230 in the forward-backward direction are positions separate from each other by a distance L7. However, by configuring fitting pressures of the arm part set 225 and 226 and the arm part set 235 and 236 to be the same, functions similar to those of the upper terminal component 260 and the lower terminal component 280 according to the first embodiment can be realized.

Embodiment 4

Next, a fourth embodiment of the present invention will be described with reference to FIG. 27 and FIG. 28. FIG. 27 is a schematic circuit diagram of a battery pack and an electrical apparatus main body according to the fourth embodiment. The battery pack 100 has the same configuration as that of the battery pack according to the first embodiment described with reference to FIG. 3 to FIG. 22. Here, only a circuit diagram of the battery pack 100 is illustrated. An electrical apparatus main body has a feature in which a switching circuit, in other words, a short bar connecting switch 59d is disposed in a short bar 59 with respect to the first embodiment. There is no change in the other components. A drive unit such as a motor is controlled by a control unit including a microcomputer. A positive electrode input terminal 52 and a negative electrode input terminal 57 are connected to this drive unit, and an operating switch 34 such as a trigger switch or the like is disposed in such circuits. The short bar connecting switch 59d is an additional changeover switch used for establishing or releasing electrical connection between one terminal part 59b and the other terminal part 59c of the short bar 59. By disposing the changeover switch in the short bar 59 in this way, various use methods can be realized.

A first use method is a method in which the short bar connecting switch 59d is configured to be turned on or off by being interlocked with the trigger switch 34. For example, in a case in which the electrical apparatus main body includes a trigger switch 34 such as an impact driver, even when the battery pack 100 is mounted in a power tool main body, in a case in which the trigger switch 34 is maintained to be off, a state in which a negative electrode of the upper cell unit 146 and a positive electrode of the lower cell unit 147 are not connected to each other is formed, and electric power is not supplied to the positive electrode input terminal 52 and the negative electrode input terminal 57. A second use method is a case in which the short bar connecting switch 59d is used as a main switch of an electrical apparatus main body. There are cases in which there is only a main switch in an electrical apparatus using the battery pack 100 without using a trigger switch. In such cases, the short bar connecting switch 59d may be used as a main switch or may be configured to operate by being interlocked with a main switch. In any one of the first and second use methods, at the time of storage or at the time of transportation, the upper cell unit 146 and the lower cell unit 147 are reliably maintained to be in a non-connection state, and accordingly, it is particularly helpful for improving the safety of the battery pack 100. In addition, no on/off control is performed using only the trigger switch 34, and on/off control can be performed also on the short bar 59 side, and accordingly, the microcomputer of the electrical apparatus main body side can block the supply of electric power by controlling the short bar connecting switch 59d in a case in which urgent stop is required. The trigger switch 34 and the short bar connecting switch 59d are completely interlocked with each other and may be configured to perform on/off switching of the trigger switch 34 and on/off switching of the short bar connecting switch 59d without any delay time. In such a case, the on/off interlocking may be realized by a mechanical mechanism, or on/off may be realized at the same timing using an electric circuit configuration. In addition, the on/off switching of the short bar connecting switch 59d corresponding to the on/off switching of the trigger switch 34 may be controlled to be slightly shifted using an electric circuit configuration. FIG. 28 illustrates a method for slightly shifting the on/off switching of the short bar connecting switch 59d from the on/off switching of the trigger switch 34.

FIG. 28(1) is a diagram illustrating timings of an operation of the short bar connecting switch 59d (a connection operation 196) and an operation of the trigger switch 34 (a trigger operation 197). Each horizontal axis represents the time (unit: seconds) and is illustrated at the same scale. FIG. 28(1) is a diagram illustrating timings of the operation of the short bar connecting switch 59*d* (the connection operation 196) and the operation of the trigger switch 34 (the trigger operation 197). When a power tool is used, by turning on a main switch not illustrated in the drawing, the short bar connecting switch 59*d* is turned on by being interlocked therewith. Thereafter, the motor rotates by an operator turning on the trigger switch 34 at time t2, t4, t6, and t8. When an operator turns off the trigger switch at time t3, t4, t7, and t9, the rotation of the motor stops. When an operator turns off the main switch not illustrated in the drawing at time t10, the short bar connecting switch 59*d* is turned off by being interlocked therewith, and accordingly, the upper cell unit 146 and the lower cell unit 147 of the battery pack 100 are in a non-connection state. Accordingly, even in a state in which the battery pack 100 is plugged into the power tool main body, when the main switch is turned off, series connection between the upper cell unit 146 and the lower cell unit 147 comes into a released state.

FIG. 28(2) is a diagram illustrating control timings of a short bar connecting switch 59*d*, a microcomputer, and a motor in a case in which a trigger switch is not a trigger switch requiring a continuous operation during an operation and a power tool is a power tool including a changeover switch of only on or off such as a grinder or a motor-driven circular saw. In a case in which an electrical apparatus main body is of a type not including a trigger switch 34 requiring a continuous operation of an operator such as a grinder or a circular saw, the short bar connecting switch 59*d* can be configured to function as a main switch of the power tool. In such a case, the main switch (the short bar connecting switch 59*d*) is turned on at time t11, and the power tool comes into a usable state. Then, since an operating voltage is supplied also to a microcomputer included in a control unit of the power tool main body side, the microcomputer 198 starts to operate. The started microcomputer 198 rotates the motor, and the motor starts to operate at time t12 with the timing slightly delayed. When the operation ends at time t20, the operator switches the main switch (the short bar connecting switch 59*d*) to the off side. Then, since the supply of electric power to the microcomputer is blocked, the microcomputer and the motor stop. As described above, by providing a light time lag until the start of the motor after turning-on of the short bar connecting switch 59*d*, concentration of an excessive current on a contact point of the short bar connecting switch 59*d* can be inhibited. In addition, by turning off the short bar connecting switch 59*d* as a main switch, a state in which the output of the battery pack 100 is not supplied to the positive electrode input terminal 52 and the negative electrode input terminal 57 can be reliably maintained. The reason for this is that, by turning off the main switch, the series connection between the upper cell unit 146 and the lower cell unit 147 is in a released state, and accordingly, it is helpful also for improving the safety at the time of transportation.

Embodiment 5

Next, the shapes of terminal holders 500 and 550 of the electrical apparatus main body side will be described with reference to FIG. 29 to FIG. 39. In FIG. 29(1), the terminal holder 500 has a new shape that can be attached to replace a terminal unit 20 (see FIG. 10) conventional electrical apparatus main body 20 and is for a rated voltage of 18 V. Although the base stand 21, which is formed using a synthetic resin, fixing terminals has a small shape in the terminal unit 20 illustrated in FIG. 10, a horizontal wall 501 forming a horizontal face 501*a* is formed to be large in forward, backward, leftward, and rightward directions in the terminal holder 500 according to the fifth embodiment. The terminal holder 500 is a member used for fixing a plurality of terminals 522 and 524 to 528 of the electrical apparatus main body side in which a metal component including a terminal unit having a flat plate shape according to integral molding of a non-conductor such as a synthetic resin or the like is fixed through casting. A positive electrode input terminal 522, a T terminal 524, a V terminal 525, an LS terminal 526, a negative electrode input terminal 527, and an LD terminal 528 having flat plate shapes are disposed in a leftward-rightward direction in the terminal holder 500. Although there are additional positive electrode terminals (161 and 172 illustrated in FIG. 14) for charging in the battery pack 100, the terminal holder 500 illustrated here is used for an electrical apparatus dedicated for discharging. Accordingly, terminals fitted to the positive electrode terminals for charging (161 and 171 illustrated in FIG. 4) are not disposed. A plurality of terminals 522 and 524 to 528 extending from the base part 510 of the terminal holder 500 to the front side are firmly fixed such that parts of a rear side portion and an upper side are cast to a horizontal wall 501. Curved ribs 503*a* to 503*d* used for fixing the terminal holder 500 to a housing of the electrical apparatus main body side are formed on the rear side of the horizontal wall 501. Curved ribs 504*a* and 504*b* that are curved toward a side opposite to that of the curved ribs 503*a* and 503*d* are formed at positions facing the curved ribs 503*a* and 503*d*. By fitting cylinder-shaped members to spaces between a plurality of curved ribs 503*a* to 503*d*, 504*a*, and 504*b*, the rear side of the terminal holder 500 is fixed to the housing of the electrical apparatus main body side. At this time, the front side of the terminal holder 500 is locked into the housing of the electrical apparatus main body side using a locking claw 502. A horizontal face 515 that is thin and long in the leftward-rightward direction is formed at a portion that is on the lower side of the plurality of terminals 522 and 524 to 528 and is close to a vertical face 501*b*. The horizontal face 515 is manufactured by integral molding with the base part 510 and is a horizontal plate having a rectangular shape that is long in the horizontal direction. A protrusion part 516*a* protruding to a further right side from a right end of the base part 510 is formed at a right end of the horizontal face 515. Similarly, a protrusion part 516*b* protruding to a further left side from a left end of the base part 510 is formed.

FIG. 29(2) is a left side view of the terminal holder 500. In the terminal holder for 18 V, a horizontal face 515 that is continuous in the horizontal direction are formed in the lower side portion of a plurality of terminals 522 and 524 to 528, and protrusion parts 516*a* and 516*b* are formed at both left and right ends of the horizontal face 515. Connection parts 522*b*, 524*b*, 527*b*, and the like for soldering are formed at rear ends of the plurality of terminals 522 and 524 to 528 cast to the base part 510 having a parallelepiped shape. By inserting a cylindrical member that is thin and long in the leftward-rightward direction into the inside the curved rib 503*d* on the lower side of the connection parts 522*b*, 524*b*, 527*b*, and the like and the curved rib 504*b* facing the curved rib 503*d*, the cylindrical member can be fixed to the housing of the electrical apparatus main body using screws or the like.

FIG. 30 is a diagram illustrating the terminal holder 500, FIG. 30(1) is a front view, and FIG. 30(2) is a bottom view. In the terminal holder 500, an additional horizontal face (horizontal wall) 515 is formed below the bottom face part 510b connecting the lower sides of the terminals 522 and 524 to 528. A concave part 516 cut out in a concave shape is formed near the center of the horizontal face 515 in the leftward-rightward direction. The concave part 516 is a notch formed not to interfere with the vertical wall part 185a (see FIG. 3) of the battery pack 100 when the terminal holder 500 is mounted. Parts of the rear side portion and the upper side portion of the terminals 522 and 524 to 528 are cast to the base part 510, and a part of the rear side of the lower side is cast using the horizontal wall 515. Accordingly, the terminals 522 and 524 to 528 are firmly fixed without deviating in the leftward-rightward direction. The plurality of terminals 522 and 524 to 528 are cast to pass through the rear side in the base part 510. At that time, hollow parts 532 to 538 and 544 to 546 not filled with a resin material are formed in the base part 510 on the rear side of the horizontal face 515. These hollow parts are parts that are unnecessary for covering the terminals 522 and 524 to 528 cast to the inside and are formed for implementation of a light weight of the terminal holder 500. FIG. 30(3) is a top view and illustrates a portion exposed to an internal space of the housing 3 of the power tool main body 1. The terminal holder 500 according to the fifth embodiment has a relatively large size, and a level difference face 506 rising toward the upper side is formed on the upper face of the horizontal face 501a. An edge portion on the outer peripheral side of the horizontal face 501a is pinched by an opening portion formed in the housing 3 of the power tool main body 1, thereby being fixed to the power tool main body 1. At this time, a gap between the terminal holder 500 and the housing 3 may be buried in the outer peripheral face of the horizontal wall 501 through a sealing member (not illustrated in the drawing) using rubber.

FIG. 31 is a partial side view illustrating a state in which a conventional battery pack 15 is mounted in a power tool main body using the terminal holder 500. In the conventional battery pack 15, a connection terminal 18 is fixed on a circuit board 16 of the battery pack 15. The size of the connection terminal 18 is a size corresponding to the terminal unit of a positive electrode input terminal 522. The connection terminal 18 includes arm parts 18a and 18b (the arm part 18b is not seen in the drawing) of both left and right sides extending toward the front side in the mounting direction of the battery pack, and the terminal unit of the positive electrode input terminal 522 is interposed between these arm parts 18a and 18b, whereby a satisfactory electrical contact state is achieved. When the conventional battery pack 15 is mounted in the electrical apparatus main body, the horizontal face 515 is positioned to approach the upper-portion face 115 of the upper casing 110 (see FIG. 3), and the vertical face 501b is at a position facing the level difference part 114 (see FIG. 3). At this time, the arm parts 18a and 18b of the connection terminal 18 are fitted to have the positive electrode input terminal 522 having a plate shape to be interposed between the left and right sides, whereby an electrically connected state is established. In the conventional terminal unit 20 (see FIG. 10), the horizontal face 515 is not formed, and accordingly, a gap is generated at a portion denoted by an arrow 517. However, in this embodiment, the horizontal face 515 comes into contact with or approaches the board cover 19, and accordingly, the gap between the terminal holder 500 and the board cover 19 is in a buried state, and a range in which a connection terminal group of the battery pack 15 moves relative to the power tool main body 1 side is restricted. Accordingly, the amount of relative movement between the fitting portions of the arm parts 18a and 18b and the terminal unit of the positive electrode input terminal 522 at the time of operating the power tool is restricted much, and the occurrence of wear of fitting portions between the arm parts 18a and 18b and the terminal unit of the positive electrode input terminal 522 can be inhibited, and the lives of the battery pack 15 and the power tool main body 1 can be increased through electrical stabilization. In addition, while upward moving of the terminal holder 500 with respect to the battery pack 15 can be restricted by the protrusion parts 516a and 516b (see FIG. 29), the actions of the protrusion parts 516a and 516b will be described later with reference to FIG. 36.

FIG. 32 is a diagram illustrating a shape of the terminal holder 550 for 36 V according to the fifth embodiment of the present invention, FIG. 32(1) is a perspective view seen from below, and FIG. 32(2) is a left side view. A difference from the terminal holder 550 for 18 V illustrated in FIG. 29 is small, and the shape of a resin part may be regarded as being the same. The only difference is that the positive electrode input terminal 572 and the negative electrode input terminal 577, similar to the first embodiment, have a narrow width in the vertical direction, terminal parts 588b and 588c of the short bar are disposed parallel to each other in the lower side portions of the positive electrode input terminal 572 and the negative electrode input terminal 577. The shape of the side face illustrated in FIG. 32(2) is almost the same, and a horizontal face 565 is formed below the connection terminal group, and protrusion parts 566a and 566b are formed on both left and right sides thereof.

FIG. 33 is a diagram illustrating the terminal holder 550 illustrated in FIG. 32, FIG. 33(1) is a front view, FIG. 33(2) is a bottom view, and FIG. 33(3) is a top view. Here, the positive electrode input terminal 572 and the negative electrode input terminal 577 have a smaller width in the vertical direction than the other terminals 574 to 578, a terminal part 588b is formed below the positive electrode input terminal 572, and a terminal part 588c is formed below the negative electrode input terminal 577. The terminal parts 588b and 588c are both ends of the short bar cast to the inside of the base part 560 of the terminal holder 550 and are electrically connected. The shape of the bottom portion illustrated in FIG. 33(2) is almost the same as the terminal holder 550 illustrated in FIG. 30. In the base part 560, a plurality of terminals 572 and 574 to 578 and a short bar not illustrated in the drawing are cast. A plurality of hollow parts 582 to 588 and 594 to 596 are formed on the rear side of the horizontal face 565. These hollow parts are portions that are unnecessary for covering the terminals 522 and 524 to 528 cast inside and are formed for implementation of a light weight of the terminal holder 500. FIG. 33(3) is a top view and is a portion exposed to the internal space of the housing 32 of the power tool main body 30. A level difference face 556 is formed in a horizontal face 551a that is an upper face of the terminal holder 550.

FIG. 34 is a diagram illustrating a connection state between a power tool main body using the terminal holder 550 and the connection terminals of the battery pack 100 according to this embodiment. FIG. 34(1) is a side view, and FIG. 34(2) is a side view in which illustration of a side wall part of the board cover 380 is omitted from FIG. 34(1). Here, the upper positive electrode terminal 162 is fitted only to the positive electrode input terminal 572, and the lower positive electrode terminal 172 is connected to the terminal part 588b of the short bar. The horizontal face 565 is positioned to come into contact with or approach the lower-portion face 111 of the upper casing 110 (see FIG. 3) and the upper face 381a of the board cover 380. Also in the terminal holder 550, the horizontal face 565 and the protrusion parts 566a and 566b are formed, and accordingly, moving of the terminal holder 550 in the vertical direction with respect to the battery pack 100 can be restricted.

Next, another method for restricting the amount of relative moving of the terminal holder 550 with respect to the battery pack will be described with reference to FIG. 35. In the method illustrated in FIG. 29 to FIG. 34, moving in the direction in which the terminal holders 500 and 550 approach the circuit boards 16 and 150, in other words, moving only in the downward direction is restricted, and, for that reason, the horizontal faces 515 and 565 are formed in the terminal holders 500 and 550. However, by only disposing the horizontal faces 515 and 565, relative moving in a direction in which the terminal holders 500 and 550 is separated away from the circuit boards 16 and 150, in other words, moving in the upward direction cannot be restricted. The terminal holder 550 is held by the housing 32 of the power tool main body 30. At this time, a method of fixing the terminal holder 550 is different in accordance with a type of power tool main body or electrical apparatus main body. Generally, an opening portion for interposing the terminal holder 500 is disposed in a division face of a division-type housing, and the terminal holder 500 is interposed in the opening portion. At this time, in order to improve waterproof and prevent transmission of vibrations, not only a method for firmly fixing the opening portion and the terminal holder 500 is used, but also a slight operating state may be maintained through a sealing member formed using rubber. In such a case, in a case in which the power tool is put in a state in which large vibration is generated at the time of operation, the terminal holder 550 slightly vibrates at a cycle different from that of the power tool main-body side housing, in other words, vibrates within an operating range according to the sealing member, and relative moving between the connection terminals of the battery pack 100 and the apparatus-side terminals having a plate shape is generated. In order to inhibit relative moving between the connection terminals and the apparatus-side terminals, the fitting pressure of the connection terminals of the battery pack 100 may be considered to be raised. However, in such a case, it becomes difficult to mount and detach the battery pack 100. Thus, in this embodiment, the protrusion parts 516a and 566a protruding toward the right side are formed near both left and right ends of the horizontal faces 515 and 565, and upward moving of the terminal holder 550 with respect to the battery pack 100 is also inhibited by forming the protrusion parts 516b and 566b protruding to the left side. In order to restrict upward moving of the terminal holders 500 and 550, an abutting member (an engagement unit) holding the protrusion parts 516a, 516b, 566a, and 566b from the upper side are necessary. Here, as an engagement part, in this embodiment, a convex part is formed in a part of the upper casing 110, or a convex part is formed on the board cover 380, and the protrusion parts 516a and 516b or the protrusion parts 566a and 566b are caused to come into contact with the lower side of this convex part.

FIG. 35(1) illustrates a right side view of a state in which the terminal holder 550 is mounted in the battery pack 100. Here, the horizontal face 551a of the terminal holder 550 faces the upper-portion face 115 of the upper casing 110. The battery pack 100 is mounted in the power tool main body 30 using a rail mechanism. FIG. 35(2) is a cross-sectional view of a part C-C illustrated in FIG. 35(1). Here, a plurality of apparatus-side terminals 572, 574 to 578, 588b, and 588c formed in the terminal holder 550 are fitted to connection terminals (see FIG. 4) of the power tool main body 1 side.

The horizontal face 565 is formed on the lower face of the apparatus-side terminals 572, 574 to 578, 588b, and 588c, the horizontal face 565 comes into contact with the upper face 381a of the board cover 380. However, near arrows 590a and 590b, the horizontal side of the terminal holder 550 is in a non-contacting state for the upper casing 110.

FIG. 36(1) is a diagram illustrating a terminal unit 650 according to a modified example of the fifth embodiment, FIG. 36(1) is a cross-sectional view of a part corresponding to a part D-D illustrated in FIG. 35(1), and FIG. 36(2) is a partially enlarged view of FIG. 36(1). As can be understood from this diagram, protrusion parts 666a and 666b are disposed in a leftward-rightward direction in the terminal unit 650. In the upper casing 110, parallel two protrusion parts 139a and 139b extending in the forward-backward direction are disposed, and rails 138a and 138b that protrude to both left and right sides near upper ends of the upwardly-protruding protrusion parts and engage with rail grooves of the power tool side are disposed. In addition, ribs 140a and 140b serving as engagement parts fitted to the terminal unit 650 are disposed in an opening portion formed between the protrusion parts 139a and 139b, and upward relative moving of the terminal unit 650 with respect to the battery pack 100 is prevented. Relative downward moving of the terminal unit 650 with respect to the battery pack 100 is restricted by the protrusion parts 666a and 666b coming into contact with the level difference parts 386a and 386b formed in the left and right ends of the upper face 381a of the board cover 380. Here, when a gap between the lower faces of the ribs 140a and 140b forming the level difference part and the upper faces of the level difference parts 386a and 386b is set to 3.0 mm, and the height of the protrusion parts 666a and 666b is set to about 2.5 mm, not only mounting/detachment of the battery pack 100 to/from the power tool main body 30 can be smoothly performed, and swing of the terminal holder 550 in the vertical direction can be effectively inhibited.

FIG. 37 is a diagram illustrating a modified example in which the terminal unit 650 is fixed to the board cover 680, FIG. 37(1) is a cross-sectional view of a part corresponding to the part D-D illustrated in FIG. 35, FIG. 37(2) is a diagram of the terminal unit 650 illustrated in FIG. 37(1) as a single body, and FIG. 37(3) is a left side view of the terminal unit 650. Here, guiding rails 695a and 695b used for being fitted to the protrusion parts 666a and 666b of the terminal unit 650 are formed at both side ends of the board cover 680. Regarding the guiding rails 695a and 695b, when the terminal unit 650 relatively moves to slide from the front side of the battery pack 100 in second rail grooves having a concave shape extending in the forward-backward direction, a form in which the protrusion parts 666a and 666b of the terminal unit 650 enter the inside of the guiding rails 695a and 695b is formed. In other words, the power tool main bodies 1 and 30 are engaged with mounting rail mechanisms, in other words, the rails 138a and 138b at the rail grooves 11a and 11b, and the protrusion parts 666a and 666b of the second rail mechanism and the guiding rails 695a and 695b are fitted to each other, whereby relative moving between the terminal unit 650 and the battery pack 100 is restricted. When seen in the side view of FIG. 37(3), the shape of the terminal unit 650, differently from the shape of the terminal holders 500 and 550 according to the fifth embodiment illustrated in FIG. 29 to FIG. 34, is formed to have a small size. However, the size of the terminal unit (for example, the positive electrode input terminal 672 and the terminal part 688b of the short bar), which is formed using a metal, composing the connection terminal is the same as that according to the fifth embodiment. In addition, a shape in which the horizontal face 665 is formed below a plurality of metal terminals, and the protrusion parts 666a and 666b are further formed on both left and right ends of the horizontal face 665, is the same as the shape of the terminal holders 500 and 550 according to the fifth embodiment illustrated in FIG. 29 to FIG. 34. By forming as such, a relative moving range of the terminal unit 650 mounted in a power tool main body or an electrical apparatus main body in which the battery pack is mounted in the vertical direction can be effectively suppressed.

FIG. 38 illustrates a cushion member 690 that is interposed in the lower face 665a of the horizontal face 665 of the terminal unit 650A illustrated in FIG. 37. The cushion member 690 may be a member that has a high sliding property not to form high resistance at the time of mounting the battery pack 100 in the power tool main body and has sufficient elasticity. Here, the cushion member 690 is attached to the flat lower face 665a of the terminal unit 650A using an adhesive member such as a double-sided tape or the like. In addition, a convex part 665b formed to have a predetermined length in the forward-backward direction is formed near the center of the lower face 665a in the forward-backward direction. The convex part 665b is a stopper that is manufactured integrally with the base part 660 and protects the cushion member 690 not to be pressed more than is necessary. When seen in the side view of FIG. 38(2), the cushion member 690 is disposed on a further rear side than the protrusion part 666b and is disposed below the base part 660. However, a total length of the cushion member 690 in the leftward-rightward direction may be about a half of the area of the lower face 665a in the leftward-rightward direction or less.

FIG. 39 is a diagram illustrating a terminal unit 650B according to another modified example of the fifth embodiment, FIG. 39(1) is a front view, FIG. 39(2) is a left side view, and FIG. 39(3) is a left side view of the terminal unit 650B that is in the state of being fitted to connection terminals of the battery pack 100 side. Here, guiding parts 692a to 692c formed using a synthetic resin are interposed in vertical edge portions of the positive electrode input terminal 672 and the terminal part 688b of the short bar. Similarly, guiding parts 697a to 697c formed using a synthetic resin are interposed in vertical edge portions of the negative electrode input terminal 677 and the terminal part 688c of the short bar. The guiding parts 697a to 697c are manufactured using a non-conductor such as a synthetic resin or the like and may be configured using a member separate from the base part 660 or may be manufactured through integral molding with the base part 660. The guiding parts 692a to 692c and the guiding parts 697a to 697c, as illustrated in the side view of FIG. 39(2), are continuously formed from a front portion of the front end of the positive electrode input terminal 672 until coming into contact with the vertical wall 661b. Accordingly, as the metal terminal parts, as illustrated in FIG. 39(2), the positive electrode input terminal 672 is exposed between the guiding parts 692a and 692b, and the terminal part 688b of the short bar is exposed between the guiding parts 692b and 692c. In this way, by forming the guiding parts 692a to 692c and the guiding parts 697a to 697c, as illustrated in FIG. 39(3), the arm parts 162a and 162b of the upper positive electrode terminal 162 are guided between the guiding parts 692a and 692b, and the arm parts 172a and 172b of the lower positive electrode terminal 172 are guided between the guiding parts 692b and 692c by being guided by the guiding parts 692a to 692c. By employing this configuration, the connection terminals of the battery pack 100 side can be reliably guided to predetermined positions of the terminal unit 650B at the time of mounting, and, additionally, a phenomenon in which the apparatus-side terminals of the terminal unit and the connection terminals of the battery pack side wear according to sliding at the time of operating the power tool can be significantly suppressed.

Embodiment 6

Next, a sixth embodiment of the present invention will be described with reference to FIG. 40 to FIG. 45. In the first embodiment, as the power terminals (the positive electrode terminal and the negative electrode terminal), the upper terminals 162 and 167 and the lower terminals 172 and 177 are disposed, and, when the battery pack is mounted in a low-voltage power tool main body, the upper terminals and the lower terminals are commonly connected to the power terminals of the low-voltage power tool main body. In addition, when the battery pack is mounted in a high-voltage power tool main body, only one side of the upper terminals and the lower terminals are connected to the power terminals of the high-voltage power tool main body, and the terminals of the other side not connected to the power terminals form a short circuit using the short bar. In contrast to this, in the sixth embodiment, instead of arranging arm parts to be divided in the vertical direction as arrangement of the arm parts of the power terminals, the arm parts are arranged to be divided in the forward-backward direction.

FIG. 40 is a perspective view illustrating a mounting status of a battery pack 860 of a power tool according to the sixth embodiment. The power tool is composed of a power tool main body 801 and a battery pack 860 mounted therein and drives a tip tool and an operation device using a rotary drive force according to a motor. The power tool main body 801 includes a housing 802 that is an outer edge forming an external shape, a handle part 803 is formed in the housing 802, a trigger switch 804 operated by an operator is disposed near an upper end of the handle part 803, and a battery pack mounting part 810 used for mounting the battery pack 860 is formed below the handle part 803.

Here, a mounting direction 818 of the battery pack 860 is described, similar to the first embodiment, as a direction in which the battery pack 860 approaches the power tool main body 801. This is described as such only for the convenience of description, actually, by holding the battery pack 860 and moving the power tool main body 801 to the front side, relative moving in the same direction as that of moving denoted by an arrow 818 can be realized. In addition, in this specification, forward/backward/leftward-rightward directions of the battery pack 860 are determined with reference to the mounting direction. On the other hand, on the power tool main body side, forward/backward/leftward-rightward directions are defined with reference to a direction when an operator grips the power tool main body. Accordingly, in a case in which an electrical apparatus is a power tool main body such as an impact driver or the like, as illustrated in the FIG. 40, it should be noted that the forward-backward directions are reversed as in FIG. 40.

The shape of the battery pack 860 is different from those of the battery packs 15 and 100 described in the first embodiment in the arrangement of connection terminals and a latch mechanism. On both left and right sides of the battery pack 860, rails 864a and 864b (a rail 864b is not seen in the drawing) are formed. A latch button 865 is formed in an upper part of the rear face of the battery pack 860, and one large button is disposed at the horizontal center. When the battery pack 860 is mounted in the power tool main body 830, by pressing the latch button 865 and then moving the battery pack 860 in a direction opposite to an arrow 818 (or moving the power tool main body 830 to be separate away from the battery pack 860), the battery pack 860 can be detached.

FIG. 41 is a diagram illustrating a mounting status of the battery pack according to the sixth embodiment in a power tool. In power tool main bodies 801 and 830, housings 802 and 832, handle parts 803 and 833, and trigger switches 804 and 834 are respectively disposed, and battery pack mounting parts 810 and 840 used for mounting the battery pack 860 are respectively formed below the handle parts 803 and 833.

The power tool main body 801 operates at a rated voltage of 18 V, and the power tool main body 830 operates at a rated voltage of 36 V. Inside the battery pack 860, two sets of cell units in which five cells of lithium ion batteries having a rated 3.6 V are connected in series are housed, and, both a low-voltage (18 V) output and a high-voltage (36 V) output can be switched by changing the connection of the two sets of cell units in series or in parallel. By configuring the battery pack 860 to be in correspondence with two voltages, the battery pack 860 can be either mounted in the power tool main body 830 corresponding to 36 V as denoted by an arrow b4 or mounted in the power tool main body 801 corresponding to 18 V as denoted by an arrow b3. In the battery pack mounting part 810 of the power tool main body 801, rail grooves 811a and 811b extending in parallel with each other in a forward-backward direction in inner wall portions of both left and right sides are formed, and a terminal unit 820 is disposed in a space part enclosed by the left and right rail grooves 811a and 811b. The terminal unit 820 is manufactured through integral molding of a non-conductor material such as a synthetic resin, and a vertical face 820a that becomes an abutting surface in a mounting direction (a forward-backward direction) and a horizontal face 820b are formed, and the horizontal face 820b becomes a face that is adjacent to and faces an upper-portion face 862 of the battery pack 860 at the time of mounting the battery pack 860. In the terminal unit 820, a plurality of terminals formed using metal, for example, a positive electrode input terminal 822, a negative electrode input terminal 827, an LD terminal (an abnormal signal terminal) 828 are disposed. The positive electrode input terminal 822 and the negative electrode input terminal 827 are formed using metal flat plates and have a length in the mounting direction to be equal to or longer than twice that of the terminal unit 20 (see FIG. 2) according to the first embodiment. The LD terminal 828 is disposed to the right side of the negative electrode input terminal 827.

On the upper side of the battery pack 860, a flat lower-portion face 861 is formed on the front side, and an upper-portion face 862 formed to be higher than the lower-portion face 861 is formed near the center. A connected portion of the lower-portion face 861 and the upper-portion face 862 are formed in a level difference shape, and a slot group used for inserting apparatus-side terminals is disposed in the part of the level difference shape. As the slot group, large slots 872 and 877 as long notches in the forward-backward direction and a slot 878 having a length that is about half of that of the slot 878 are formed. The slot 872 serves as a first slot used for a positive electrode terminal, the slot 877 serves as a second slot used for a negative electrode terminal, and the slot 878 serves as a third slot used for the LD terminal. Inside the notched slots 872 and 877, a plurality of connection terminals that can be fitted to apparatus-side terminals of the power tool main bodies 801 and 830 sides are disposed. In addition, although only three slots are disposed here, more slots may be configured to be disposed. On a right side face and a left side face of the upper-portion face 862, rails 864a and 864b are formed. The rails 864a and 864b are convex parts protruding to the right side and the left side. A raised part 863 is disposed on the rear side of the upper-portion face 862, and a latch button 865 is disposed on the rear side thereof.

The power tool main body 830 operates at a rated voltage of 36 V. In the power tool main body 830, in accordance with an idea similar to that of the first embodiment, two sets of connection terminals inserted into the positive electrode side slot 872 and the negative electrode side slot 877 are disposed being separate from each other in the forward-backward direction. Connection terminals corresponding to the positive electrode side slot 872 are one terminal part 859b of a short bar disposed on the front side and a positive electrode input terminal 852 disposed on the rear side. Similarly, connection terminals corresponding to the negative electrode side slot 877 are one terminal part 859c of the short bar disposed on the front side and a negative electrode input terminal 857 disposed on the rear side. Although the positive electrode input terminal and the short bar and the negative electrode input terminal and the short bar are disposed to be separate from each other by a distance in the vertical direction in the first embodiment, in this embodiment, these are disposed in the forward-backward direction, in other words, are disposed to be separated from each other by a predetermined distance in a direction parallel to the mounting direction of the battery pack 860.

FIG. 42 is a perspective view illustrating a connection state of power terminals for a power tool main body, FIG. 42(1) illustrates a state in which the battery pack 860 is mounted in a power tool main body 830 for 36 V, and FIG. 42(2) illustrates a state in which the battery pack 860 is mounted in a power tool main body 801 for 18 V. Here, the mounting direction of the battery pack 860 is a direction of two arrows denoted by dotted lines. Inside the positive electrode side slot 872 of the battery pack 860, a front positive electrode terminal 882 and a rear positive electrode terminal 892 are disposed to be separated from each other in the forward-backward direction as a power switching terminal group. Similarly, inside the negative electrode side slot 877, a front negative electrode terminal 887 and a rear negative electrode terminal 897 are disposed to be separated from each other in the forward-backward direction as a power switching terminal group. Inside the battery pack 860, an upper cell unit 146 and a lower cell unit 147 composed of five lithium ion battery cells are housed. A positive electrode output of the upper cell unit 146 is connected to the rear positive electrode terminal 892, and a negative electrode output is connected to the front negative electrode terminal 887. A positive electrode output of the lower cell unit 147 is connected to the front positive electrode terminal 882, and a negative electrode output is connected to the rear negative electrode terminal 897.

The apparatus-side terminals of the power tool main body 830 are composed of a positive electrode input terminal 852, a negative electrode input terminal 857, and a short bar 859. Such functions are basically the same as those of the components according to the first embodiment, the terminal groups 852, 857, 859b, and 859c of the power tool main body are relatively moved as denoted by an arrow 855 and are configured to be mounted in the connection terminal group 882, 887, 892, and 897 of the battery pack 860 as denoted by dotted-line arrows. For the terminal group 852, 857, 859b, and 859c of the power tool main body, the entire terminal unit 850 (see FIG. 41) is not illustrated, and only a metal terminal part is illustrated. The positive electrode input terminal 852 is a metal plate member bent in a crank shape, a terminal part 852*a* fitted to the front positive electrode terminal 882 is formed at one end side, and a wiring terminal part 852*c* for the motor 836 side is formed at the other end side. The connection part 852*b* extending in the horizontal direction is present between the terminal part 852*a* and the wiring terminal part 852*c*, and the entire connection part 852*b*, a part of the terminal part 852*a* on the rear side, and a part of the wiring terminal part 852*c* on the front side are cast to a synthetic resin portion of the terminal unit 850 (see FIG. 41). The negative electrode input terminal 857 also has a similar shape, a terminal part 857*a* fitted to the front negative electrode terminal 887 is formed at one end side, and a wiring terminal part 857*c* for the motor 836 side is formed at the other end side. The positive electrode input terminal 852 and the negative electrode input terminal 857 have plane symmetrical shapes. The connection part 857*b* extending in the horizontal direction is present between the terminal part 857*a* and the wiring terminal part 857*c*, and the entire connection part 857*b*, a part of the terminal part 857*a* on the rear side, and a part of the wiring terminal part 857*c* on the front side are cast to a base stand, which is formed using a synthetic resin, of the terminal unit 850 (see FIG. 41). Since a horizontal part of the short bar 859 is completely cast into the terminal part 850 together with the connection part 852*b* of the positive electrode input terminal 852 and the connection part 857*b* of the negative electrode input terminal 857, relative positions of the terminal parts 852*a*, 857*a*, 859*b*, and 859*c*, particularly, there are no change in positions in the forward-backward direction and positions in the leftward-rightward direction.

When the battery pack 860 is mounted, the terminal part 859*b* of the short bar 859 is fitted to the rear positive electrode terminal 892, and the terminal part 859*c* is fitted to the rear negative electrode terminal 897. In addition, the positive electrode input terminal 852 is fitted to the front positive electrode terminal 882, and the negative electrode input terminal 857 is fitted to the front negative electrode terminal 887. As a result, a series connection circuit of the upper cell unit 146 and the lower cell unit 147 is formed, and a rated voltage of 36 V is supplied to the power tool main body 830 side.

FIG. 42(2) illustrates a status in which the battery pack 860 is mounted in the power tool main body 801 of a low voltage. The positive electrode input terminal 822 is a metal plate member bent in a crank shape, a terminal part 822*a* simultaneously fitted to the front positive electrode terminal 882 and the rear positive electrode terminal 892 is formed at one end side, and a wiring terminal part 822*c* for the motor 806 side is formed at the other end side. The connection part 822*b* extending in the horizontal direction is present between the terminal part 822*a* and the wiring terminal part 822*c*, and the entire connection part 822*b*, a part of the terminal part 822*a*, and a part of the wiring terminal part 822*c* are cast to a synthetic resin portion of the terminal unit 820. Similarly, the negative electrode input terminal 827 is also formed in a crank shape, and a terminal part 827*a* simultaneously fitted to the front negative electrode terminal 887 and the rear negative electrode terminal 897, a wiring terminal part 827*c*, and a connection part 827*b* are formed. As a result, a rated voltage of 18 V is supplied to the power tool main body 801 side. Here, the terminal part 822*a* is formed to have a length sufficient for being simultaneously fitted to the front positive electrode terminal 882 and the rear positive electrode terminal 892, and the terminal part 827*a* is formed to have a length sufficient for being simultaneously fitted to the front negative electrode terminal 887 and the rear negative electrode terminal 897.

In the rear positive electrode terminal 892, a shape seen in an apparatus-side terminal insertion direction (a direction denoted by dotted-line arrows) is the shape of an inverted Ω form. Here, a rectangular flat plate part 892*a* used for being fixed to the circuit board is formed, two arm parts 892*b* and 892*d* upwardly bending from both left and right side portions of the flat plate part 892*a* are formed. The two arm parts 892*b* and 892*d* are bent to approach each other toward the upper side, and contact terminal parts 892*c* and 892*e* (see FIG. 45) are formed at upper ends of the arm parts 892*b* and 892*d*. The contact terminal parts 892*c* and 892*e* are electrodes having an approximately rectangular shape disposed to be separated from each other by a predetermined gap to be in parallel with each other, have the front side and the rear side to be bent to be separate away from the facing contact terminal part, and have a shape to which the apparatus-side terminal can be easily fitted in a direction from the front side to the rear side. A metal terminal component that is used as the rear positive electrode terminal 892 is a common component that is also commonly used by the front positive electrode terminal 882, the front negative electrode terminal 887, and the rear negative electrode terminal 897 and is fixed to the circuit board (not illustrated in the drawing) using a screw not illustrated in the drawing and/or soldering.

FIG. 43 is a diagram illustrating a status when the battery pack 860 is mounted in the power tool main body 830 having a specification of 36 V. When the power tool main body 830 is relatively moved further to be closer to the battery pack 860 from the state illustrated in FIG. 42(1), first, the terminal parts 859*b* and 859*c* of the short bar 859 are respectively fitted to the front positive electrode terminal 882 and the front negative electrode terminal 887. At this time point, since the positive electrode of the upper cell unit 146 and the negative electrode of the lower cell unit 147 are in a non-connected state, the electric power of the battery pack 860 is not transmitted to the electrical apparatus main body 831 side.

When the power tool main body 830 and the battery pack 860 are relatively moved further in a direction denoted by an arrow 855, the short bar 859 passes through the front positive electrode terminal 882 and the front negative electrode terminal 887 and approaches the side of the rear positive electrode terminal 892 and the rear negative electrode terminal 897. At this time, the short bar 859 comes into contact with no connection terminal, the positive electrode input terminal 852 does not come into contact with the front positive electrode terminal 882, and the negative electrode input terminal 857 does not come into contact with the front negative electrode terminal 887. Accordingly, also at this time point, the upper cell unit 146 and the lower cell unit 147 are in a non-connected state, and accordingly, the electric power of the battery pack 860 is not transmitted to the electrical apparatus main body 831.

When the power tool main body 830 and the battery pack 860 are relatively moved further in the direction denoted by the arrow 855, the short bar 859 is fitted to the rear positive electrode terminal 892 and the rear negative electrode terminal 897. At the same time, the terminal part 852*a* of the positive electrode input terminal 852 is fitted to the front positive electrode terminal 882, and the terminal part 857*a* of the negative electrode input terminal 857 is fitted to the front negative electrode terminal 887. As a result, the state of a series connection of the upper cell unit 146 and the lower cell unit 147 is realized, and a DC of a rated voltage 36 V is supplied between the positive electrode input terminal 852 and the front negative electrode terminal 887.

FIG. 44 is a diagram illustrating a status when the battery pack 860 is mounted in the power tool main body 801 having a specification of 18 V. When the power tool main body 801 is relatively moved further to be closer to the battery pack 860 from the state illustrated in FIG. 42(2), as that illustrated in FIG. 44(1) to FIG. 44(2), the terminal parts 822a and 827a are respectively fitted to the front positive electrode terminal 882 and the front negative electrode terminal 887. At this time point, since the positive electrode of the upper cell unit 146 and the negative electrode of the lower cell unit 147 are in a non-connected state, the electric power of the battery pack 860 is not transmitted to the power tool main body 801.

In FIG. 44(2), when the power tool main body 801 and the battery pack 860 are relatively moved further in the direction denoted by the arrow 825, the terminal parts 822a and 827a that are long in the forward-backward direction approaches the side of the rear positive electrode terminal 892 and the rear negative electrode terminal 897 while coming into contact with the front positive electrode terminal 882 and the front negative electrode terminal 887. In the state illustrated in FIG. 44(2), the terminal parts 822a and 827a do not come into contact with the rear positive electrode terminal 892 and the rear negative electrode terminal 897. Accordingly, also at this time point, the positive electrode of the upper cell unit 146 and the negative electrode of the lower cell unit 147 are in a non-connected state, and accordingly, the electric power of the battery pack 860 is not transmitted to the power tool main body 801.

When the power tool main body 801 and the battery pack 860 are relatively moved further in the direction denoted by the arrow 825, the terminal parts 822a and 827a respectively come into contact with the rear positive electrode terminal 892 and the rear negative electrode terminal 897. At this time, since the terminal parts 822a and 827a are in the state being fitted also to the front positive electrode terminal 882 and the front negative electrode terminal 887, a parallel connection circuit of the upper cell unit 146 and the lower cell unit 147 is established, and a DC of rated 18 V is supplied between the positive electrode input terminal 822 and the negative electrode input terminal 827.

FIG. 45 is a top view of arrangement of terminals on the battery pack 860 side and shapes of terminals of the power tool main body 830. In order to describe the sizes and the arrangements of terminals, components are illustrated with scales thereof matched. In the front positive electrode terminal 882, the rear positive electrode terminal 892, the front negative electrode terminal 887, and the rear negative electrode terminal 897, contact terminal parts 882c, 882e, 892c, 892e, 887c, 887e, 897c, and 897e that are separate from each other in the leftward-rightward direction and face each other are disposed. The contact terminal parts 882c, 892c, 887c, and 897c are respectively connected to arm parts 882b, 892b, 887b, and 897b on the right side, and the contact terminal parts 882e, 892e, 887e, and 897e are respectively connected to arm parts 882d, 892d, 887d, and 897d on the left side. The length L7 of such contact terminal parts in the forward-backward direction is configured to be sufficiently smaller than the gap L8 between the front positive electrode terminal 882 and the rear positive electrode terminal 892. In addition, since all the terminal components 882, 892, 887, and 897 are common, the lengths of the contact terminal parts 882c, 882e, 892c, 892e, 887c, 887e, 897c, and 897e in the forward-backward direction are the same as being L7. The gap between the front negative electrode terminal 887 and the rear negative electrode terminal 897 is the same gap L8. A length L9 of the terminal part of the short bar 859 in the forward-backward direction is configured to be sufficiently smaller than the gap L8 between the front terminals 882 and 887 and the rear terminals 892 and 897. By forming the terminal parts as such, a concern that the front terminals 882 and 887 and the rear terminals 892 and 897 form short circuits in accordance with the short bar 859 at the time of mounting the battery pack 860 can be effectively prevented. The lengths of the terminal part 852a of the positive electrode input terminal 852 and the terminal part 857a of the negative electrode input terminal 857 may be configured to be at least L9 or more.

FIG. 45(2) is a diagram illustrating a state when the battery pack 860 is mounted in the power tool main body 830. Here, although the horizontal part 859a of the short bar 859 is illustrated to be exposed, since the horizontal part 859a is cast into the inside of the resin portion of the terminal part not illustrated in the drawing, and the horizontal part is not exposed to the outside. As above, since the power terminals (the positive electrode terminal and the negative electrode terminal) are arranged to be divided in the forward-backward direction, an appropriate output voltage can be automatically acquired by mounting the battery pack in an electrical apparatus main body without depending on a mechanical switching mechanism used for switching an output voltage. In addition, the battery pack can be commonly used by electrical apparatuses requiring different voltages.

Although the present invention has been described on the basis of the embodiments, the present invention is not limited to the embodiments described above, and various changes can be made within a range not departing from the concept thereof. In view of the foregoing, it is intended that the invention covers modifications and variations provided that they fall within the scope of the following claims and their equivalents. For example, in the embodiments described above, although the battery pack of a voltage switching type between 18 V and 36 V has been described, a voltage ratio to be switched is not limited thereto and may be any other voltage ratio switched in accordance with a combination of a series connection and a parallel connection.

The invention claimed is:
1. An electrical apparatus comprising:
 a battery pack having a rail part; and
 an electrical apparatus main body having a housing and a battery pack mounting part mounting the battery pack, a terminal holder attached to the battery pack mounting part, and main body rail grooves integrally formed in the battery pack mounting part, wherein the terminal holder is configured to hold a plurality of apparatus-side terminals and establish electrically connected states with connection terminals of the battery pack, and the main body rail grooves correspond to the rail part of the battery pack, the plurality of apparatus-side terminals are cast to the terminal holder, the terminal holder is sandwiched by the housing,
 wherein the rail part of the battery pack has two protrusion parts and two rails, the two protrusion parts and the two rails are extending in a forward-backward direction, and the two rails are engaged with the main body rail grooves and disposed in each of the protrusion parts,
 wherein the battery pack includes an upper-portion face between the two rails, a lower-portion face going down from the upper-portion face in a level difference shape, a plurality of slots disposed in a level difference part that is provided between the upper-portion face and the lower-portion face, wherein the electrical apparatus main body has an engaging part disposed in the terminal holder, wherein the battery pack has an engagement part engaged with the engaging part of the terminal holder, and the engagement part of the battery pack is disposed in an opening portion formed between the protrusion parts at a side where the slots are located in the forward-backward direction, the engagement part is disposed between the upper-portion face and the lower-portion face, wherein the terminal holder is an article molded from a synthetic resin and forms a vertical face and a horizontal face, and is fixed by casting the apparatus-side terminals having a flat plate shape such that the apparatus-side terminals are orthogonal to both of the vertical face and the horizontal face, wherein the apparatus-side terminals have a rectangular shape, one of longer sides comes into contact with the horizontal face, and one of shorter sides comes into contact with the vertical face, and wherein a protrusion extending from the ten final holder in a direction intersecting the vertical face of the terminal holder is provided as the engaging part, and an upper surface of the protrusion is disposed to face a lower surface of the engagement part.

2. The electrical apparatus according to claim 1, wherein the opening portion connecting the slots.

3. The electrical apparatus according to claim 1, wherein, a guide face disposed parallel to the horizontal face is formed in the terminal holder, the guide face comes into contact with a part of the other of the longer sides of the apparatus-side terminals and is connected to the vertical face, and wherein the engaging parts are formed on a left side and a right side of the guide face.

4. The electrical apparatus according to claim 3, wherein the engaging parts are formed to be the same face as the guide face.

5. The electrical apparatus according to claim 3, wherein the engagement parts are concave parts that are directly formed in a casing of the battery pack, and wherein the engaging parts are positioned in the concave parts.

6. The electrical apparatus according to claim 1, wherein a cover member used for covering an internal board is disposed in the opening portion of the battery pack, the engagement part is disposed in the cover member, and the engaging part is engaged with the engagement part.

7. The electrical apparatus according to claim 3, wherein a cushion member adapted to be contact with an outer wall face of the battery pack is disposed on a face of the guide face which faces the battery pack.

8. The electrical apparatus according to claim 7, wherein the cushion member is made of a self-lubricating rubber.

9. The electrical apparatus according to claim 1, wherein the terminal holder is a separate body from the battery pack mounting part.

10. The electrical apparatus according to claim 1, further comprising a separate latch structure configured to detachably attach the battery pack to the electrical device.

11. An electrical apparatus comprising:

a battery pack having a rail part; and an electrical apparatus main body having a housing and a terminal holder and a main body rail groove, wherein the terminal holder is configured to hold a plurality of apparatus-side terminals and establish electrically connected states with connection terminals of the battery pack, the main body rail groove corresponds to the rail part of the battery pack, the plurality of apparatus-side terminals are cast to the terminal holder, the terminal holder is sandwiched by the housing, wherein the rail part of the battery pack has two protrusion parts and a rail, the two protrusion parts are extending in a forward-backward direction, and the rail is engaged with the main body rail groove and disposed in each of the protrusion parts, wherein the electrical apparatus main body has an engaging part disposed in the terminal holder, wherein the battery pack includes an upper-portion face between rail faces, a lower-portion face going down from the upper-portion face in a level difference shape, a plurality of slots disposed in a level difference part that is provided between the upper-portion face and the lower-portion face, and the opening portion connecting the slots, wherein a surface of a wall that makes up the slots has an engagement part engaged with the engaging part of the terminal holder, and the engagement part of the battery pack is disposed in an opening portion formed between the protrusion parts, wherein the terminal holder is an article molded from a synthetic resin and forms a vertical face and a horizontal face, and is fixed by casting the apparatus-side terminals having a flat plate shape such that the apparatus-side terminals are orthogonal to both of the vertical face and the horizontal face, wherein the apparatus-side terminals have a rectangular shape, one of longer sides comes into contact with the horizontal face, and one of shorter sides comes into contact with the vertical face, and wherein a protrusion extending from the terminal holder in a direction intersecting the vertical face of the terminal holder is provided as the engaging part, and an upper surface of the protrusion is disposed to face a lower surface of the engagement part.

12. The electrical apparatus according to claim 11, wherein the terminal holder is a separate body from the battery pack mounting part.

13. The electrical apparatus according to claim 11, further comprising a separate latch structure configured to detachably attach the battery pack to the electrical device.

14. An electrical apparatus comprising:

a battery pack having a rail part; and an electrical apparatus main body having a terminal holder and a main body rail groove, wherein the terminal holder is configured to hold a plurality of apparatus-side terminals and establish electrically connected states with connection terminals of the battery pack, the main body rail groove corresponds to the rail part of the battery pack, wherein the rail part of the battery pack has two protrusion parts and a rail, the two protrusion parts are extending in a forward-backward direction, and the rail is engaged with the main body rail groove and disposed in each of the protrusion parts, wherein the electrical apparatus main body has an engaging part disposed in the terminal holder, wherein the battery pack has an engagement part engaged with the engaging part of the terminal holder, and the engagement part of the battery pack is disposed in an opening portion formed between the protrusion parts, wherein the terminal holder is an article molded from a synthetic resin and formed a vertical face and a horizontal face, and is fixed by casting the apparatus-side terminals having a flat plate shape such that the apparatus-side terminals are orthogonal to both of the vertical face and the horizontal face, wherein the apparatus-side terminals have a rectangular shape, one of longer sides comes into contact with the horizontal face, and one of shorter sides comes into contact with the vertical face, and wherein protrusions protruding from a left end and a right end of the terminal holder in a leftward-rightward direction are disposed as the engaging part.

\* \* \* \* \*